(12) United States Patent
Zheng et al.

(10) Patent No.: US 11,990,075 B2
(45) Date of Patent: May 21, 2024

(54) DRIVE CONTROL METHOD AND RELATED DEVICE

(71) Applicant: HUAWEI TECHNOLOGIES CO., LTD., Guangdong (CN)

(72) Inventors: Zhiwei Zheng, Osaka (JP); Yan Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/082,658

(22) Filed: Dec. 16, 2022

(65) Prior Publication Data

US 2023/0127696 A1   Apr. 27, 2023

Related U.S. Application Data

(63) Continuation of application No. PCT/CN2021/100630, filed on Jun. 17, 2021.

(30) Foreign Application Priority Data

Jun. 18, 2020   (CN) .......................... 202010561818.6

(51) Int. Cl.
*G09G 3/20* (2006.01)

(52) U.S. Cl.
CPC ....... *G09G 3/20* (2013.01); *G09G 2310/0267* (2013.01); *G09G 2330/022* (2013.01)

(58) Field of Classification Search
CPC ............. G09G 3/20; G09G 2310/0267; G09G 2330/022
See application file for complete search history.

(56) References Cited

U.S. PATENT DOCUMENTS 4,875,036 A    10/1989  Washizuka et al.
2014/0320437 A1*  10/2014  Kang ................... G09G 5/373
                                                    345/173

(Continued)

FOREIGN PATENT DOCUMENTS

CN        1746961 A     3/2006
CN      204462945 U     7/2015

(Continued)

OTHER PUBLICATIONS

Chinese Office Action for Application No. 202010561818 dated Nov. 14, 2022, 92 pages.

(Continued)

*Primary Examiner* — Sejoon Ahn

(57) ABSTRACT

A drive control method and a related device for a display panel that has different display areas are provided. Time-divided drive control is performed on pixel scan circuits corresponding to the different display areas, so that in a scenario in which some display areas do not need to display an image, a pixel scan circuit may be left idle for some time, to reduce power consumption required by the pixel scan circuits for scanning pixels in this time period. In addition, in the embodiments of this application, time-divided drive control is further performed on touch scan circuits and fingerprint scan circuits corresponding to the different display areas, independent power supplying is further used for pixels in the different display areas, and some functions of a display driver are enabled in a time-divided manner.

19 Claims, 20 Drawing Sheets

(56) References Cited

U.S. PATENT DOCUMENTS

| | | | |
|---|---|---|---|
| 2014/0340308 A1* | 11/2014 | Yeh | G06F 1/3265 345/157 |
| 2015/0348508 A1 | 12/2015 | Her | |
| 2016/0225311 A1 | 8/2016 | Hwang et al. | |
| 2016/0372083 A1 | 12/2016 | Taite et al. | |
| 2017/0270868 A1* | 9/2017 | Li | G09G 3/2003 |
| 2018/0350318 A1* | 12/2018 | Lee | G09G 3/20 |
| 2019/0018454 A1* | 1/2019 | Jung | G06F 1/1652 |
| 2019/0051250 A1 | 2/2019 | Lee | |

FOREIGN PATENT DOCUMENTS

| | | | |
|---|---|---|---|
| CN | 105452981 A | 3/2016 | |
| CN | 105976759 A | 9/2016 | |
| CN | 106531767 A | 3/2017 | |
| CN | 107221277 A | 9/2017 | |
| CN | 107346650 A | 11/2017 | |
| CN | 108877527 A | 11/2018 | |
| CN | 108877621 A | 11/2018 | |
| CN | 108877632 A | 11/2018 | |
| CN | 109192146 A | 1/2019 | |
| CN | 109346009 A | 2/2019 | |
| CN | 109389953 A | 2/2019 | |
| CN | 109461412 A | 3/2019 | |
| CN | 109739379 A | 5/2019 | |
| CN | 110178174 A | 8/2019 | |
| CN | 110211544 A | 9/2019 | |
| JP | 2015228019 A | 12/2015 | |
| JP | 2020060650 A | 4/2020 | |
| KR | 20180024576 A | 3/2018 | |
| WO | 2018143028 A1 | 8/2018 | |

OTHER PUBLICATIONS

Chinese Office Action for Application No. 202010561818 dated May 10, 2023, 22 pages.

Extended European Search Report for Application No. 21825960.1 dated Jun. 1, 2023, 11 pages.

PCT International Search Report for Application No. PCT/CN2021/100630 dated Jun. 17, 2021, 13 pages.

Notice of Reasons for Rejection for Application No. 2022-578559 dated Jan. 31, 2024, 8 pages.

* cited by examiner

First area 101

Second area 102

Bent area

First area 101

Second area 102

DRIVE CONTROL METHOD AND RELATED DEVICE

CROSS-REFERENCE TO RELATED APPLICATIONS

This application is a continuation of International Application No. PCT/CN2021/100630, filed on Jun. 17, 2021, which claims priority to Chinese Patent Application No. 202010561818.6, filed on Jun. 18, 2020. The disclosures of the aforementioned applications are hereby incorporated by reference in their entireties.

TECHNICAL FIELD

This application relates to the drive control field, and in particular, to a drive control method and a related device.

BACKGROUND

With continuous development of electronic devices, more electronic devices with display panels are widely used in people's daily life and work. A mobile phone, a wearable device, a medical device, a household appliance, and the like that each have a display panel are common. With development of screen technologies and improvement of user requirements, a display panel of an electronic device becomes larger, and there are more types of display panels, for example, a bendable display panel, a curlable display panel, and a foldable display panel, so as to provide more abundant information for a user, and bring better use experience to the user.

To adapt to features of the foregoing increasingly larger display panel and different types of display panels, with reference to user requirements, currently, in some electronic devices, the display panel is divided into corresponding display areas. For example, the different display areas may display different image content. For another example, some display areas may display an image, and some display areas may not display an image. This greatly enriches the use effect of an electronic device.

Although display content starts to gradually tend to be displayed by different areas, processing of image data displayed by the different areas and various display-panel-related work such as driving, power supplying, and data transmission is still performed in a manner consistent with image display of a complete area, that is, processing and transmission of image data of the entire display panel is performed together. Correspondingly, it is ensured that control modules of display-panel-related functions such as display and touch also work together. Therefore, in the foregoing use scenario in which some display areas display an image and some display areas do not display an image, an existing processing manner is to generally output a black image to the display areas that do not display an image, to create a visual experience that no image is displayed. However, it can be understood that the image is still displayed in full-screen mode in essence. Only some images are replaced with the black image, and this causes an illusion that "no image is displayed". For processing of data of the displayed image and control of each function control module, there is no difference from the image display of the complete area. In this case, an area that does not appear to display an image is actually still displaying an image (a black image). This means that image processing, display driving, power supplying, data transmission, and the like still need to be performed for the area, and drive control of related functions, such as touch and fingerprint, with which a display panel can be equipped is also still being performed. Therefore, in this case, although some display areas are already unavailable or cannot be actually used, the display areas still have high power consumption. This reduces standby time of an electronic device.

SUMMARY

Embodiments of this application provide a drive control method and a related device for a display panel that has different display areas. Time-divided drive control is performed on pixel scan circuits corresponding to the different display areas, so that in a scenario in which some display areas do not need to display an image, a pixel scan circuit may be left idle for some time, to reduce power consumption required by the pixel scan circuits for scanning pixels in this time period. In addition, according to the method provided in the embodiments of this application, time-divided drive control is further performed on touch scan circuits and fingerprint scan circuits corresponding to the different display areas, independent power supplying is further used for pixels in the different display areas, and some functions of a display driver are enabled in a time-divided manner. In this way, power consumption required for various work in the scenario in which some display areas do not need to display an image is further reduced.

According to a first aspect, an embodiment of this application provides a display module, including the display panel and a display driver, where the display panel includes a first pixel scan circuit and a second pixel scan circuit, where the first pixel scan circuit is configured to drive pixels in a first area on the display panel to convert electrical signals into optical signals, and the second pixel scan circuit is configured to drive pixels in a second area on the display panel to convert electrical signals into optical signals. The first pixel scan circuit and the second pixel scan circuit may be controlled independently, and the two circuits are electrically separated from each other. For example, when the first pixel scan circuit works, the second pixel scan circuit may not work, and the first pixel scan circuit and the second pixel scan circuit do not affect each other. The display driver is configured to generate different display drive signals in different time periods, where a first display drive signal may trigger the first pixel scan circuit to work, and a second display drive signal may trigger the second pixel scan circuit to work. Generating the different display drive signals in the different time periods may control the first pixel scan circuit and the second pixel scan circuit to be in a working state in the different time periods, that is, may control working time periods of the first pixel scan circuit and the second pixel scan circuit.

In the foregoing solution, the display panel includes the two different display areas, and the pixels in the two display areas are scanned and driven by the two pixel scan circuits that are independent of each other. Because the two pixel scan circuits are independent of each other and controllable, the display driver can independently control the two pixel scan circuits to work or not to work in different time periods. Based on this, in an implementation scenario in which the first area of the display panel needs to display an image but the second area does not need to display an image, the display driver may control, in a time period, the second pixel scan circuit corresponding to the second area not to work, so that in the time period, the second pixel scan circuit does not need to scan and drive the pixels in the second area. Therefore, compared with an original solution that is in an existing technology and in which full-screen pixels are scanned and driven in all time periods and in all areas, power consumption required for the second pixel scan circuit to work in a period of time can be reduced.

In a possible implementation, the display driver is specifically configured to output a first display drive signal and a second display drive signal, where the first display drive signal controls the first pixel scan circuit to be in a working state in a first time period to drive the pixels in the first area, the second display drive signal controls the second pixel scan circuit to be in a working state in a second time period to drive the pixels in the second area, and the first time period and the second time period are periodically cyclic. A cyclic cycle may be one frame, to be specific, the first time period and the second time period are polled in each frame.

In the foregoing solution, the display driver allocates corresponding time resources, namely, the first time period and the second time period, to the pixel scan circuits corresponding to the first area and the second area, controls, in the first time period, the first pixel scan circuit to work, and controls, in the second time period, the second pixel scan circuit to work, so that when different display areas all need to display an image, display control is performed in a manner of time-divided and area-divided driving.

In a possible implementation, the display driver is further configured to: in a specific cycle, skip outputting the second display drive signal in the second time period, where the first time period and the second time period are periodically cyclic in the specific cycle. The specific cycle refers to a time period in which some display areas need to be screen-off or are indicated to be screen-off, and may be specifically a period of time in which an electronic device is in a state in which the first area needs to display an image but the second area does not need to display an image. When the display driver learns that the electronic device changes from full-screen display to a display requirement that the second area does not need to display an image, the display driver may enter the specific cycle. When the display driver learns that the electronic device changes from a case in which the second area does not need to display an image to a case in which the second area needs to display an image, the display driver may end the specific cycle. Further, a manner in which the display driver learns of the display requirements of the different areas may be receiving indication information sent by a processor.

In a possible implementation, the display driver is further configured to: after obtaining requirement indication information indicating the second area to be screen-off, skip outputting the second display drive signal in the second time period; and after obtaining requirement indication information indicating the second area to perform display, output the second display drive signal in the second time period.

In a possible implementation, the display driver is further configured to: in response to instructions instructing the second area to be screen-off, stop outputting the second display drive signal in the second time period in screen-off time of the second area.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit not to work (that is, does not output the second display drive signal), so that when the second area does not need to display an image, power consumption required by the second pixel scan circuit to scan and drive the pixels in the second area in the second time period can be reduced.

In a possible implementation, the display driver is further configured to: in a specific cycle, output the first display drive signal in both the first time period and the second time period, where the first time period and the second time period are periodically cyclic in the specific cycle.

In the foregoing solution, the display driver allocates the corresponding time resources, namely, the first time period and the second time period, to the pixel scan circuits corresponding to the first area and the second area, controls, in the first time period, the first pixel scan circuit to work, and still controls, in the second time period, the first pixel scan circuit to work, so that in a case in which the second area does not need to display an image, the power consumption originally required for scanning the pixels in the second area is used to refresh and scan the pixels in the first area for a plurality of times, to be specific, the pixels in the first area is originally scanned once in one frame, but in this solution, the pixels in the first area may be scanned twice in one frame, so as to increase a display scan frequency of the first area, improve display picture quality of the first area, and provide better use experience for a scenario such as a game.

In a possible implementation, the display driver is further configured to: provide pixel data signals to the display panel, and send the pixel data signals in both a first time period and a second time period, where the first time period and the second time period are periodically cyclic, and the pixel data signals are used to indicate content displayed by pixels on the display panel.

In a possible implementation, the display driver is further configured to: in a specific cycle, send pixel data signals to the display panel in a first time period, and skip sending pixel data signals in a second time period. The pixel data signals are used to indicate content displayed by pixels on the display panel. The displayed content can be finally presented only when the pixel data signals cooperate with scanning of a pixel scan circuit. The first time period and the second time period are periodically cyclic in the specific cycle.

In the foregoing solution, the display driver allocates corresponding time resources for sending the pixel data signals corresponding to the first area and the second area. When the second area does not need to display an image, the display driver may not send pixel data signals in the second time period, so that power consumption for sending the pixel data signals in the second time period can be reduced.

In a possible implementation, the display driver is configured to: in a specific cycle, generate pixel data signals in the first time period, and skip generating pixel data signals in the second time period, where the first time period and the second time period are periodically cyclic in the specific cycle.

In the foregoing solution, the display driver allocates corresponding time resources for generating the pixel data signals corresponding to the first area and the second area. When the second area does not need to display an image, the display driver may not generate pixel data signals in the second time period, so that power consumption for processing and generating the pixel data signals in the second time period can be reduced.

In a possible implementation, the display driver is configured to: receive image data of the display panel that is sent by a processor, receive image data of the first area in the first time period, and receive image data of the second area in the second time period, where the image data is used to generate pixel data signals that indicate the content displayed by the pixels on the display panel.

In a possible implementation, the display driver is configured to: in a specific cycle, receive, in the first time period, image data of the display panel that is sent by a processor, and skip receiving, in the second time period, image data of the display panel that is sent by the processor, where the first time period and the second time period are periodically cyclic in the specific cycle.

In the foregoing solution, the display driver allocates corresponding time resources for receiving the image data corresponding to the first area and the second area. When the second area does not need to display an image, the display driver may not receive, in the second time period, the image data sent by the processor, so that power consumption for receiving image data in the second time period can be reduced.

According to a second aspect, an embodiment of this application provides a processor. The processor is configured to: obtain display requirements of different areas of a display, and determine, based on the display requirements, time resources for sending image data of the different areas to a display driver, where the time resources include a first time period and a second time period, and the first time period and the second time period are periodically cyclic. A cyclic cycle may be one frame, to be specific, the first time period and the second time period are polled in each frame. The display requirements are used to indicate whether the different areas need to display an image.

In the foregoing solution, the processor may allocate the different time resources to send the image data of the different areas based on the display requirements of the different areas, so as to implement time-divided control on a function of transmission of the image data of the different display areas. Based on this, in an implementation scenario in which a first area of the display panel needs to display an image but a second area does not need to display an image, the processor may send image data in the first time period, and does not send image data in the second time period. Therefore, compared with an original solution that is in an existing technology and in which image data is sent in all time periods, power consumption required for image data transmission work in the second time period can be reduced.

In a possible implementation, the processor is further configured to: send image data of a first area of the display to the display driver in the first time period, and send image data of a second area of the display to the display driver in the second time period, where the first time period corresponds to time during which the display driver drives the first area of the display, and the second time period corresponds to time during which the display driver drives the second area of the display.

In the foregoing solution, the processor allocates the corresponding time resources, namely, the first time period and the second time period, for image data transmission corresponding to the first area and the second area, so that when the different display areas all need to display an image, display control may be performed in a manner of time-divided and area-divided driving.

In a possible implementation, the processor is further configured to: send image data of a first area of the display to the display driver in the first time period, and skip sending image data of a second area of the display to the display driver in the second time period, where the first time period corresponds to time during which the display driver drives the first area of the display, and the second time period corresponds to time during which the display driver drives the second area of the display.

In the foregoing solution, the processor allocates the corresponding time resources, namely, the first time period and the second time period, for the image data transmission corresponding to the first area and the second area, sends the image data of the first area of the display to the display driver in the first time period, and sends the image data of the second area of the display to the display driver in the second time period, so that when the second area does not need to display an image, power consumption required by the processor to send image data to the display driver in the second time period can be reduced.

In a possible implementation, the processor is further configured to send first indication information to at least one of the display driver, a power supply, a touch driver, and a fingerprint sensing driver, where the first indication information is used to indicate the display requirements of the different areas of the display.

In the foregoing solution, after learning of the display requirements of the different areas, the processor may notify the at least one of the display driver, the power supply, the touch driver, and the fingerprint sensing driver, so that each of the foregoing modules may also correspondingly perform time-divided and area-divided drive control based on the display requirements of the different areas, to save more power.

In a possible implementation, the processor is further configured to: obtain a status of an electronic device, and determine the display requirements of the different areas of the display based on the status of the electronic device. The status of the electronic device may be a folded state or an expanded state, a one-hand operation state or a normal operation state, a curved-surface display state or a non-curved-surface display state, or the like.

In the foregoing solution, the processor may determine, based on different statues of the electronic device, the display requirements of the different areas of the display in the status, to adjust an image data transmission manner of the processor, and further indicate another module to adjust a drive control manner, so as to reduce power consumption.

According to a third aspect, an embodiment of this application provides an electronic device, including a display and a processor, where
  the display includes a display panel and a display driver;
  the display panel includes a first pixel scan circuit and a second pixel scan circuit, where the first pixel scan circuit is configured to drive pixels in a first area on the display panel to convert electrical signals into optical signals, and the second pixel scan circuit is configured to drive pixels in a second area on the display panel to convert electrical signals into optical signals;
  the display driver is configured to generate different display drive signals to respectively control working time periods of the first pixel scan circuit and the second pixel scan circuit; and
  the processor is configured to: obtain display requirements of different areas of the display, and determine, based on the display requirements, time resources for sending image data of the different areas to the display driver, where the time resources include a first time period and a second time period, and the first time period and the second time period are periodically cyclic.

In the foregoing solution, the display panel includes the two different display areas, and the pixels in the two display areas are scanned and driven by the two pixel scan circuits that are independent of each other. Because the two pixel scan circuits are independent of each other and controllable, the display driver can independently control the two pixel scan circuits to work or not to work in different time periods. The processor may allocate the different time resources to send the image data of the different areas based on the display requirements of the different areas, so as to implement time-divided control on a function of transmission of the image data of the different display areas. Based on this, in an implementation scenario in which the first area of the display panel needs to display an image but the second area does not need to display an image, the display driver may control, in a time period, the second pixel scan circuit corresponding to the second area not to work, so that in the time period, the second pixel scan circuit does not need to scan and drive the pixels in the second area. Therefore, compared with an original solution that is in an existing technology and in which full-screen pixels are scanned and driven in all time periods and in all areas, power consumption required for the second pixel scan circuit to work in a period of time can be reduced. The processor may send image data in the first time period, and does not send image data in the second time period. Therefore, compared with an original solution that is in the existing technology and in which image data is sent in all time periods, power consumption required for image data transmission work in the second time period can be reduced.

In a possible implementation, the display driver is specifically configured to output a first display drive signal and a second display drive signal, where the first display drive signal controls the first pixel scan circuit to be in a working state in the first time period to drive the pixels in the first area, the second display drive signal controls the second pixel scan circuit to be in a working state in the second time period to drive the pixels in the second area, and the first time period and the second time period are periodically cyclic.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit to work, so that when different display areas all need to display an image, display control is performed in a manner of time-divided and area-divided driving. In a possible implementation, the display driver is specifically configured to output a first display drive signal and a second display drive signal, where the first display drive signal controls the first pixel scan circuit to be in a working state in the first time period to drive the pixels in the first area, the second display drive signal controls the second pixel scan circuit to be in a working state in the second time period to drive the pixels in the second area, and the first time period and the second time period are periodically cyclic. A cyclic cycle may be one frame, to be specific, the first time period and the second time period are polled in each frame.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit to work, so that when different display areas all need to display an image, display control is performed in a manner of time-divided and area-divided driving.

In a possible implementation, the display driver is further configured to: in a specific cycle, skip outputting the second display drive signal in the second time period, where the first time period and the second time period are periodically cyclic in the specific cycle. The specific cycle may be specifically a period of time in which an electronic device is in a state in which the first area needs to display an image but the second area does not need to display an image. When the display driver learns that the electronic device changes from full-screen display to a display requirement that the second area does not need to display an image, the display driver may enter the specific cycle. When the display driver learns that the electronic device changes from a case in which the second area does not need to display an image to another display requirement, the display driver may end the specific cycle. Further, a manner in which the display driver learns of the display requirements of the different areas may be receiving indication information sent by the processor.

In a possible implementation, the display driver is further configured to: after obtaining requirement indication information indicating the second area to be screen-off, skip outputting the second display drive signal in the second time period; and after obtaining requirement indication information indicating the second area to perform display, output the second display drive signal in the second time period.

In a possible implementation, the display driver is further configured to: in response to instructions instructing the second area to be screen-off, stop outputting the second display drive signal in the second time period in screen-off time of the second area.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit not to work (that is, does not output the second display drive signal), so that when the second area does not need to display an image, power consumption required by the second pixel scan circuit to scan and drive the pixels in the second area in the second time period can be reduced.

In a possible implementation, the display driver is further configured to: in a specific cycle, output the first display drive signal in both the first time period and the second time period, where the first time period and the second time period are periodically cyclic in the specific cycle.

In the foregoing solution, the display driver allocates the corresponding time resources, namely, the first time period and the second time period, to the pixel scan circuits corresponding to the first area and the second area, controls, in the first time period, the first pixel scan circuit to work, and still controls, in the second time period, the first pixel scan circuit to work, so that in a case in which the second area does not need to display an image, the power consumption originally required for scanning the pixels in the second area is used to refresh and scan the pixels in the first area for a plurality of times, to be specific, the pixels in the first area is originally scanned once in one frame, but in this solution, the pixels in the first area may be scanned twice in one frame, so as to increase a display scan frequency of the first area, improve display picture quality of the first area, and provide better use experience for a scenario such as a game.

In a possible implementation, the display driver is further configured to: provide pixel data signals to the display panel, and send the pixel data signals in both the first time period and the second time period, where the first time period and the second time period are periodically cyclic, and the pixel data signals are used to indicate content displayed by pixels on the display panel.

In a possible implementation, the display driver is further configured to: in a specific cycle, send pixel data signals to the display panel in the first time period, and skip sending pixel data signals in the second time period. The pixel data signals are used to indicate content displayed by pixels on the display panel. The displayed content can be finally presented only when the pixel data signals cooperate with scanning of a pixel scan circuit. The first time period and the second time period are periodically cyclic in the specific cycle.

In the foregoing solution, the display driver allocates the corresponding time resources for sending the pixel data signals corresponding to the first area and the second area. When the second area does not need to display an image, the display driver may not send pixel data signals in the second time period, so that power consumption for sending the pixel data signals in the second time period can be reduced.

In a possible implementation, the display driver is configured to: in a specific cycle, generate pixel data signals in the first time period, and skip generating pixel data signals in the second time period, where the first time period and the second time period are periodically cyclic in the specific cycle.

In the foregoing solution, the display driver allocates the corresponding time resources for generating the pixel data signals corresponding to the first area and the second area. When the second area does not need to display an image, the display driver may not generate pixel data signals in the second time period, so that power consumption for processing and generating the pixel data signals in the second time period can be reduced.

In a possible implementation, the display driver is configured to: receive image data of the display panel that is sent by a processor, receive image data of the first area in the first time period, and receive image data of the second area in the second time period, where the image data is used to generate pixel data signals that indicate the content displayed by the pixels on the display panel.

In a possible implementation, the display driver is configured to: in a specific cycle, receive, in the first time period, image data of the display panel that is sent by a processor, and skip receiving, in the second time period, image data of the display panel that is sent by the processor, where the first time period and the second time period are periodically cyclic in the specific cycle.

In the foregoing solution, the display driver allocates the corresponding time resources for receiving the image data corresponding to the first area and the second area. When the second area does not need to display an image, the display driver may not receive, in the second time period, the image data sent by the processor, so that power consumption for receiving image data in the second time period can be reduced.

In a possible implementation, the processor is further configured to: send image data of the first area of the display to the display driver in the first time period, and send image data of the second area of the display to the display driver in the second time period, where the first time period corresponds to time during which the display driver drives the first area of the display, and the second time period corresponds to time during which the display driver drives the second area of the display.

In the foregoing solution, the processor allocates the corresponding time resources, namely, the first time period and the second time period, for image data transmission corresponding to the first area and the second area, so that when the different display areas all need to display an image, display control may be performed in a manner of time-divided and area-divided driving.

In a possible implementation, the processor is further configured to: send image data of the first area of the display to the display driver in the first time period, and skip sending image data of the second area of the display to the display driver in the second time period, where the first time period corresponds to time during which the display driver drives the first area of the display, and the second time period corresponds to time during which the display driver drives the second area of the display.

In the foregoing solution, the processor allocates the corresponding time resources, namely, the first time period and the second time period, for the image data transmission corresponding to the first area and the second area, sends the image data of the first area of the display to the display driver in the first time period, and sends the image data of the second area of the display to the display driver in the second time period, so that when the second area does not need to display an image, power consumption required by the processor to send image data to the display driver in the second time period can be reduced.

In a possible implementation, the processor is further configured to send first indication information to at least one of the display driver, a power supply, a touch driver, and a fingerprint sensing driver, where the first indication information is used to indicate the display requirements of the different areas of the display.

In the foregoing solution, after learning of the display requirements of the different areas, the processor may notify the at least one of the display driver, the power supply, the touch driver, and the fingerprint sensing driver, so that each of the foregoing modules may also correspondingly perform time-divided and area-divided drive control based on the display requirements of the different areas, to save more power.

In a possible implementation, the processor is further configured to: obtain a status of an electronic device, and determine the display requirements of the different areas of the display based on the status of the electronic device. The status of the electronic device may be a folded state or an expanded state, a one-hand operation state or a normal operation state, a curved-surface display state or a non-curved-surface display state, or the like.

In the foregoing solution, the processor may determine, based on different statues of the electronic device, the display requirements of the different areas of the display in the status, to adjust an image data transmission manner of the processor, and further indicate another module to adjust a drive control manner, so as to reduce power consumption.

In a possible implementation, a touch module is further included. The touch module includes a first touch scan circuit, a second touch scan circuit, and a touch driver. The first touch scan circuit and the second touch scan circuit are integrated on the display panel. The first touch scan circuit is configured to drive touch sensors of the first area on the display panel, and the second touch scan circuit is configured to drive touch sensors of the second area on the display panel.

The touch driver is configured to control the working time periods of the first touch scan circuit and the second touch scan circuit based on display requirements of the first area and the second area.

In the foregoing solution, the display panel includes the two different display areas, and the touch sensors of the two display areas are respectively scanned and driven by the first touch scan circuit and the second touch scan circuit. Because the two touch scan circuits can be independently controlled, the touch driver can independently control, in different time periods, the two touch scan circuits to work or not to work. Based on this, in an implementation scenario in which the first area of the display panel needs to display an image but the second area does not need to display an image, touch signal monitoring may also no longer be performed in an area that displays no image. In this case, the touch driver may control, in a time period, the second touch scan circuit corresponding to the second area not to work, so that the second touch scan circuit does not need to scan and drive the touch sensors of the second area in the time period. Therefore, compared with an original solution that is in an existing technology and in which full-screen touch sensors are scanned and driven in all time periods and in all areas, power consumption required for the second touch scan circuit to work in a period of time can be reduced.

In a possible implementation, the touch driver is specifically configured to: in a specific cycle, output touch drive signals to the first touch scan circuit in a third time period to drive the touch sensors of the first area, and skip outputting touch drive signals in a fourth time period, where the third time period and the fourth time period are periodically cyclic in the specific cycle. The specific cycle may be specifically a period of time in which an electronic device is in a state in which the first area needs to display an image but the second area does not need to display an image. When the touch driver learns that the electronic device changes from full-screen display to a display requirement that the second area does not need to display an image, the touch driver may enter the specific cycle. When the touch driver learns that the electronic device changes from a case in which the second area does not need to display an image to another display requirement, the touch driver may end the specific cycle. Further, a manner in which the touch driver learns of the display requirements of the different areas may be receiving indication information sent by the processor.

In a possible implementation, the touch driver is further configured to: after obtaining requirement indication information indicating the second area to be screen-off, skip outputting the touch drive signals in the fourth time period; and after obtaining requirement indication information indicating the second area to perform display, output the touch drive signals in the fourth time period.

In a possible implementation, the display driver is further configured to: in response to instructions instructing the second area to be screen-off, stop outputting the touch drive signals in the fourth time period in screen-off time of the second area.

In the foregoing solution, the touch driver allocates the corresponding time resources, namely, the third time period and the fourth time period, to the touch scan circuits corresponding to the first area and the second area, controls, in the third time period, the first touch scan circuit to work, and controls, in the fourth time period, the second touch scan circuit not to work (that is, not to output a touch drive signal), so that when the second area does not need to display an image, the touch signal monitoring is also no longer performed, and power consumption required by the second touch scan circuit to scan and drive the touch sensors of the second area in the fourth time period may also be reduced.

In a possible implementation, the touch driver is specifically configured to: in a specific cycle, output touch drive signals to the first touch scan circuit in both a third time period and a fourth time period to drive the touch sensors of the first area, where the third time period and the fourth time period are periodically cyclic in the specific cycle.

In the foregoing solution, the touch driver allocates the corresponding time resources, namely, the third time period and the fourth time period, to the touch scan circuits corresponding to the first area and the second area, controls, in the third time period, the first touch scan circuit to work, and still controls, in the fourth time period, the first touch scan circuit to work, so that when the second area does not need to display an image, the power consumption originally required for scanning the touch sensors of the second area is used to refresh and scan the touch sensors of the first area for a plurality of times, to be specific, the touch sensors of the first area is originally scanned once in one frame, but in this solution, the touch sensors of the first area may be scanned twice in one frame, so as to increase a touch scan frequency of the first area, improve touch sensing sensitivity of the first area, and provide better use experience for a scenario such as a game.

In a possible implementation, the first touch scan circuit and the second touch scan circuit are electrically separated from each other.

When the touch scan circuit is in a mutual-capacitance design, if vertical division is used for the first area and the second area, that is, a division line between the first area and the second area is parallel to a scanning direction of vertical scan lines of the touch scan circuits, the touch sensors of the two display areas cannot be independently controlled in a time-divided manner even if each touch scan line performs independent control. Therefore, in this case, the first touch scan circuit and the second touch scan circuit need to be electrically separated from each other, so that the first touch scan circuit and the second touch scan circuit may be controlled independently without affecting each other.

In a possible implementation, the touch module is further configured to receive first indication information sent by the processor, where the first indication information is used to indicate the display requirements of the first area and the second area.

In a possible implementation, a fingerprint module is further included. The fingerprint module includes a first fingerprint scan circuit, a second fingerprint scan circuit, and a fingerprint driver. The first fingerprint scan circuit and the second fingerprint scan circuit are integrated on the display panel. The first fingerprint scan circuit is configured to drive fingerprint sensors of the first area on the display panel, and the second fingerprint scan circuit is configured to drive fingerprint sensors of the second area on the display panel.

The fingerprint driver is configured to control working time periods of the first fingerprint scan circuit and the second fingerprint scan circuit based on display requirements of the first area and the second area.

In the foregoing solution, the display panel includes the two different display areas, and the fingerprint sensors of the two display areas are respectively scanned and driven by the first fingerprint scan circuit and the second fingerprint scan circuit. Because the two fingerprint scan circuits can be independently controlled, the fingerprint driver can independently control, in different time periods, the two fingerprint scan circuits to work or not to work. Based on this, in an implementation scenario in which the first area of the display panel needs to display an image but the second area does not need to display an image, fingerprint signal monitoring may also no longer be performed in an area that displays no image. In this case, the fingerprint driver may control, in a time period, the second fingerprint scan circuit corresponding to the second area not to work, so that the second fingerprint scan circuit does not need to scan and drive the fingerprint sensors of the second area in the time period. Therefore, compared with an original solution that is in an existing technology and in which full-screen fingerprint sensors are scanned and driven in all time periods and in all areas (or a specified area in all the areas), power consumption required for the second fingerprint scan circuit to work in a period of time can be reduced.

In a possible implementation, the fingerprint driver is specifically configured to: in a specific cycle, output fingerprint drive signals to the first fingerprint scan circuit in a fifth time period to drive the fingerprint sensors of the first area, and skip outputting fingerprint drive signals in a sixth time period, where the fifth time period and the sixth time period are periodically cyclic in the specific cycle. The specific cycle may be specifically a period of time in which an electronic device is in a state in which the first area needs to display an image but the second area does not need to display an image. When the fingerprint driver learns that the electronic device changes from full-screen display to a display requirement that the second area does not need to display an image, the fingerprint driver may enter the specific cycle. When the fingerprint driver learns that the electronic device changes from a case in which the second area does not need to display an image to another display requirement, the fingerprint driver may end the specific cycle. Further, a manner in which the fingerprint driver learns of the display requirements of the different areas may be receiving indication information sent by the processor.

In a possible implementation, the fingerprint driver is further configured to: after obtaining requirement indication information indicating the second area to be screen-off, skip outputting the fingerprint drive signals in the sixth time period; and after obtaining requirement indication information indicating the second area to perform display, output the fingerprint drive signals in the sixth time period.

In a possible implementation, the fingerprint driver is further configured to: in response to instructions instructing the second area to be screen-off, stop outputting the fingerprint drive signals in the sixth time period in screen-off time of the second area.

In the foregoing solution, the fingerprint driver allocates the corresponding time resources, namely, the fifth time period and the sixth time period, to the fingerprint scan circuits corresponding to the first area and the second area, controls, in the fifth time period, the first fingerprint scan circuit to work, and controls, in the sixth time period, the second fingerprint scan circuit not to work (that is, not to output a fingerprint drive signal), so that when the second area does not need to display an image, the fingerprint signal monitoring is also no longer performed, and power consumption required by the second fingerprint scan circuit to scan and drive the fingerprint sensors of the second area in the sixth time period may also be reduced.

In a possible implementation, the fingerprint driver is specifically configured to: in a specific cycle, output fingerprint drive signals to the first fingerprint scan circuit in both a fifth time period and a sixth time period to drive the fingerprint sensors of the first area, where the fifth time period and the sixth time period are periodically cyclic in the specific cycle.

In the foregoing solution, the fingerprint driver allocates the corresponding time resources, namely, the fifth time period and the sixth time period, to the fingerprint scan circuits corresponding to the first area and the second area, controls, in the fifth time period, the first fingerprint scan circuit to work, and still controls, in the sixth time period, the first fingerprint scan circuit to work, so that when the second area does not need to display an image, the power consumption originally required for scanning the fingerprint sensors of the second area is used to refresh and scan the fingerprint sensors of the first area for a plurality of times, to be specific, the fingerprint sensors of the first area is originally scanned once in one frame, but in this solution, the fingerprint sensors of the first area may be scanned twice in one frame, so as to increase a fingerprint scan frequency of the first area, improve fingerprint sensing sensitivity of the first area, and provide better use experience for a scenario such as a game.

In a possible implementation, the first fingerprint scan circuit and the second fingerprint scan circuit are electrically separated from each other.

In a possible implementation, the touch module is further configured to receive first indication information sent by the processor, where the first indication information is used to indicate the display requirements of the first area and the second area.

In a possible implementation, a power supply module is further included, where
    the power supply module is configured to perform independent power supplying control on pixels in the first area and the second area.

According to a fourth aspect, an embodiment of this application provides a drive control system, used in an electronic device having a display panel, where the drive control system includes
    the display panel and the display driver, where the display panel includes at least two display areas, each display area has a corresponding pixel scan circuit, the pixel scan circuits are electrically separated from each other, and each pixel scan circuit is configured to drive pixels in a corresponding display area; and
    the display driver includes a scan control circuit, the scan control circuit is connected to the pixel scan circuit corresponding to each display area, and the scan control circuit is configured to perform independent scan and drive control on the pixel scan circuit corresponding to each display area.

In the foregoing solution, the display panel includes two different display areas, and pixels in the two display areas are scanned and driven by two pixel scan circuits that are independent of each other. Because the two pixel scan circuits are independent of each other and controllable, the display driver can independently control the two pixel scan circuits to work or not to work in different time periods. Based on this, in an implementation scenario in which the first area of the display panel needs to display an image but the second area does not need to display an image, the display driver may control, in a time period, the second pixel scan circuit corresponding to the second area not to work, so that in the time period, the second pixel scan circuit does not need to scan and drive the pixels in the second area. Therefore, compared with an original solution that is in an existing technology and in which full-screen pixels are scanned and driven in all time periods and in all areas, power consumption required for the second pixel scan circuit to work in a period of time can be reduced.

In a possible implementation, the system further includes a power supply module. The power supply module is connected to pixels in each display area. The power supply module is configured to perform independent power supplying control on the pixels in each display area.

In the foregoing solution, the power supply module may independently supply power to the pixels in each display area. Based on this, in an implementation scenario in which the first area of the display panel needs to display an image but the second area does not need to display an image, the power supply module may not supply power to pixels in the second area, so as to save some power.

According to a fifth aspect, an embodiment of this application provides a drive control method, applied to an electronic device having a display panel, where the method includes:

obtaining, by a display driver, display requirements of a first area and a second area on the display panel, where the display requirements are used to indicate whether the first area and the second area need to display an image; and generating, by the display driver, different display drive signals based on the display requirements of the first area and the second area, to respectively control working time periods of a first pixel scan circuit and a second pixel scan circuit, where the first pixel scan circuit is configured to drive pixels in the first area on the display panel to convert electrical signals into optical signals, and the second pixel scan circuit is configured to drive pixels in the second area on the display panel to convert electrical signals into optical signals.

In the foregoing solution, the display panel includes the two different display areas, and the pixels in the two display areas are scanned and driven by the two pixel scan circuits that are independent of each other. Because the two pixel scan circuits are independent of each other and controllable, the display driver can independently control the two pixel scan circuits to work or not to work in different time periods. Based on this, the display driver may control, based on the display requirements of the two areas, the time periods in which the first pixel scan circuit and the second pixel scan circuit are in a working state. In an implementation scenario in which the first area of the display panel needs to display an image but the second area does not need to display an image, the display driver may control, in a time period, the second pixel scan circuit corresponding to the second area not to work, so that in the time period, the second pixel scan circuit does not need to scan and drive the pixels in the second area. Therefore, compared with an original solution that is in an existing technology and in which full-screen pixels are scanned and driven in all time periods and in all areas, power consumption required for the second pixel scan circuit to work in a period of time can be reduced.

In a possible implementation, when the display requirements of the first area and the second area are both displaying an image, the display driver outputs a first display drive signal to the first pixel scan circuit in a first time period, to control the first pixel scan circuit to drive the pixels in the first area in the first time period, and outputs a second display drive signal to the second pixel scan circuit in a second time period, to control the second pixel scan circuit to drive the pixels in the second area in the second time period, where the first time period and the second time period are periodically cyclic.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit to work, so that when different display areas all need to display an image, display control is performed in a manner of time-divided and area-divided driving.

In a possible implementation, the method further includes:

when the display requirement of the first area is displaying an image and the display requirement of the second area is displaying no image, outputting, by the display driver, the first display drive signal to the first pixel scan circuit in the first time period, to control the first pixel scan circuit to drive the pixels in the first area in the first time period, and skipping outputting the second display drive signal to the second pixel scan circuit in the second time period, to control the second pixel scan circuit not to drive the pixels in the second area in the second time period.

In the foregoing solution, the display driver allocates the corresponding time resources, namely, the first time period and the second time period, to the pixel scan circuits corresponding to the first area and the second area, controls, in the first time period, the first pixel scan circuit to work, and controls, in the second time period, the second pixel scan circuit not to work (that is, does not output the second display drive signal), so that when the second area does not need to display an image, power consumption required by the second pixel scan circuit to scan and drive the pixels in the second area in the second time period can be reduced.

In a possible implementation, the method further includes:

when the display requirement of the first area is displaying an image and the display requirement of the second area is displaying no image, outputting, by the display driver, the first display drive signal to the first pixel scan circuit in both the first time period and the second time period, to control the first pixel scan circuit to drive the pixels in the first area in the first time period and the second time period respectively.

In the foregoing solution, the display driver allocates the corresponding time resources, namely, the first time period and the second time period, to the pixel scan circuits corresponding to the first area and the second area, controls, in the first time period, the first pixel scan circuit to work, and still controls, in the second time period, the first pixel scan circuit to work, so that in a case in which the second area does not need to display an image, the power consumption originally required for scanning the pixels in the second area is used to refresh and scan the pixels in the first area for a plurality of times, to be specific, the pixels in the first area is originally scanned once in one frame, but in this solution, the pixels in the first area may be scanned twice in one frame, so as to increase a display scan frequency of the first area, improve display picture quality of the first area, and provide better use experience for a scenario such as a game.

In a possible implementation, the method further includes:

when the display requirement of the first area is displaying an image and the display requirement of the second area is displaying no image, sending pixel data signals in both a first time period and a second time period, where the first time period and the second time period are periodically cyclic, and the pixel data signals are used to indicate content displayed by pixels on the display panel.

In a possible implementation, the method further includes:
when the display requirement of the first area is displaying an image and the display requirement of the second area is displaying no image, sending, by the display driver, pixel data signals to the display panel in a first time period, and skipping sending pixel data signals in a second time period, where the pixel data signals are used to indicate content displayed by pixels on the display panel, and the first time period and the second time period are periodically cyclic.

In the foregoing solution, the display driver allocates corresponding time resources for sending the pixel data signals corresponding to the first area and the second area. When the second area does not need to display an image, the display driver may not send pixel data signals in the second time period, so that power consumption for sending the pixel data signals in the second time period can be reduced.

In a possible implementation, the method further includes:
when the display requirement of the first area is displaying an image and the display requirement of the second area is displaying no image, generating, by the display driver, the pixel data signals in the first time period, and skipping generating the pixel data signals in the second time period.

In the foregoing solution, the display driver allocates corresponding time resources for generating the pixel data signals corresponding to the first area and the second area. When the second area does not need to display an image, the display driver may not generate pixel data signals in the second time period, so that power consumption for processing and generating the pixel data signals in the second time period can be reduced.

In a possible implementation, the method further includes:
receiving, by the display driver in a first time period, image data of the first area that is sent by a processor, and receiving, in a second time period, image data of the second area that is sent by the processor, where the image data is used to generate pixel data signals that indicate the content displayed by the pixels on the display panel.

In a possible implementation, the method further includes:
when the display requirement of the first area is displaying an image and the display requirement of the second area is displaying no image, receiving, by the display driver in a first time period, image data of the display panel that is sent by a processor, and skipping receiving, in a second time period, image data of the display panel that is sent by the processor, where the first time period and the second time period are periodically cyclic.

In the foregoing solution, the display driver allocates corresponding time resources for receiving the image data corresponding to the first area and the second area. When the second area does not need to display an image, the display driver may not receive, in the second time period, the image data sent by the processor, so that power consumption for receiving image data in the second time period can be reduced.

According to a sixth aspect, an embodiment of this application provides a touch module. The touch module includes a first touch scan circuit, a second touch scan circuit, and a touch driver. The first touch scan circuit and the second touch scan circuit are integrated on the display panel. The first touch scan circuit is configured to drive touch sensors of the first area on the display panel, and the second touch scan circuit is configured to drive touch sensors of the second area on the display panel.

The touch driver is configured to control the working time periods of the first touch scan circuit and the second touch scan circuit based on display requirements of the first area and the second area.

In the foregoing solution, the display panel includes the two different display areas, and the touch sensors of the two display areas are respectively scanned and driven by the first touch scan circuit and the second touch scan circuit. Because the two touch scan circuits can be independently controlled, the touch driver can independently control, in different time periods, the two touch scan circuits to work or not to work. Based on this, in an implementation scenario in which the first area of the display panel needs to display an image but the second area does not need to display an image, touch signal monitoring may also no longer be performed in an area that displays no image. In this case, the touch driver may control, in a time period, the second touch scan circuit corresponding to the second area not to work, so that the second touch scan circuit does not need to scan and drive the touch sensors of the second area in the time period. Therefore, compared with an original solution that is in an existing technology and in which full-screen touch sensors are scanned and driven in all time periods and in all areas, power consumption required for the second touch scan circuit to work in a period of time can be reduced.

In a possible implementation, the touch driver is specifically configured to: in a specific cycle, output touch drive signals to the first touch scan circuit in a first time period to drive the touch sensors of the first area, and skip outputting touch drive signals in a second time period, where the first time period and the second time period are periodically cyclic in the specific cycle. The specific cycle may be specifically a period of time in which an electronic device is in a state in which the first area needs to display an image but the second area does not need to display an image. When the touch driver learns that the electronic device changes from full-screen display to a display requirement that the second area does not need to display an image, the touch driver may enter the specific cycle. When the touch driver learns that the electronic device changes from a case in which the second area does not need to display an image to another display requirement, the touch driver may end the specific cycle. Further, a manner in which the touch driver learns of the display requirements of the different areas may be receiving indication information sent by a processor.

In a possible implementation, the touch driver is further configured to: after obtaining requirement indication information indicating the second area to be screen-off, skip outputting the touch drive signals in the second time period; and after obtaining requirement indication information indicating the second area to perform display, output the touch drive signals in the second time period.

In a possible implementation, the display driver is further configured to: in response to instructions instructing the second area to be screen-off, stop outputting the touch drive signals in the second time period in screen-off time of the second area.

In the foregoing solution, the touch driver allocates corresponding time resources, namely, the first time period and the second time period, to the touch scan circuits corresponding to the first area and the second area, controls, in the first time period, the first touch scan circuit to work, and controls, in the second time period, the second touch scan circuit not to work (that is, not to output a touch drive signal), so that when the second area does not need to display an image, the touch signal monitoring is also no longer performed, and power consumption required by the second touch scan circuit to scan and drive the touch sensors of the second area in the second time period may also be reduced.

In a possible implementation, the touch driver is specifically configured to: in a specific cycle, output touch drive signals to the first touch scan circuit in both a first time period and a second time period to drive the touch sensors of the first area, where the first time period and the second time period are periodically cyclic in the specific cycle.

In the foregoing solution, the touch driver allocates corresponding time resources, namely, the first time period and the second time period, to the touch scan circuits corresponding to the first area and the second area, controls, in the first time period, the first touch scan circuit to work, and still controls, in the second time period, the first touch scan circuit to work, so that when the second area does not need to display an image, the power consumption originally required for scanning the touch sensors of the second area is used to refresh and scan the touch sensors of the first area for a plurality of times, to be specific, the touch sensors of the first area are originally scanned once in one frame, but in this solution, the touch sensors of the first area may be scanned twice in one frame, so as to increase a touch scan frequency of the first area, improve touch sensing sensitivity of the first area, and provide better use experience for a scenario such as a game.

In a possible implementation, the first touch scan circuit and the second touch scan circuit are electrically separated from each other.

When the touch scan circuit is in a mutual-capacitance design, if vertical division is used for the first area and the second area, that is, a division line between the first area and the second area is parallel to a scanning direction of vertical scan lines of the touch scan circuits, the touch sensors of the two display areas cannot be independently controlled in a time-divided manner even if each touch scan line performs independent control. Therefore, in this case, the first touch scan circuit and the second touch scan circuit need to be electrically separated from each other, so that the first touch scan circuit and the second touch scan circuit may be controlled independently without affecting each other.

In a possible implementation, the touch module is further configured to receive first indication information sent by the processor, where the first indication information is used to indicate the display requirements of the first area and the second area.

According to a seventh aspect, an embodiment of this application provides a fingerprint module. The fingerprint module includes a first fingerprint scan circuit, a second fingerprint scan circuit, and a fingerprint driver. The first fingerprint scan circuit and the second fingerprint scan circuit are integrated on the display panel. The first fingerprint scan circuit is configured to drive fingerprint sensors of the first area on the display panel, and the second fingerprint scan circuit is configured to drive fingerprint sensors of the second area on the display panel.

The fingerprint driver is configured to control working time periods of the first fingerprint scan circuit and the second fingerprint scan circuit based on display requirements of the first area and the second area.

In the foregoing solution, the display panel includes the two different display areas, and the fingerprint sensors of the two display areas are respectively scanned and driven by the first fingerprint scan circuit and the second fingerprint scan circuit. Because the two fingerprint scan circuits can be independently controlled, the fingerprint driver can independently control, in different time periods, the two fingerprint scan circuits to work or not to work. Based on this, in an implementation scenario in which the first area of the display panel needs to display an image but the second area does not need to display an image, fingerprint signal monitoring may also no longer be performed in an area that displays no image. In this case, the fingerprint driver may control, in a time period, the second fingerprint scan circuit corresponding to the second area not to work, so that the second fingerprint scan circuit does not need to scan and drive the fingerprint sensors of the second area in the time period. Therefore, compared with an original solution that is in an existing technology and in which full-screen fingerprint sensors are scanned and driven in all time periods and in all areas (or a specified area in all the areas), power consumption required for the second fingerprint scan circuit to work in a period of time can be reduced.

In a possible implementation, the fingerprint driver is specifically configured to: in a specific cycle, output fingerprint drive signals to the first fingerprint scan circuit in a first time period to drive the fingerprint sensors of the first area, and skip outputting fingerprint drive signals in a second time period, where the first time period and the second time period are periodically cyclic in the specific cycle. The specific cycle may be specifically a period of time in which an electronic device is in a state in which the first area needs to display an image but the second area does not need to display an image. When the fingerprint driver learns that the electronic device changes from full-screen display to a display requirement that the second area does not need to display an image, the fingerprint driver may enter the specific cycle. When the fingerprint driver learns that the electronic device changes from a case in which the second area does not need to display an image to another display requirement, the fingerprint driver may end the specific cycle. Further, a manner in which the fingerprint driver learns of the display requirements of the different areas may be receiving indication information sent by a processor.

In a possible implementation, the fingerprint driver is further configured to: after obtaining requirement indication information indicating the second area to be screen-off, skip outputting the fingerprint drive signals in the second time period; and after obtaining requirement indication information indicating the second area to perform display, output the fingerprint drive signals in the second time period.

In a possible implementation, the display driver is further configured to: in response to instructions instructing the second area to be screen-off, stop outputting the fingerprint drive signals in the second time period in screen-off time of the second area.

In the foregoing solution, the fingerprint driver allocates corresponding time resources, namely, the first time period and the second time period, to the fingerprint scan circuits corresponding to the first area and the second area, controls, in the first time period, the first fingerprint scan circuit to work, and controls, in the second time period, the second fingerprint scan circuit not to work (that is, not to output a fingerprint drive signal), so that when the second area does not need to display an image, the fingerprint signal monitoring is also no longer performed, and power consumption required by the second fingerprint scan circuit to scan and drive the fingerprint sensors of the second area in the second time period may also be reduced.

In a possible implementation, the fingerprint driver is specifically configured to: in a specific cycle, output fingerprint drive signals to the first fingerprint scan circuit in both a first time period and a second time period to drive the fingerprint sensors of the first area, where the first time period and the second time period are periodically cyclic in the specific cycle.

In the foregoing solution, the fingerprint driver allocates corresponding time resources, namely, the first time period and the second time period, to the fingerprint scan circuits corresponding to the first area and the second area, controls, in the first time period, the first fingerprint scan circuit to work, and still controls, in the second time period, the first fingerprint scan circuit to work, so that when the second area does not need to display an image, the power consumption originally required for scanning the fingerprint sensors of the second area is used to refresh and scan the fingerprint sensors of the first area for a plurality of times, to be specific, the fingerprint sensors of the first area is originally scanned once in one frame, but in this solution, the fingerprint sensors of the first area may be scanned twice in one frame, so as to increase a fingerprint scan frequency of the first area, improve fingerprint sensing sensitivity of the first area, and provide better use experience for a scenario such as a game.

In a possible implementation, the first fingerprint scan circuit and the second fingerprint scan circuit are electrically separated from each other.

In a possible implementation, the touch module is further configured to receive first indication information sent by the processor, where the first indication information is used to indicate the display requirements of the first area and the second area.

According to an eighth aspect, an embodiment of this application provides a drive control method, applied to an electronic device having a display, where the method includes:
  obtaining, by a display driver, display requirements of a first area and a second area on a display panel; and
  when the display requirement of the first area is displaying an image and the display requirement of the second area is displaying no image, sending, by the display driver, pixel data signals to the display panel in a first time period, and skipping sending pixel data signals in a second time period, where the pixel data signals are used to indicate content displayed by pixels on the display panel, and the first time period and the second time period are periodically cyclic.

In the foregoing solution, the display driver allocates corresponding time resources for sending the pixel data signals corresponding to the first area and the second area. When the second area does not need to display an image, the display driver may not send pixel data signals in the second time period, so that power consumption for sending the pixel data signals in the second time period can be reduced.

According to a ninth aspect, an embodiment of this application provides a drive control method, applied to an electronic device having a display, where the method includes:
  obtaining, by a display driver, display requirements of a first area and a second area on a display panel; and
  when the display requirement of the first area is displaying an image and the display requirement of the second area is displaying no image, generating, by the display driver, pixel data signals in a first time period, and skipping generating pixel data signals in a second time period.

In the foregoing solution, the display driver allocates corresponding time resources for generating the pixel data signals corresponding to the first area and the second area. When the second area does not need to display an image, the display driver may not generate pixel data signals in the second time period, so that power consumption for processing and generating the pixel data signals in the second time period can be reduced.

According to a tenth aspect, an embodiment of this application provides a drive control method, applied to an electronic device having a display, where the method includes:
  obtaining, by a display driver, display requirements of a first area and a second area on a display panel; and
  when the display requirement of the first area is displaying an image and the display requirement of the second area is displaying no image, receiving, by the display driver in a first time period, image data of the display panel that is sent by a processor, and skipping receiving, in a second time period, image data of the display panel that is sent by the processor, where the first time period and the second time period are periodically cyclic.

In the foregoing solution, the display driver allocates corresponding time resources for receiving the image data corresponding to the first area and the second area. When the second area does not need to display an image, the display driver may not receive, in the second time period, the image data sent by the processor, so that power consumption for receiving image data in the second time period can be reduced.

DESCRIPTION OF EMBODIMENTS

Figure 1:
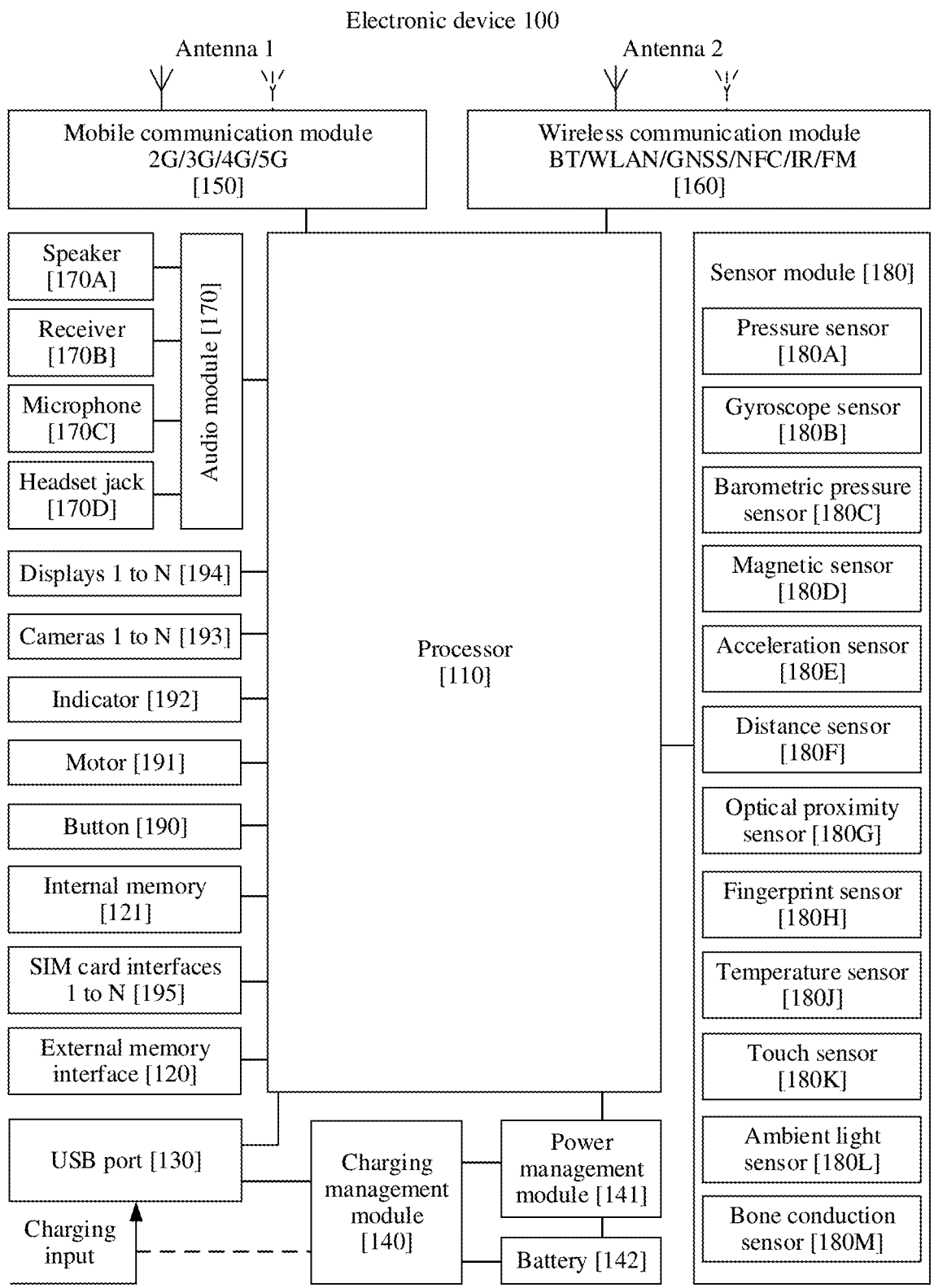
FIG. 1 is a schematic diagram of a structure of an electronic device according to an embodiment of this application.

The following describes the technical solutions in the embodiments of this application with reference to the accompanying drawings in the embodiments of this application.

In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of this application, unless otherwise stated, "a plurality of" means two or more than two.

An embodiment of this application provides a drive control method, applied to an electronic device having a display panel. The display panel may have at least two pixel groups, each pixel group includes a plurality of pixels, each pixel group corresponds to one display area, and each display area has a corresponding pixel scan circuit. The pixel scan circuit corresponding to each display area is specifically configured to sequentially drive pixels in the display area to convert electrical signals into optical signals. In this embodiment of this application, the pixel scan circuit corresponding to each display area can be controlled independently of each other, and the display driver can independently control a working time period of each pixel scan circuit, that is, the display driver can independently control when each pixel scan circuit scans and drives pixels in the display area corresponding to the pixel scan circuit. Therefore, in this embodiment of this application, a corresponding time resource may be allocated to the pixel scan circuit corresponding to each display area, and the time resources of the pixel scan circuits corresponding to the plurality of display areas are periodically cyclic.

For example, the display panel includes two display areas: a first area and a second area, and correspondingly has a corresponding first pixel scan circuit and a corresponding second pixel scan circuit. One frame is used as an example. The display driver may allocate a first time period in one frame to the first area, and allocate a second time period in the one frame to the second area. In an implementation, the first time period and the second time period may form one frame without an interval, and the first time period and the second time period continue to be cyclic in a next frame, so as to implement a periodic cycle. In another implementation, there may alternatively be a specific interval between the first time period and the second time period. To be specific, the first time period, the second time period, and the interval form one frame, and the first time period and the second time period continue to be cyclic in a next frame, so as to implement a periodic cycle. The first time period may be used to control the first pixel scan circuit to work, and the second time period may be used to control the second pixel scan circuit to work. In this way, the first area and the second area are scanned and driven in one frame in a time-divided manner in the first time period and the second time period, so as to further display an image.

In some implementation scenarios, the display areas on the display panel may have two display requirements. A display requirement of some display areas is displaying an image, and a display requirement of the some other display areas is displaying no image. In this embodiment of this application, for the foregoing implementation scenarios in which some areas need to display an image but the some other display areas do not need to display an image, based on the time-divided and area-divided drive control method, in a specific cycle, when a time resource of a pixel scan circuit corresponding to an area whose display requirement is displaying an image arrives, the pixel scan circuit may be controlled to work normally (drive corresponding pixels to convert electrical signals into optical signals); and when a time resource of a pixel scan circuit corresponding to an area whose display requirement is displaying no image arrives, the pixel scan circuit may be controlled to stop working (skip driving corresponding pixels to convert electrical signals into optical signals). Specifically, the specific cycle refers to a time period in which some display areas need to be screen-off or are indicated to be screen-off. For example, the specific cycle may be specifically a period of time in which an electronic device is in a state in which the first area needs to display an image but the second area does not need to display an image. When the display driver learns that the electronic device changes from full-screen display to a display requirement that the second area does not need to display an image, the display driver may enter the specific cycle. When the display driver learns that the electronic device changes from a case in which the second area does not need to display an image to a case in which the second area needs to display an image, the display driver may end the specific cycle. Alternatively, the specific cycle may be a period of time that exists after requirement indication information indicating the second area to be screen-off is obtained, and the specific cycle is ended after requirement indication information indicating the second area to perform display is obtained. Alternatively, the specific cycle is entered when instructions instructing the second area to be screen-off is received, and the specific cycle is ended when instructions instructing the second area to perform display is received.

In this way, compared with an existing technology, a pixel scan circuit may not work for some time, so that power consumption required by the pixel scan circuit to scan pixels in this time period is reduced.

Therefore, it should be noted that, when display areas and corresponding pixel scan circuits are obtained through division in advance, setting may be performed based on a specific function of a specific electronic device, for example, in some functions or scenarios, areas at which locations do not need to display an image and areas at which locations need to display an image. A quantity of display areas and locations of the display areas may be determined based on these specific situations. In addition, after the locations of the display areas are determined, a time resource corresponding to each display area may be further determined. For example, three display areas may be evenly obtained through division from left to right, corresponding time resources in each frame may be respectively a first time period, a second time period, and a third time period, and the three time periods sequentially cycle once in each frame cycle. In addition, time lengths of the three time resources may be the same or may be different, and may be further set based on a situation.

Further, corresponding functions such as image data receiving, processing, and sending by the display driver in the specific cycle may alternatively not be enabled.

Further, corresponding functions such as image data processing and sending by the processor in the specific cycle may alternatively be disabled.

Further, power may not be supplied to pixels corresponding to the some areas that do not need to display an image.

Still further, when the display panel is equipped with a touch function, different display areas on the display panel may correspond to different touch scan circuits, a touch driver may also allocate a corresponding time resource to each touch scan circuit, and time resources of touch scan circuits corresponding to a plurality of display areas are periodically cyclic. When a time resource of a touch scan circuit corresponding to an area whose display requirement is displaying an image arrives, the touch scan circuit may be controlled to work normally; and when a time resource of a touch scan circuit corresponding to an area whose display requirement is displaying no image arrives, the touch driver may stop work of scanning and driving touch sensors by the touch scan circuit.

Similarly, when the display panel is equipped with a fingerprint recognition function, different display areas of the display panel may correspond to different fingerprint scan circuits, a fingerprint driver may also allocate a corresponding time resource to each fingerprint scan circuit, and time resources of fingerprint scan circuits corresponding to a plurality of display areas are periodically cyclic. When a time resource of a fingerprint scan circuit corresponding to an area whose display requirement is displaying an image arrives, the fingerprint scan circuit may be controlled to work normally; and when a time resource of a fingerprint scan circuit corresponding to an area whose display requirement is displaying no image arrives, the fingerprint driver may stop work of scanning and driving fingerprint sensors by the fingerprint scan circuit.

After a part of the foregoing method is performed, power consumption required for work corresponding to the part can be reduced. After all parts of the method are performed, power consumption required for work corresponding to all the parts can be reduced. This increases standby time of the electronic device.

The following first describes the electronic device provided in the embodiments of this application.

FIG. 1 is a schematic diagram of a structure of an example electronic device 100 according to this application.

The electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device, and/or a smart city device. A specific type of the electronic device is not particularly limited in the embodiments of this application. Generally, the drive control method provided in the embodiments of this application is applicable to any electronic device that has a display panel with a plurality of display areas, where different areas may be simultaneously in two display states: visible and invisible.

It should be understood that the electronic device 100 may have more or fewer components than those shown in figure, or may combine two or more components, or may have different component configurations. Various components shown in the figure may be implemented in hardware that includes one or more signal processors and/or application-specific integrated circuits, software, or a combination of hardware and software.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

In some embodiments, the processor 110 may be configured as a system on chip (SOC), and may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus, and converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 through the CSI interface, to implement a shooting function of the electronic device 100. The processor 110 communicates with the display screen 194 through the DSI interface, to implement a display function of the electronic device 100. Specifically, a data receiving interface MIPI RX and a data transmission interface MIPI TX may be included.

The GPIO interface may be configured by using software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type-C port, or the like. The USB port 130 may be used to connect to a charger for charging the electronic device 100, may be used for transmission of data between the electronic device 100 and a peripheral device, or may be used to connect to a headset for playing audio through the headset. Alternatively, the port may be used to connect to another electronic device, for example, an AR device.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142, the charging management module 140, and the processor 110. The power management module 141 receives an input of the battery 142 and/or an input of the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device. In some embodiments, the power management module 141 may include a separate power supply module. The power supply module is mainly configured to supply power to the display screen 194 (which may be specifically pixels in the display screen), and a drive circuit and the like (for example, a display driver, a touch driver, and a fingerprint driver) related to the display screen 194. In some embodiments, the display screen 194 may include a plurality of pixel groups. The power supply module may be separately connected to each pixel group, to independently supply power to each pixel group. Further, in a specific cycle, the power supply module may supply power to some of the pixel groups and not supply power to the other some pixel groups.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution, applied to the electronic device 100, to wireless communication including 2G, 3G, 4G, 5G, or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules in the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display screen 194. In some embodiments, the modem processor may be an independent component. In some other embodiments, the modem processor may be independent of the processor 110, and is disposed in a same device with the mobile communication module 150 or another function module.

The wireless communication module 160 may provide wireless communication solutions applied to the electronic device 100, including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display screen 194, the application processor, and the like. The GPU is a microprocessor for image processing, and connects the display screen 194 to the application processor. The GPU is configured to: perform mathematical and geometric calculation, and render an image. The processor 110 may include one or more GPUs that execute program instructions to generate or change display information.

The display screen 194 is configured to display an image, a video, and the like. The display screen 194 is also referred to as a display, includes a display panel, and may further include a control circuit that controls the display panel. Specifically, the display screen 194 may be a display drive integrated circuit (DDIC), also referred to as a display driver. In some embodiments, a control circuit for controlling the display panel is partially integrated on the display panel. A liquid crystal display (LCD), an organic light-emitting diode (OLED), an active-matrix organic light emitting diode or active-matrix organic light emitting diode (AMOLED), a flexible light-emitting diode (FLED), a mini-LED, a micro-LED, a micro-OLED, quantum dot light emitting diodes (QLED), or the like may be used for the display panel. In some embodiments, the electronic device

100 may include one or N display screens 194, where N is a positive integer greater than 1.

In some embodiments, the display panel may include a plurality of display areas, each display area corresponds to a group of pixels, and a pixel may display corresponding image content after being driven and supplied with power. Each display area of the display panel may have a corresponding independent and controllable pixel scan circuit, where the pixel scan circuit is configured to sequentially scan and drive pixels in the corresponding display area to display an image. In some embodiments, the pixel scan circuit may include a gate scan circuit and an emit scan circuit. The gate scan circuit is configured to sequentially drive pixels corresponding to each row on the display panel to load pixel data signals, and the emit scan circuit is configured to sequentially drive pixels corresponding to each row on the display panel to display an image based on the pixel data signals.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications of the electronic device 100 and data processing. The internal memory 121 may include a program storage area and a data storage area. The program storage area may store an operating system and an application required by at least one function (for example, a facial recognition function, a fingerprint recognition function, and a mobile payment function). The data storage area may store data (such as facial information template data and a fingerprint information template) created when the electronic device 100 is used, and the like. In addition, the internal memory 121 may include a high-speed random access memory, and may further include a nonvolatile memory, for example, at least one magnetic disk storage device, a flash memory, and a universal flash storage (UFS). The processor 110 runs the instructions stored in the internal memory 121 and/or the instructions stored in the memory disposed in the processor, to perform various function applications of the electronic device 100 and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, a capacitive pressure sensor.

The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display screen 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a message application icon, instructions for viewing a message are executed. When a touch operation whose touch operation intensity is greater than or equal to the first pressure threshold is performed on a message application icon, instructions for newly creating a message are executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during shooting. For example, when a shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover or a leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared or a laser manner. In some embodiments, in a shooting scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When plenty of reflected light is detected, the electronic device 100 may determine that there is an object near the electronic device 100. When reflected light that is not plenty is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. In some embodiments, the fingerprint sensor 180H has a corresponding fingerprint scan circuit and fingerprint driver (or referred to as a fingerprint drive circuit), and is configured to drive the fingerprint sensor 180H to monitor and feed back a fingerprint signal.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch component" or a "touch sensor". The touch sensor 180K may be disposed on the display screen 194, and the touch sensor 180K and the display screen 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display screen 194. In some other embodiments, the touch sensor 180K may alternatively be disposed on a surface of the electronic device 100 at a location different from a location of the display screen 194. In some embodiments, the touch sensor 180K has a corresponding touch scan circuit and touch driver (or touch drive circuit), configured to drive the touch sensor 180K to perform touch signal monitoring and feedback.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In the embodiments of the present invention, an Android system of a layered architecture is used as an example to describe a software structure of the electronic device 100.

Figure 2:
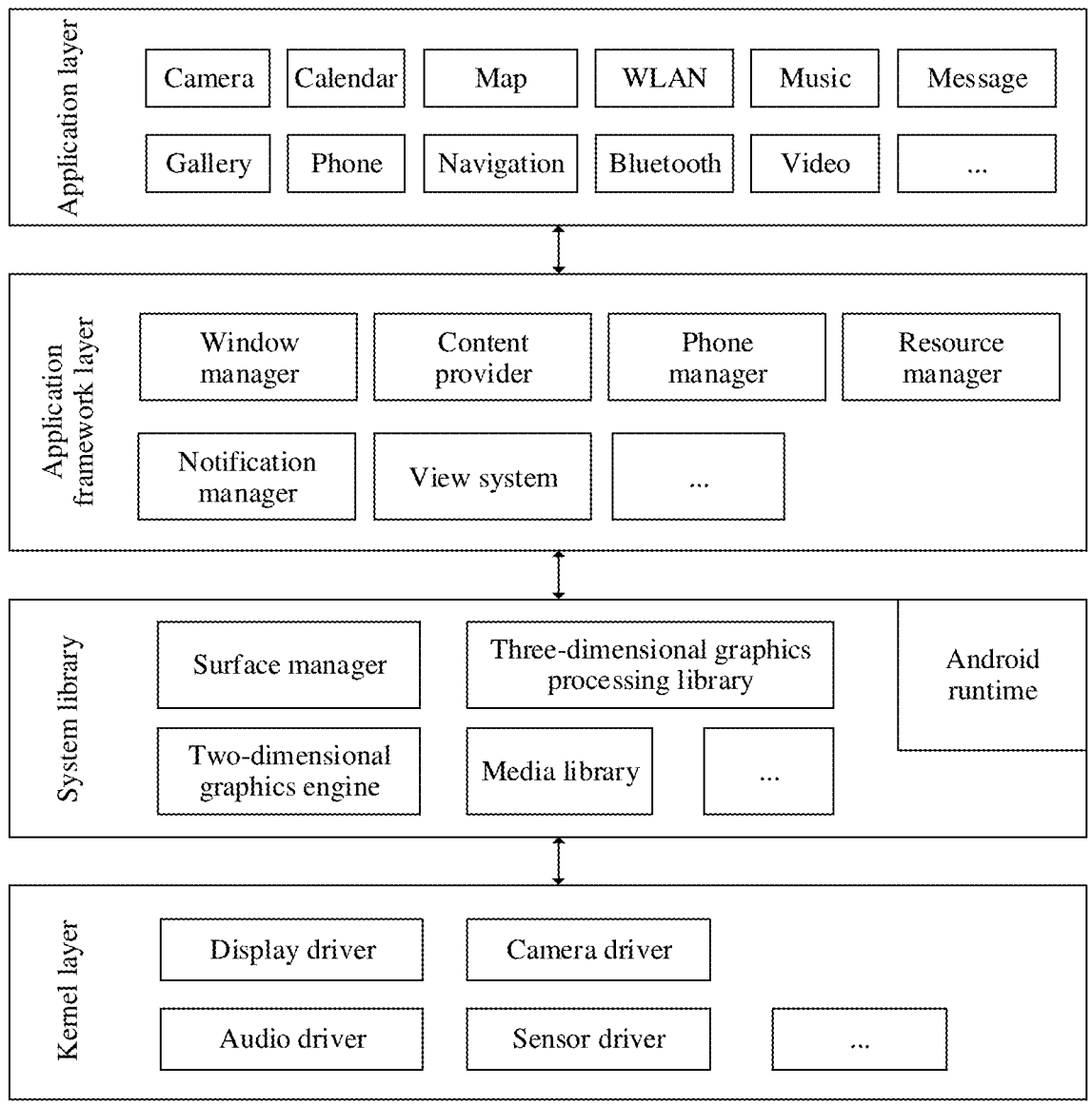
FIG. 2 is a block diagram of a software structure of an electronic device according to an embodiment of this application.

FIG. 2 is a block diagram of a software structure of the electronic device 100 according to embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Video, and Message.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in the status bar at the top of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch/tap operation and a control corresponding to the tap operation is a control of a camera application icon is used. A camera application invokes an interface of the application framework layer, so that the camera application is started. Then, a camera driver is started by invoking the kernel layer, and a static image or a video is captured by using the camera 193.

To better describe the drive control method provided in the embodiments of this application, the following first describes an implementation scenario to which the drive control method in the embodiments of this application is applicable.

The embodiments of this application are applicable to an electronic device having a display panel. The display panel has at least two display areas, and these display areas are obtained through division in advance. For example, the display panel may be divided into two display areas with similar areas in advance by using a central line of the display panel as a critical line, or the display areas may be obtained through division based on another design. Further, a display area in the embodiments of this application may have two display requirements, namely, needing to display an image and not needing to display an image.

Therefore, it may be understood that there are three display scenarios on the display panel of the electronic device. First, an image all display areas need to display an image (full-screen display). Second, no display area needs to display an image (full-screen no display, for example, a screen-off state). Third, in a plurality of display areas, some display areas need to display an image but the other some display areas do not need to display an image.

Figure 3A:
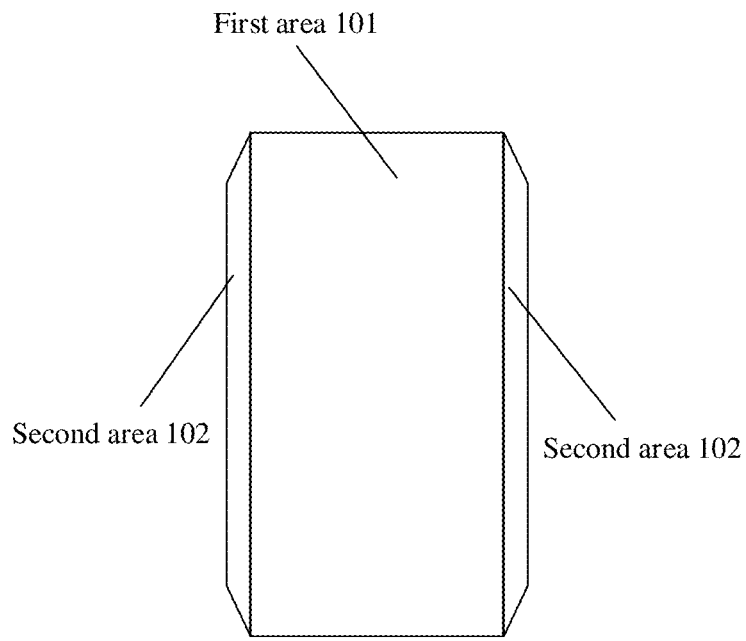
FIG. 3a is a schematic diagram of a display status of a bent display panel according to an embodiment of this application.
Figure 3B:
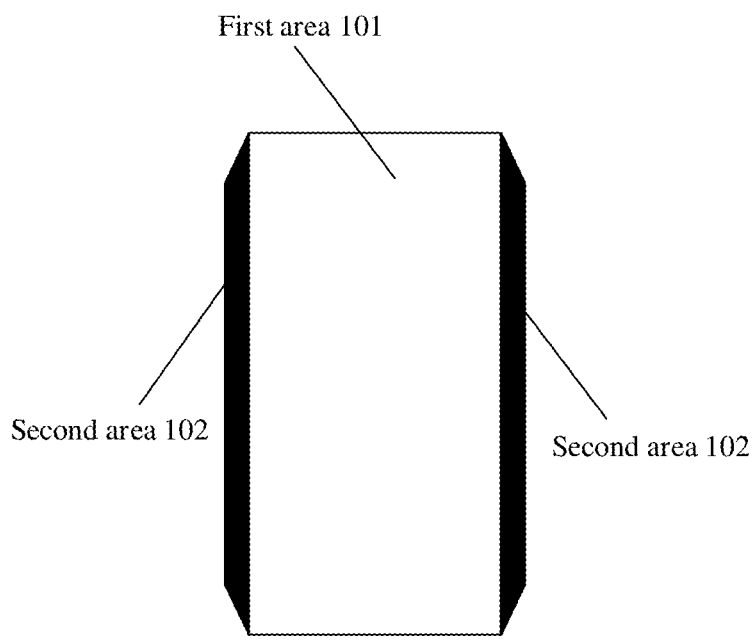
FIG. 3b is a schematic diagram of a display status of another bent display panel according to an embodiment of this application.

In a possible implementation, the electronic device may be a device with a curved display panel, a first area 101 of the display panel 10 may be configured on a front surface of the electronic device, and second areas 102 (curved parts) may be configured on side surfaces of the electronic device. FIG. 3a and FIG. 3b each show a device with a curved display panel having one first area 101 and two second areas 102. In some implementation scenarios, as shown in FIG. 3a, both the first area 101 and the second areas 102 display an image. In some implementation scenarios, as shown in FIG. 3b, only the first area 101 is allowed to display an image, but the second areas 102 are not allowed to display an image. Certainly, in some cases, neither the first area 101 nor the second area 102 may display an image.

Figure 4A:
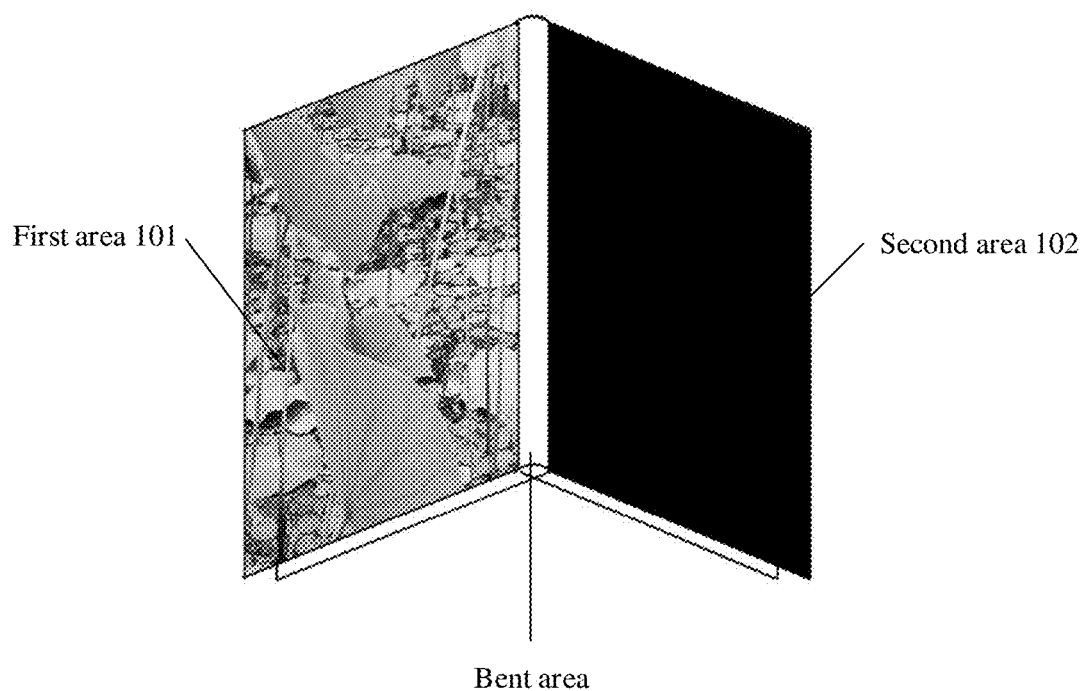
FIG. 4a is a schematic diagram of a display status of a foldable display panel according to an embodiment of this application.
Figure 4B:
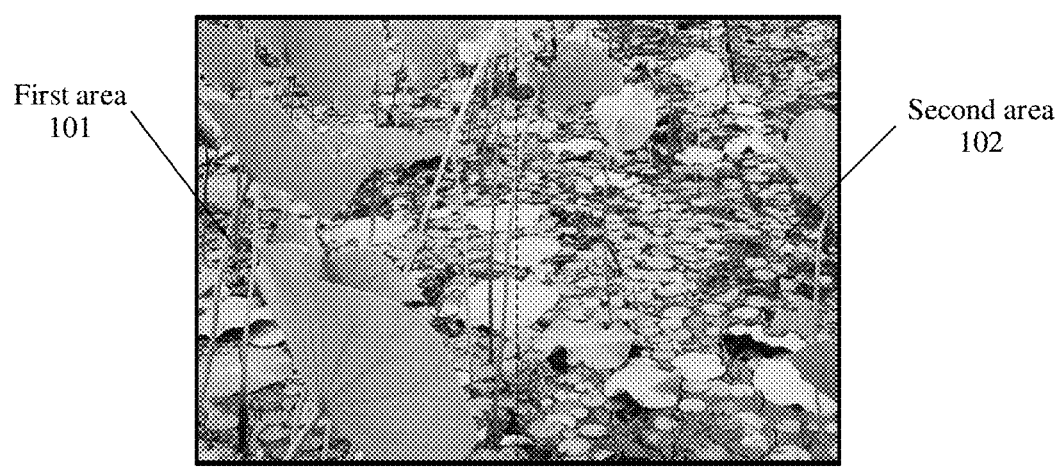
FIG. 4b is a schematic diagram of a display status of another foldable display panel according to an embodiment of this application.

In another possible implementation, the electronic device may be foldable, and the corresponding display panel 10 may also be flexible and foldable. In this implementation, the display areas of the display panel 10 may be determined based on a folding position of the electronic device. An electronic device with two folds is used as an example. FIG. 4a is a schematic diagram of a display status of an electronic device in a folded state (which may include a folding process). It can be learned that in the folded state, a first area 101 may display an image, and a second area 102 may not display an image. It should be noted that a bent area shown in FIG. 4a may be set as a first area 101 or may be set as a second area 102, or a part of the bent area may be set as a first area 101 and a part of the bent area is set as a second area 102 (for example, the bent area is separated from a central line, a left side is the first area 101, and a right side is the second area 102). Specifically, setting may be performed based on an actual situation. This is not specifically limited in this application. FIG. 4b is a schematic diagram of a display state of an electronic device in an expanded state (which may include an expanding process). It may be learned that in the expanded state, both a first area 101 and a second area 102 may display an image. Certainly, in some cases, neither the first area 101 nor the second area 102 may display an image.

Figure 5:
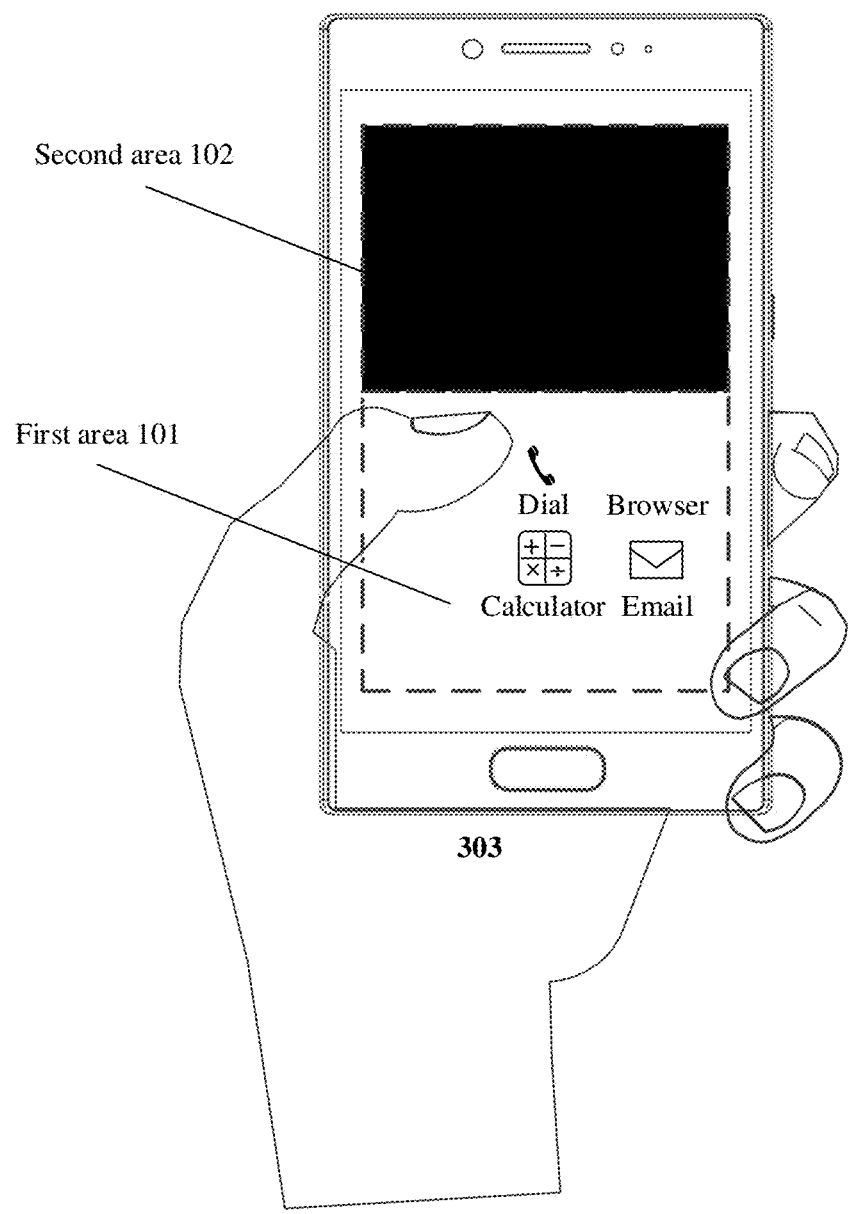
FIG. 5 is a schematic diagram of a display status of a display panel in a one-hand operation state according to an embodiment of this application.

In another possible implementation, the electronic device may also have another function of split-screen display or one-hand operation. When the split-screen display function is used, some areas may not display an image. When the one-hand operation function is used, a display area is narrowed down to an area that can be touched by the user with one hand. Therefore, some areas also do not display an image. Therefore, any case similar to the foregoing two cases in which fixedly some display areas do not display an image and the other display areas display an image is applicable to a use scenario in the embodiments of this application. For example, in a scenario that is shown in FIG. 5 and in which the one-hand operation function is used, a first area 101 displays an image, and a second area 102 does not display an image. When a full-screen operation is resumed, both the first area 101 and the second area 102 may be in a display state.

In the embodiments of this application, for an electronic device in an implementation scenario similar to the foregoing several implementation scenarios in which some areas need to display an image but the other some areas do not need to display an image, scan and drive control is performed on different display areas in a time-divided and area-divided manner, so that a related drive module and power supplying module of the electronic device may stop working in some time periods, to stop driving and supplying power to pixels in the display areas that do not need to display an image, or stop driving touch sensors of the display areas that do not need to display an image, or stop driving fingerprint sensors of the display areas that do not need to display an image. In this way, power consumption generated by the electronic device for related driving and power supplying for the display areas that do not need to display an image is reduced, and standby time of the electronic device is increased.

The following describes in detail the drive control method provided in the embodiments of this application. First, a drive control system to which the drive control method in the embodiments of this application is applicable is described. The drive control system may be used in the electronic device shown in FIG. 1.

Figure 6A:
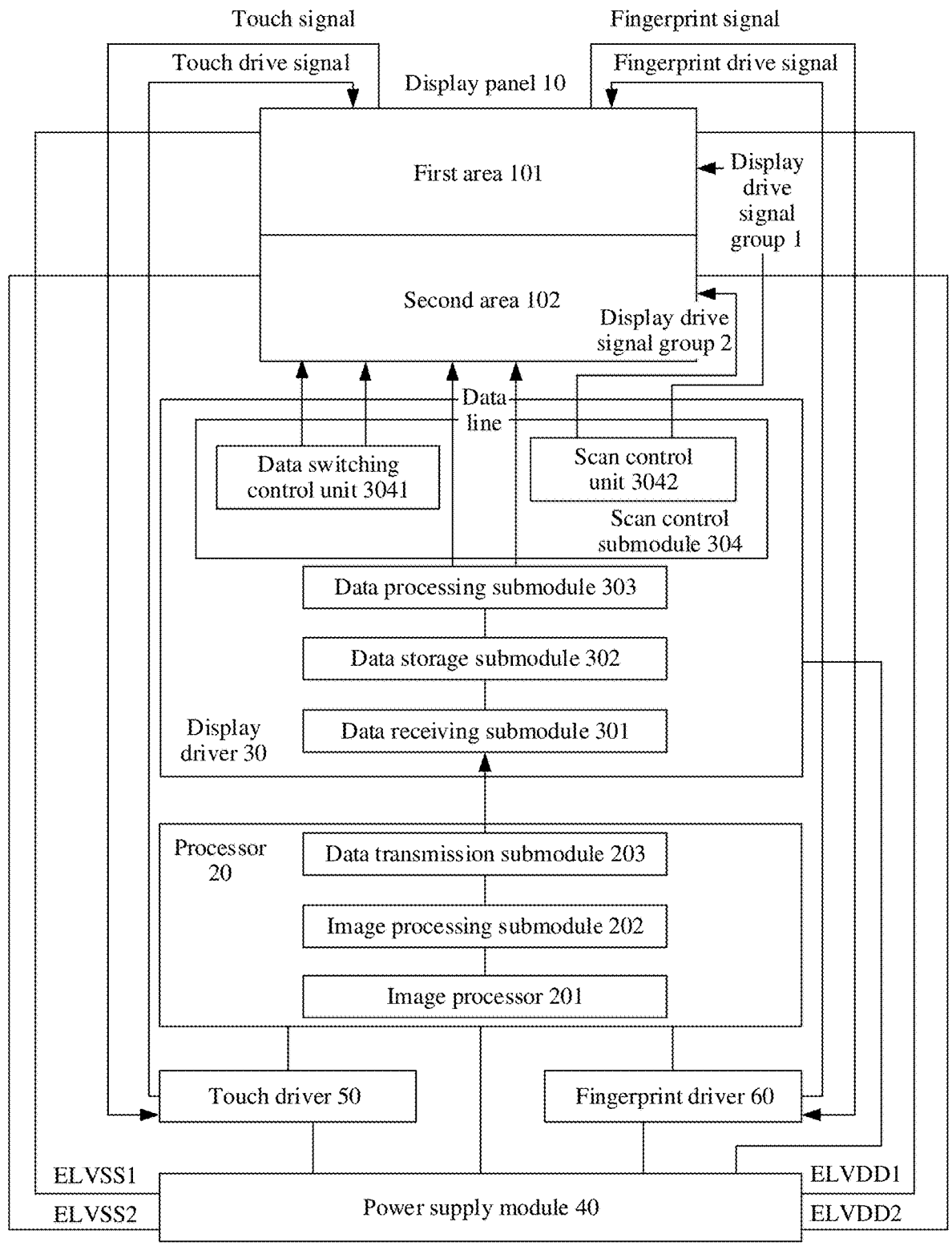
FIG. 6a is a diagram of a system architecture of a drive control system according to an embodiment of this application.
Figure 6B:
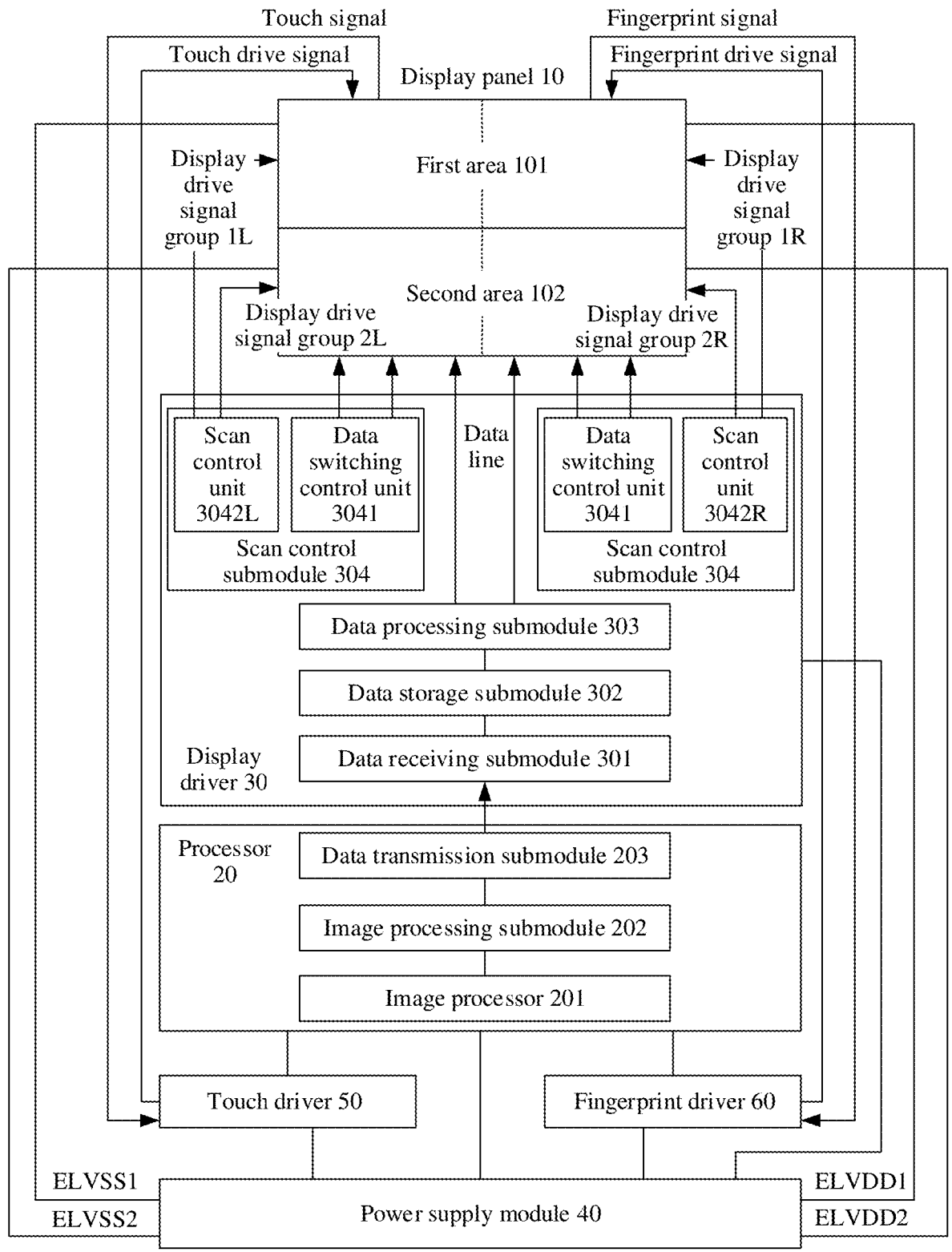
FIG. 6b is a diagram of a system architecture of another drive control system according to an embodiment of this application.

FIG. 6a and FIG. 6b are diagrams of system architectures of two drive control systems according to embodiments of this application. Because the two system architectures are only partially different, all content that is not explicitly described below in a differentiated manner is applicable to the two system architectures shown in FIG. 6a and FIG. 6b.

The drive control systems shown in FIG. 6a and FIG. 6b each include a display panel 10, a processor 20, a display driver 30, a power supply module 40, a touch driver 50, and a fingerprint driver 60.

It should be noted that the display panel 10 and the display driver 30 may also be jointly referred to as a display module, a display screen, or a display. The display panel 10 and the display driver 30 may be independent, or may be encapsulated together.

The display panel 10 is configured to display an image, and may include at least two display areas. For example, as shown in FIG. 6a and FIG. 6b, the display panel 10 may include a first area 101 and a second area 102. It may be understood that the display panel 10 may include more display areas, for example, a third area and a fourth area. However, provided that the display panel 10 is divided into areas, regardless of a quantity of display areas, drive control manners for different areas are consistent. Therefore, in the embodiments of this application, two display areas and three display areas are mainly used as an example for detailed description.

It should be noted that the first area 101 and the second area 102 are merely used to distinguish between display areas of the display panel 10, and do not mean that the display panel 10 is physically divided into two parts. The display panel 10 in the embodiments of this application is a continuous and complete display screen.

In the embodiments of this application, a display requirement of the display panel may be needing to display an image or not needing to display an image. For example, if both the first area 101 and the second area 102 need to display an image, both the first area 101 and the second area 102 may display an image; if neither the first area 101 nor the second area 102 needs to display an image, neither the first area 101 nor the second area 102 may display an image; or if the first area 101 needs to display an image but the second area 102 does not need to display an image, the first area 101 may display an image, and the second area 102 does not display an image.

Specifically, the display panel 10 includes a plurality of pixels (where the pixels may be understood as diodes capable of independently emitting light). After the pixels are driven by pixel scan circuits, pixel data signals may be loaded to the pixels by using a data line, and a power voltage provided by the power supply module 40 is added. In this way, the pixels may emit light and display different colors, and convert an electrical signal into an optical signal, so as to present an image to be output on the display panel 10.

Figure 7:
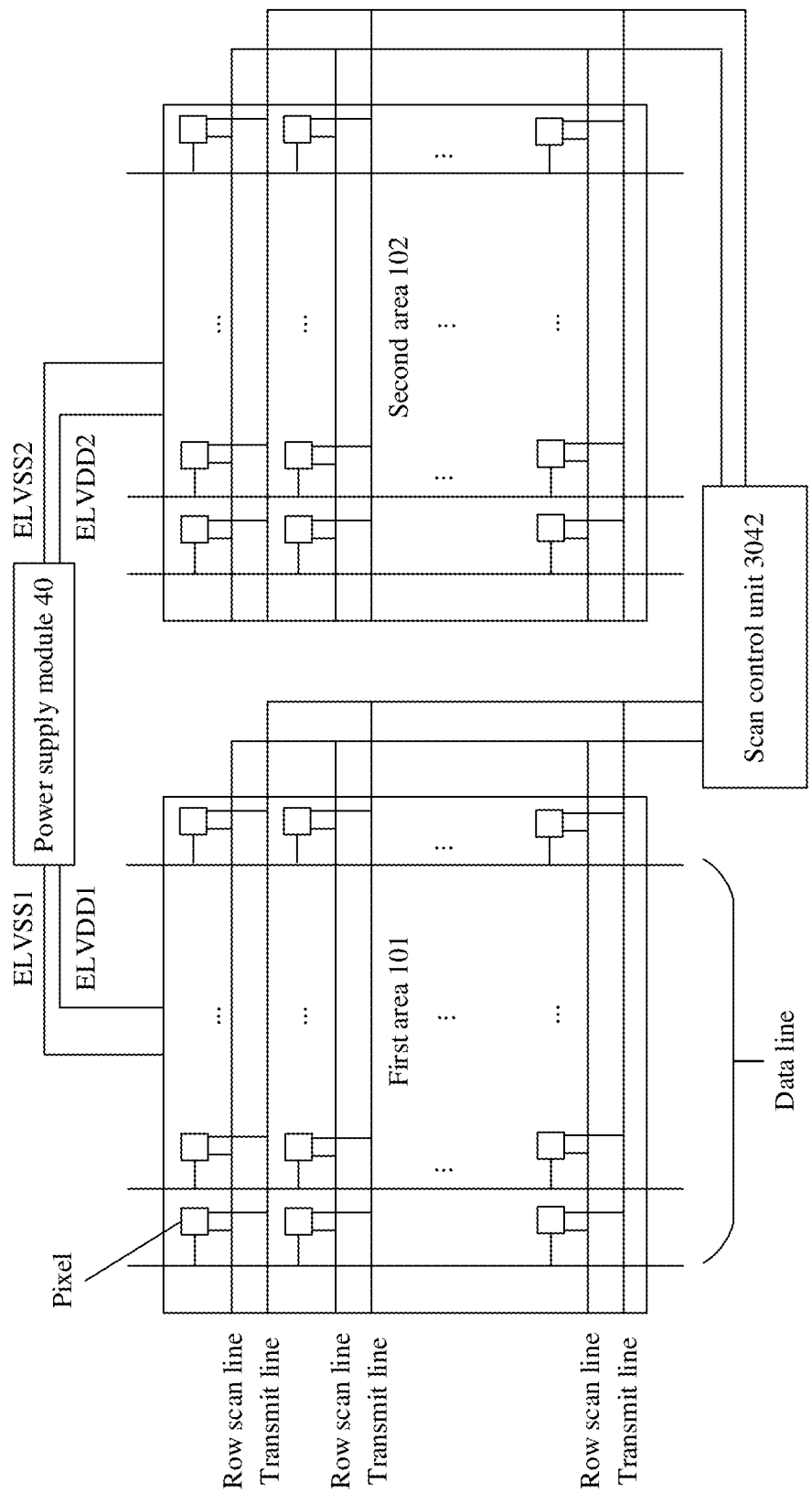
FIG. 7 is a schematic diagram of a pixel scan circuit of a display panel according to an embodiment of this application.

A pixel scan circuit design of the display panel 10 in the embodiments of this application is described below by using FIG. 7 as an example. The first area 101 and the second area 102 respectively have corresponding pixel scan circuits, which may be referred to as a first pixel scan circuit and a second pixel scan circuit respectively. The pixel scan circuit includes a plurality of row scan lines and a plurality of transmit lines shown in FIG. 7, where the plurality of row scan lines may be referred to as a gate scan circuit, and the plurality of transmit lines may be referred to as an emit scan circuit. In some embodiments, the plurality of row scan lines and the plurality of transmit lines may be integrated on the display panel 10, or may be used as an independent module. In a case of the integration on the display panel 10, the plurality of row scan lines may be referred to as a gate scan circuit on array (GOA), and a plurality of transmit lines may be referred to as an emit scan circuit on array (EOA).

In an existing technology, generally, the entire display panel has 128*64 pixels, and the pixels are arranged fitly in a form of rows and columns of the matrix. In other words, each row includes 128 pixels, and each column includes 64 pixels. Each row of pixels may be jointly connected to one row scan line and one transmit line, and each column of pixels may be jointly connected to one data line. The row scan line may be used to drive all pixels in a row in which the row scan line is located, so that pixel data signals whose transmission is performed by using the data line may be loaded to the pixels in the scan row. The transmit line may be used to turn on the pixels, so that when the power supply module 40 supplies power to the pixels, the pixels can continuously emit light to display an image.

In the embodiments of this application, different quantities of pixels are allocated to different display areas. The first area 101 and the second area 102 are used as an example. If the first area 101 and the second area 102 are areas whose sizes are equal or close, the first area 101 and the second area 102 may each include 64*64 pixels. Alternatively, pixels in the first area 101 and the second area 102 may be allocated based on different size requirements. For example, the first area 101 includes 32*64 pixels, and the second area 102 includes 96*64 pixels. Similarly, the first area 101 and the second area 102 that are obtained through division also each include a plurality of pixels, and each display area has a same pixel arrangement manner as the entire display panel and a same connection relationship between row scan lines and transmit lines as the entire display panel. Compared with the existing technology, a design difference of the pixel scan circuit in the embodiments of this application mainly lies in that the first pixel scan circuit and the second pixel scan circuit are independent of each other, that is, the first pixel scan circuit and the second pixel scan circuit are controlled independently of each other; in other words, a row scan line in the first pixel scan circuit is electrically separated from a row scan line in the second pixel scan circuit, and a transmit line in the first pixel scan circuit is also electrically separated from a transmit line in the second pixel scan circuit.

The following describes a display principle of the display panel 10 in the embodiments of this application with reference to the display driver 30.

The display driver 30 is configured to receive and process display image data (such as a photo and a video) to be input into the display panel 10. In addition, the display driver 30 has connection relationships with the pixel scan circuits and the pixels, and may control driving of the pixel scan circuits to enable the display panel 10 to display an image. In specific implementation, the display driver 30 may also be referred to as a display driver integrated circuit (DDIC) or a display driver chip.

Specifically, the display driver 30 may include a data receiving submodule 301, a data storage submodule 302, a data processing submodule 303, and a scan control submodule 304. The data receiving submodule 301 is configured to receive image data, where the image data is usually from the processor 20. For example, the data receiving submodule 301 may be a communication interface, may be specifically MIPI RX (where the MIPI RX is a data receiving module in the MIPI protocol), and is configured to receive and decode the image data. The data storage submodule 302 is configured to store decoded image data, and may be specifically a random access memory (RAM). The data processing submodule 303 is configured to process the image data in the data storage submodule 302 and convert the image data into a pixel data signal. Specifically, the image data is generally a digital signal, and the data processing submodule 303 may perform digital-to-analog conversion on the image data, to convert the digital signal into an analog signal. The data processing submodule 303 may further perform voltage amplification on the analog signal, so that the analog signal has a robust drive capability. The pixel data signal that is output after being processed by the data processing submodule 303 may be input to a corresponding pixel by using a data line. Further, other processing such as additional rendering may be further performed on the image data, to have a better display effect. This part of functions may also be implemented by the processor 20. For example, the display driver 30 may implement a digital-to-analog conversion function by using a Gamma circuit, and may implement voltage amplification on the analog signal by using an operational amplifier circuit. The scan control submodule 304 is configured to drive the pixel scan circuits corresponding to the display panel 10, and in the embodiments of this application, is mainly configured to independently control the pixel scan circuit corresponding to each display area. In the embodiments shown in FIG. 6a and FIG. 6b, the scan control submodule 304 may independently control and drive the first pixel scan circuit and the second pixel scan circuit, that is, may independently drive either of the first pixel scan circuit and the second pixel scan circuit, so that the first pixel scan circuit or the second pixel scan circuit performs row-by-row scanning of the pixels mentioned above.

In specific implementation, if a display area is in a display state, when the data processing submodule 303 in the display driver 30 inputs pixel data signals to corresponding pixels by using a data line, the scan control submodule 304 may simultaneously drive a pixel scan circuit corresponding to the display area, so that the pixel scan circuit starts to scan pixels in the display area, so as to load the pixel data signals into the pixels. It should be noted that, because the display panel 10 has a very large quantity of pixels and corresponds to a very large quantity of data lines, if a fixed data output channel is allocated to each data line, a size of the display driver 30 is very large. Therefore, in some embodiments, the scan control submodule 304 may include a scan control unit 3042 and a data switching control unit 3041. The data switching control unit 3041 may be a multiplexer (MUX), and is mainly configured to multiplex one data output channel to a plurality of data lines. For example, when pixels in the $1^{st}$ row are scanned, the data switching control unit 3041 may first connect a data output channel to some data lines, to send pixel data signals corresponding to the some pixels, and then switch the data output channel to some other data lines, to send pixel data signals corresponding to the some other pixels.

The scan control unit 3042 is mainly configured to implement drive control on a pixel scan circuit.

The following further describes drive control performed by the scan control unit 3042 on a pixel scan circuit in a time-divided and area-divided manner in the embodiments of this application.

The scan control unit 3042 may be specifically a scan control circuit, and may be connected to the first pixel scan circuit and the second pixel scan circuit, so that the first pixel scan circuit and the second pixel scan circuit may be controlled independently, that is, scanning and driving and image display of the first area 101 and the second area 102 may be controlled independently.

In some embodiments, as shown in FIG. 6a, a pixel scan circuit has a good drive capability, and can drive an entire row of pixels simultaneously. Therefore, the scan control submodule 304 may include a scan control unit 3042, and the scan control unit 3042 is connected to row scan lines and transmit lines in the first pixel scan circuit and the second pixel scan circuit. The first area 101 is used as an example. The scan control unit 3042 may send display drive signals (a display drive signal group 1) to the row scan lines and the transmit lines in the first pixel scan circuit, where the display drive signal group 1 specifically includes a start signal and a clock signal, so that the first pixel scan circuit starts to scan and drive the pixels row by row. Specifically, the start signal is sent to a row scan line and a transmit line that are in the $1^{st}$ row in the first pixel scan circuit, so that the $1^{st}$ row starts to drive pixels. The clock signal is used to control a rhythm of row-by-row scanning of the first pixel scan circuit. Each time when a time point of scanning a row arrives, a clock signal may be sent to a row scan line and a transmit line of the corresponding row of the first pixel scan circuit. During scanning and driving, the row scan line and the transmit line that correspond to the $1^{st}$ row drive all pixels corresponding to the first row based on the start signal, and the $2^{nd}$ row, the $3^{rd}$ row, . . . , and an $n^{th}$ row are scanned based on a rhythm of the clock signal row by row until all pixels in the first area 101 are scanned. Similarly, the scan control unit 3042 may also send (display drive signals) a display drive signal group 2 to a row scan line and a transmit line corresponding to the $1^{st}$ row in the second pixel scan circuit, where the display drive signal group 2 also includes a start signal and a clock signal, so that the second pixel scan circuit may also scan and drive all pixels in the second area 102.

In some other embodiments, as shown in FIG. 6*b*, a pixel scan circuit has a weak drive capability, and drive signals need to be loaded on the left and right sides simultaneously to drive an entire row of pixels. Therefore, in the embodiment shown in FIG. 6*b*, the scan control submodule 304 may include two scan control units, namely, a scan control unit 3042L and a scan control unit 3042R. The first area 101 is still used as an example. The scan control unit 3042L and the scan control unit 3042R may simultaneously send a display drive signal group to the row scan line and the transmit line that correspond to the $1^{st}$ row in the first pixel scan circuit. Specifically, the scan control unit 3042L may send a display drive signal group 1L to the row scan line and the transmit line that correspond to the $1^{st}$ row in the first pixel scan circuit, the scan control unit 3042R may send a display drive signal group 1R to a right half part of the row scan line and the transmit line that correspond to the $1^{st}$ row in the second pixel scan circuit. It is similar to the embodiment in FIG. 6*a* that, the display drive signal group 1L and the display drive signal group 1R also each include a start signal and a clock signal, so that a left half part of the first pixel scan circuit of the first area 101 scans and drives pixels in a left part of the first area 101 row by row, and a right half part of the first pixel scan circuit of the first area 101 scans and drives pixels in a right part of the first area 101 row by row. The two parts work together to jointly scan and drive all the pixels in the first area 101 row by row. Scanning of the second area 102 is similar. Therefore, details are not described again. Correspondingly, in the embodiment shown in FIG. 6*b*, the scan control submodule 304 may alternatively include two data switching control units 3041, which are respectively configured to cooperate with the two scan control units 3042L and 3042R on the left and right to perform data line switching.

In still some other embodiments, as shown in FIG. 6*b*, a pixel scan circuit has a good drive capability, and can drive an entire row of pixels simultaneously. However, to keep symmetry of circuit wiring, a design method shown in FIG. 6*b* may be followed, to be specific, the scan control submodule 304 may include two scan control units, where the scan control unit 3042L is configured to control scanning and driving of pixels in an odd row, and the scanning unit 3042R is configured to control scanning and driving of pixels in an even row. The first area 101 is still used as an example. The scan control unit 3042L and the scan control unit 3042R may sequentially and respectively send display drive signals to the row scan lines and the transmit lines corresponding to the $1^{st}$ row and the $2^{nd}$ row in the first pixel scan circuit, so that the pixels in the odd row and the pixels in the even row in the first area 101 start to be scanned and driven row by row, and the two parts jointly scan and drive all the pixels in the first area 101 row by row. Scanning of the second area 102 is similar. Therefore, details are not described again. Correspondingly, in the embodiment shown in FIG. 6*b*, the scan control submodule 304 may alternatively include two data switching control units 3041, which are respectively configured to cooperate with the two scan control units 3042L and 3042R on the left and right to perform data line switching.

It may be understood that a driving manner in FIG. 6*b* is essentially the same as that in FIG. 6*a*. It should be noted that, in FIG. 6*b*, a left part and a right part of a pixel drive circuit perform driving separately, and a principle of this is different from a principle of driving the first area 101 and the second area 102 in an area-divided manner in the embodiments of this application. It should be understood that the driving manner in FIG. 6*b* is to resolve a problem of a drive capability that is not robust or symmetrical arrangement of lines. Even if the display panel 10 is not divided into areas, such a manner in which the left part and the right part of the pixel drive circuit perform driving separately may be used to ensure a drive capability. Actually, the left and right parts of the pixel scan circuit are still electrically connected. However, in the time-divided driving in the embodiments of this application, the first pixel drive circuit and the second pixel drive circuit that are respectively corresponding to the first area 101 and the second area 102 are electrically separated from each other.

It can be learned from the foregoing descriptions that, to enable an entire area to perform display, scanning can be performed only in a time-divided manner, to perform display row by row. Generally, time for scanning one row by a pixel scan circuit is called a row cycle, and time for scanning a complete screen once is called one frame. Generally, a frame frequency is 60 Hz, to be specific, 60 frames are displayed per second. In other words, all the pixels in the first area are scanned for 60 times per second. Therefore, row-by-row display cannot be observed by a human eye.

In the existing technology, because display areas are not obtained through division, an entire screen needs to be scanned row by row simultaneously. In the embodiments of this application, because display areas are obtained through division, and the scan control unit 3042 may further perform independent drive control on different display areas. Therefore, in the embodiments of this application, not only area-divided driving may be performed on the different display areas, but also a manner of time-divided driving may be further used.

Specifically, based on division locations of the display areas, a corresponding time resource may be allocated in advance to a pixel scan circuit corresponding to each display area. For example, the first area 101 and the second area 102 are still used as an example. Time of one frame for scanning pixels in an entire display panel may be divided into two periods: a first time period and a second time period. The first time period may be used by the scan control unit 3042 to control a working state of the first pixel scan circuit, and the second time period may be used by the scan control unit 3042 to control a working state of the second pixel scan circuit. The first time period and the second time period are cyclic in a cycle of each frame, so that in the cycle of each frame, the scan control unit 3042 can sequentially and cyclically control, in the first time period, the first pixel scan circuit to perform scanning and driving, and in the second time period, control the second pixel scan circuit to perform scanning and driving, to implement area-divided and time-divided drive control.

In the embodiments of this application, when both the first area 101 and the second area 102 need to display an image, the scan control unit 3042 may control, in the first time period, the first pixel scan circuit corresponding to the first area 101 to perform scanning and driving (send a drive signal), so that the first area 101 displays the image. After the scanning and driving of the first area 101 are completed, the second time period starts, and the scan control unit 3042 controls the second pixel scan circuit corresponding to the second area 102 to perform scanning and driving (send a drive signal), so that the second area displays the image. Correspondingly, when the first area 101 needs to display an image but the second area 102 does not need to display an image, the scan control unit 3042 may control, in the first time period, the first pixel scan circuit corresponding to the first area 101 to perform scanning and driving, so that the first area 101 displays the image. After the scanning and driving of the first area 101 are completed, the second time period starts, and the scan control unit 3042 controls the second pixel scan circuit corresponding to the second area 102 not to perform scanning and driving (not to send a drive signal), so that the second area cannot display the image. In this way, power consumption required when the second pixel scan circuit scans pixels in the second area 102 in the second time period is reduced. In another implementation, after the scanning and driving of the first area 101 is completed, the second time period starts, and the scan control unit 3042 may alternatively control the first pixel scan circuit corresponding to the first area 101 to continue scanning and driving, so that the image display of the first area 101 is refreshed. In this way, although power consumption is not reduced, a display frame rate of the first area 101 is increased, so that an image display effect is better.

It should be noted that, in the embodiments of this application, settings of the first time period and the second time period may not overlap. Specifically, there may be no interval or a tiny interval between the first time period and the second time period. For example, the second time period may start immediately after the first time period ends, or the second time period may start after a period of time after the first time period ends. In other words, in the embodiments of this application, pixel scan circuits corresponding to the plurality of display areas of the display panel 10 may not be driven simultaneously, but pixel scan circuits corresponding to the different display areas are sequentially driven at specified time. The specified time herein may be a next clock start point after pixel scanning in an adjacent display area is completed, or may be a clock start point at an interval of a specified quantity of clocks after pixel scanning in an adjacent display area is completed. This is not specifically limited in this application. It should be noted that the processor 20, the display driver 30, the power supply module 40, the touch driver 50, and the fingerprint driver 60 in the drive control system are all controlled by a synchronization clock. Therefore, usually scanning start time of the first time period and scanning start time of the second time period are set based on a control rhythm of the synchronization clock, so that a plurality of drive modules, the processor 20, and the like can cooperate synchronously.

Further, in the embodiments of this application, time-divided and area-divided drive control is performed on the pixel scan circuits on the display panel 10. It is described above that the time for scanning a complete screen once is called one frame. In this case, in the embodiments of this application, time for completing one time of scanning of all the display areas is also one frame. Specifically, when one time of scanning is completed, a specific working time period of the pixel scan circuit corresponding to each display area is related to the quantity of display areas. For example, when there are two display areas, a working time period of a pixel scan circuit corresponding to each display area may be half a frame or close to but less than half a frame. Similarly, when there are three display areas, a working time period of a pixel scan circuit corresponding to each display area may be one third of a frame or close to but less than one third of a frame.

Further, to complete the time-divided and area-divided drive control, one or more of the data receiving submodule 301, the data storage submodule 302, and the data processing submodule 303 in the display driver 30 in the embodiments of this application may be designed as modules that can be independently controlled in a time-divided manner, and an enabling control design may be added to the foregoing modules, that is, a corresponding enabling port may be added to the foregoing submodules, and the display driver 30 may control enabling of the foregoing submodules, to control the foregoing submodules to start and stop working. In specific implementation, the MIPI RX, the RAM, the operational amplifier circuit, the DEMUX, and a VGM (Voltage Gamma model, which is a power supplying module of the Gamma circuit) may be designed as independent modules that can be controlled in a time-divided manner, and an enabling control port is added to each module.

Specifically, a corresponding time resource may also be allocated in advance based on the pixel scan circuit corresponding to each display area, and corresponding time resources are allocated to the submodules in the display driver 30. For example, the first area 101 and the second area 102 are still used as an example. When both the first area 101 and the second area 102 need to display an image, the display driver 30 may control all the submodules 301 to 303 to be in an enabled state in the first time period and the second time period, so as to receive and process image data that the first area 101 and the second area 102 need to display, and send processed pixel data signals to corresponding pixels to perform image display. When the first area 101 needs to display an image but the second area 102 does not need to display an image, in the first time period, the display driver 30 may control all the submodules 301 to 303 to be in an enabled state, so as to receive and process image data that the first area 101 needs to display, and send processed pixel data signals to corresponding pixels to perform image display; and in the second time period, the display driver 30 may not send pixel data signals to pixels on the display panel, so that the second area 102 does not display an image, to reduce power consumption for sending the pixel data signals. Further, in the second time period, a specific case of not sending the pixel data signals may be as follows: The display driver 30 still controls all the submodules 301 to 303 to be in the enabled state, or the display driver 30 controls the data processing submodule 303 to be in a disabled state, or the display driver 30 controls all the submodules 301 to 303 to be in a disabled state. In all of the foregoing several cases, the pixel data signals cannot be sent in the second time period. Power consumption can be reduced by using the foregoing several solutions. However, it may be understood that, more submodules in a disabled state in the display driver 30 in the second time period indicate a greater amount by which the power consumption is reduced.

Further, the first time period and the second time period are cyclic in the cycle of each frame, so that in the cycle of each frame, the display driver 30 may sequentially and cyclically control enabling of each submodule in the first time period, and disabling of all or some of the submodules in the second time period, so as to implement area-divided and time-divided drive control.

The processor 20 is configured to receive, generate, and process image data that the display panel 10 needs to display. Specifically, the processor 20 may be a system on chip SOC, and may include an image processor 201, an image processing submodule 202, and a data transmission submodule 203. The image processor 201 may be specifically a GPU (Graphics Processing Unit), and is configured to perform operation work related to an image and a graphic. The image processing submodule 202 is configured to perform optimization processing such as rendering and frame interpolation on an image processed by the GPU. The data transmission submodule 203 may be specifically MIPI TX (where the MIPI TX is a data sending module in the MIPI protocol), and is configured to send and compress image data processed by the image processor 201 and the image processing submodule 202, so that the display driver 30 performs further processing and then displays the image data on the display panel 10.

In the embodiments of this application, the processor 20 may alternatively determine, based on a display requirement, time resources for sending image data of different areas to the display driver 30. An allocated time resource is used to indicate that image data may be sent in the time period. However, actually, the time resource may be occupied or may not be occupied, that is, the image data may not be sent in the time period. For example, the first area 101 and the second area 102 are still used as an example. Time of one frame for scanning pixels in an entire display panel may be divided into two periods: a first time period and a second time period. The first time period may be used to send image data of the first area 101 to the display driver 30, and the second time period may be used to send image data of the second area 102 to the display driver 30. However, image data is not necessarily sent in a corresponding time period. For example, when both the first area 101 and the second area 102 need to display an image, the processor 20 may send the image data of the first area 101 in the first time period, and send the image data of the second area 102 in the second time period. When the first area 101 needs to display an image but the second area 102 does not need to display an image, the processor 20 may send the image data of the first area 101 in the first time period, and stop sending the image data in the second time period. In this way, power consumption required for sending the image data by the processor 20 in the second time period is reduced.

The power supply module 40 is described by still referring to FIG. 6a and FIG. 6b. The power supply module 40 is configured to supply power to pixels in the display driver 30, the touch driver 50, the fingerprint driver 60, and the display panel 10. It may be understood that the display driver 30, the touch driver 50, and the fingerprint driver 60 require power supplying, to perform work such as data processing or receiving. Specifically, the power supply module 40 may provide a digital power supply, a kernel power supply, and an analog power supply for the display driver 30, and the power supply module 40 may also provide an analog power supply and a digital power supply for the touch driver 50 and the fingerprint driver 60. In specific implementation, the power supply module 40 may be integrated in a power management module, and may also be referred to as a power integrated circuit, a power supply control circuit, a power supply chip, a power supply, or the like.

In the embodiments of this application, the power supply module 40 is connected to all the pixels in the first area 101 and all the pixels in the second area 102, that is, the power supply module 40 independently supplies power to the pixels in the first area 101 and the pixels in the second area 102, and power supplying to the first area 101 and power supplying to the second area 102 do not affect each other. Further, when there are more display areas, the power supply module 40 is connected to pixels in each display area, to implement independent and area-divided power supplying. Specifically, in FIG. 6a and FIG. 6b, ELVDD1 (anode voltage) and ELVSS1 (cathode voltage) are respectively a positive power supply voltage and a negative power supply voltage provided by the power supply module 40 for pixels in the first area 101, and ELVDD2 and ELVSS2 are respectively a positive power supply voltage and a negative power supply voltage provided by the power supply module 40 for pixels in the second area 102. After the display driver 30 mentioned above drives pixels in the first area 101 or the second area 102 of the display panel 10, power supplying from the power supply module 40 can enable the driven pixels to emit light to perform image display.

Further, in an embodiment, corresponding touch sensors are configured on the display panel 10 in this application, to form a touchscreen. The display panel 10 has touch scan circuits corresponding to the touch sensors, and the touch scan circuits are configured to sequentially scan and drive the touch sensors of the display panel 10, so as to perform touch signal monitoring. To perform drive control on a touch scan circuit, the drive control system may further include the touch driver 50. The touch driver 50 may send touch drive signals to the touch scan circuit, so that the touch scan circuit drives corresponding touch sensors, so as to perform touch signal monitoring. In specific implementation, the touch driver 50 may also be referred to as a touch integrated circuit/touch chip, a touch drive circuit/touch drive chip, a touch control circuit/touch control chip/touch controller, and the like. The touch sensors, the touch scan circuit, and the touch driver 50 may be referred to as a touch module.

Specifically, the touch scan circuit may have two design schemes: mutual-capacitance and self-capacitance. The following separately describes the two design schemes.

Figure 8A:
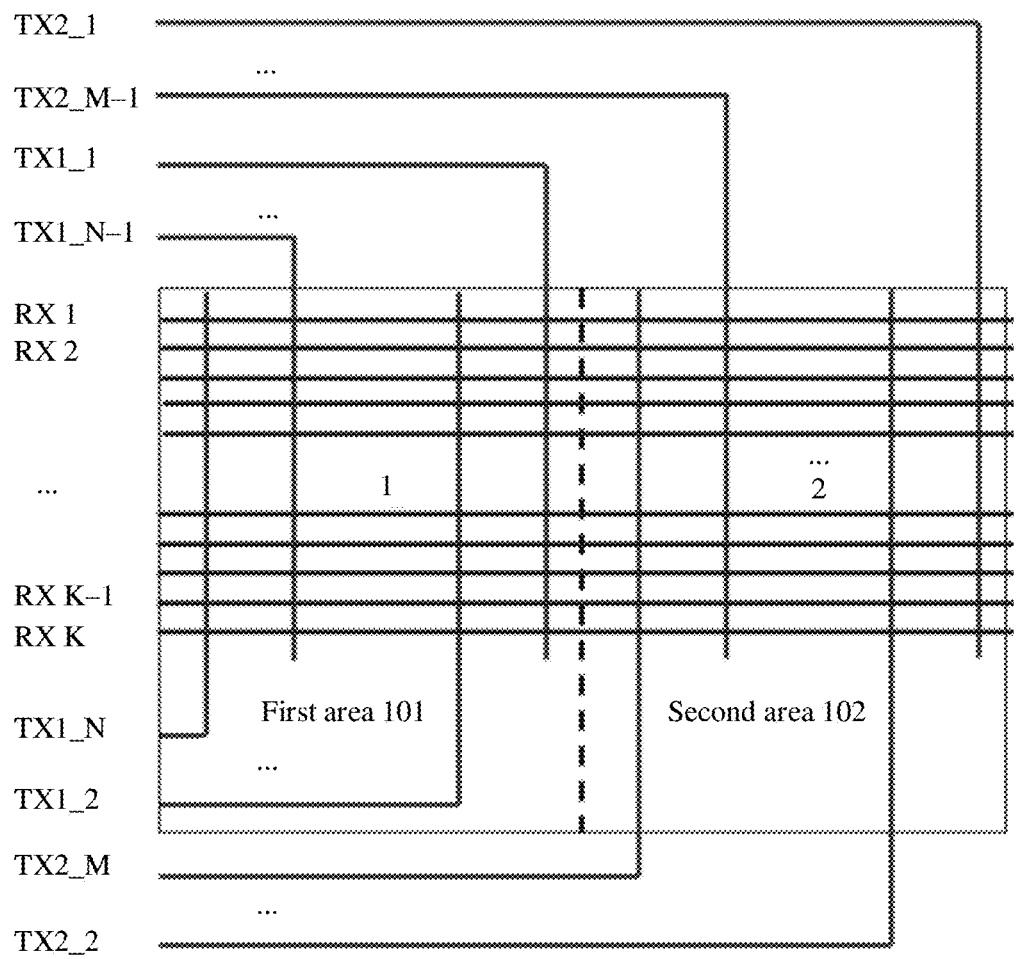
FIG. 8a is a schematic diagram of a mutual-capacitance touch scan circuit according to an embodiment of this application.

As shown in FIG. 8a, in a mutual-capacitance design scheme, a touch scan circuit includes a longitudinal touch scan line (for example, TX1_1 to TX1_N and TX2_1 to TX2_M in FIG. 8a) and a latitudinal touch signal receiving line (for example, RX_1 to RX_K in FIG. 8a), and each point at which a touch scan line intersects with a touch signal receiving line may be considered as one touch sensor. The touch scan line is used to drive a corresponding column of touch sensors on the line. When the touch scan line receives a touch drive signal of the touch driver 50, a touch sensor in the column starts to perform touch signal monitoring, and feeds back a detected touch signal to the touch driver 50 by using a touch signal receiving line connected to the touch sensor. It should be noted that the touch driver 50 controls each touch scan line separately, and sends a touch drive signal to each touch scan line based on a scan control clock sequentially.

Figure 8B:
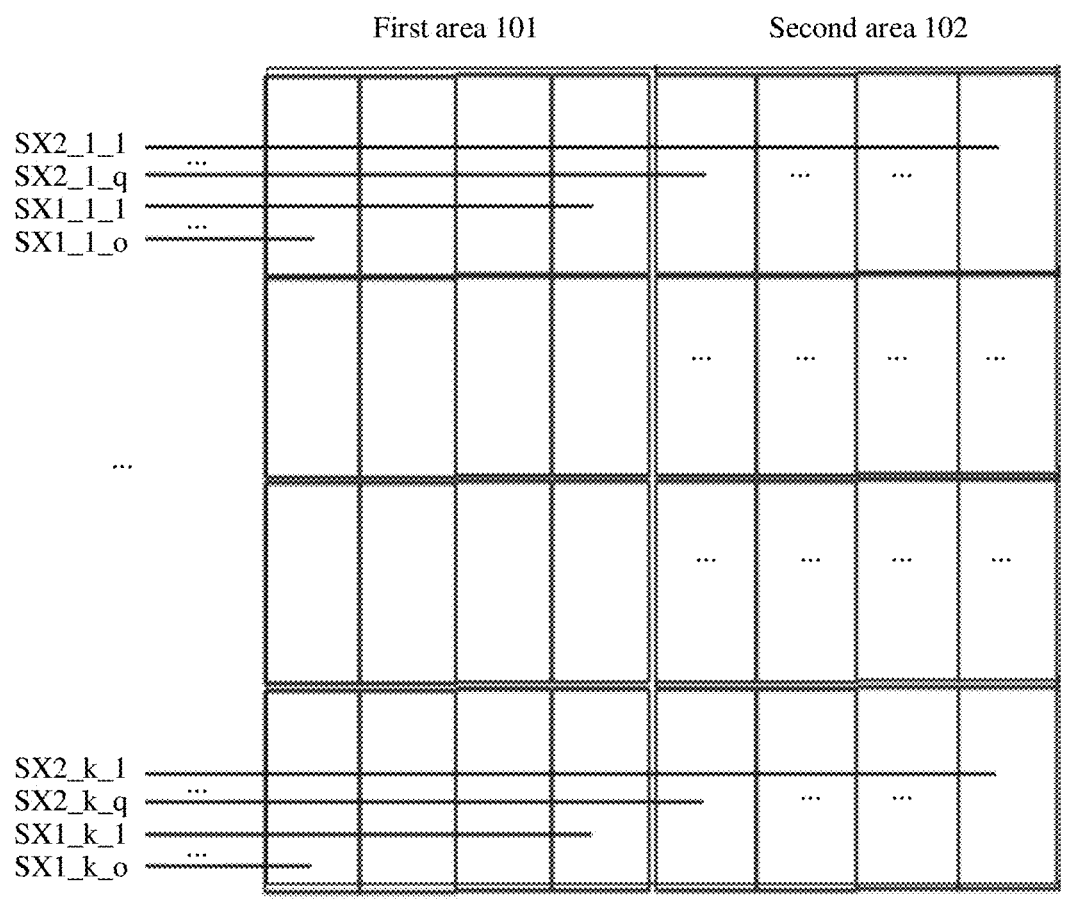
FIG. 8b is a schematic diagram of a self-capacitance touch scan circuit according to an embodiment of this application.

As shown in FIG. 8b, in a self-capacitance design scheme, a touch scan circuit includes a touch scan line (for example, SX1_1_1 to SX1_k_o and SX2_1_1 to SX2_k_q in FIG. 8b) that is independently connected to each touch sensor. The touch scan line is not only used to drive one touch sensor correspondingly connected to the touch scan line, but also used to feed back a touch signal detected by the touch sensor to the touch driver 50. When a touch scan line receives a drive signal of the touch driver 50, a touch sensor corresponding to the touch scan line starts to perform touch signal monitoring, and feed back a detected touch signal to the touch driver 50 by using the same touch scan line. It should be noted that the touch driver 50 controls each touch scan line separately, and sends a touch drive signal to each touch scan line based on a scan control clock sequentially.

Still refer to FIG. 8a and FIG. 8b. In the embodiments of this application, the display panel 10 is divided into a plurality of display areas, and correspondingly, touch scan circuits and touch sensors disposed on the display panel 10 are also divided into a plurality of areas. The first area 101 and the second area 102 are used as an example. The first area 101 and the second area 102 each have corresponding touch sensors and a touch scan circuit. However, different from the pixel scan circuits described above, in the embodiments of this application, the touch scan circuits respectively corresponding to the first area 101 and the second area 102 may still be connected to each other, or may need to be electrically separated from each other. This mainly depends on a design scheme used by the touch scan circuit and whether the display panel 10 is divided into the display areas through latitudinal or longitudinal division.

Specifically, in each of the implementation scenarios shown in FIG. 3a, FIG. 3b, FIG. 4a, and FIG. 4b, the display areas are obtained through latitudinal division, that is, the display panel 10 has a plurality of display areas in a latitudinal direction (left-right direction). In the implementation scenario shown in FIG. 5, the display areas are obtained through longitudinal division, that is, the display panel 10 has a plurality of display areas in a longitudinal direction (up-down direction).

If a latitudinal division manner is used, in either of the mutual-capacitance design scheme or the self-capacitance design scheme, each touch scan line is independently controlled. Therefore, the touch scan circuits respectively corresponding to the first area 101 and the second area 102 may still be connected to each other, and do not need to be electrically separated from each other. For example, FIG. 8a (mutual-capacitance) shows the touch scan circuits respectively corresponding to the first area 101 and the second area 102. The first area 101 is controlled by several columns of touch scan lines: TX1_1 to TX1_N. If the touch driver 50 drives only the touch sensors of the first area 101, the touch driver 50 may sequentially send a drive signal only to each touch scan line in TX1_1 to TX1_N. Similarly, for example, FIG. 8b (self-capacitance) shows the touch scan circuits respectively corresponding to the first area 101 and the second area 102. If the touch driver 50 drives only the touch sensors of the first area 101, the touch driver 50 may sequentially send a touch drive signal only to each touch scan line in SX1_1_1 to SX1_k_o.

If a longitudinal division manner is used, because as described above, in the self-capacitance design scheme, each touch scan line is independently connected to one touch sensor, touch drive circuits corresponding to a plurality of display areas still do not need to be electrically separated from each other. However, for the mutual-capacitance design scheme, because touch scan lines are longitudinal, if touch drive circuits are not divided into areas, an entire column of touch sensors corresponding to the touch scan lines are driven together, and consequently, area-divided independent control cannot be implemented. Therefore, if the longitudinal division manner is used for the display panel 10, and the touch drive circuit is of a mutual-capacitance type, the touch scan circuits respectively corresponding to the first area 101 and the second area 102 need to be electrically separated from each other. To be specific, the first area 101 corresponds to a first touch scan circuit, the second area 102 corresponds to a second touch scan circuit, and the first touch scan circuit and the second touch scan circuit are independent of each other. Specifically, a touch scan line of the first touch scan circuit and a touch scan line of the second touch scan circuit may be electrically independent of each other.

It can be learned from the foregoing descriptions that the touch driver 50 may perform independent drive control on touch scan circuits corresponding to different display areas. Therefore, in the embodiments of this application, a manner of time-divided driving may also be used for the touch scan circuits corresponding to the different display areas.

Specifically, based on division locations of the display areas, a corresponding time resource may be allocated in advance to a touch scan circuit corresponding to each display area. For example, the first area 101 and the second area 102 are still used as an example. Time of one frame for scanning touch sensors on an entire display panel may be divided into two periods: a third time period and a fourth time period. The third time period may be used by the touch driver 50 to control a working state of the first touch scan circuit, and the fourth time period may be used by the touch driver 50 to control a working state of the second touch scan circuit. The third time period and the fourth time period are cyclic in a cycle of each frame, so that in the cycle of each frame, the touch driver 50 can sequentially and cyclically control, in the third time period, the first touch scan circuit to perform scanning and driving, and in the fourth time period, control the second touch scan circuit to perform scanning and driving, to implement area-divided and time-divided drive control.

In the embodiments of this application, when both the first area 101 and the second area 102 need to display an image, the touch driver 50 may control, in the third time period, the touch scan circuit corresponding to the first area 101 to perform scanning and driving (send a touch drive signal), so that the touch sensors corresponding to the first area 101 perform touch signal monitoring. After the touch scan circuit corresponding to the first area 101 completes the scanning and driving, the fourth time period starts, and then the touch driver 50 controls the touch scan circuit corresponding to the second area 102 to perform scanning and driving (send a touch drive signal), so that the touch sensors corresponding to the second area perform touch signal monitoring. Correspondingly, when the first area 101 needs to display an image but the second area 102 does not need to display an image, the touch driver 50 may control, in the third time period, the first touch scan circuit corresponding to the first area 101 to perform scanning and driving (send a touch drive signal), so that the touch sensors corresponding to the first area 101 perform touch signal monitoring. After the scanning and driving of the first area 101 are completed, the fourth time period starts, and the touch driver 50 controls the second touch scan circuit corresponding to the second area 102 not to perform scanning and driving (not to send a touch drive signal), so that the touch sensors corresponding to the second area 102 do not perform touch signal monitoring. In this way, power consumption required when the second touch scan circuit scans the touch sensors of the second area 102 in the fourth time period is reduced. In another implementation, after the scanning and driving of the touch sensors of the first area 101 is completed, the fourth time period starts, and the touch driver 50 may alternatively control the first touch scan circuit corresponding to the first area 101 to continue scanning and driving, so that the touch signal monitoring of the first area 101 is started again. In this way, although power consumption is not reduced, a touch monitoring frequency of the first area 101 is increased, so that touch sensing sensitivity is better.

It should be noted that, in the embodiments of this application, settings of the third time period and the fourth time period may not overlap. Further, the third time period may be consistent with or inconsistent with the first time period, and the fourth time period may be consistent with or inconsistent with second time period. Specifically, there may be no interval or a tiny interval between the third time period and the fourth time period. For example, the fourth time period may start immediately after the third time period ends, or the fourth time period may start after a period of time after the third time period ends. In other words, in the embodiments of this application, touch scan circuits corresponding to the plurality of display areas of the display panel 10 may not be driven simultaneously, but touch scan circuits corresponding to the different display areas are sequentially driven at specified time. The specified time herein may be a next clock start point after touch sensor scanning in an adjacent display area is completed, or may be a clock start point at an interval of a specified quantity of clocks after touch sensor scanning in an adjacent display area is completed. This is not specifically limited in this application. It should be noted that the processor 20, the display driver 30, the power supply module 40, the touch driver 50, and the fingerprint driver 60 in the drive control system are all controlled by a synchronization clock. Therefore, usually scanning start time of the third time period and scanning start time of the fourth time period are set based on a control rhythm of the synchronization clock, so that a plurality of drive modules, the processor 20, and the like can cooperate synchronously.

Still further, in an embodiment, corresponding fingerprint sensors may be further disposed on the display panel 10 in this application. The display panel 10 has fingerprint scan circuits corresponding to the fingerprint sensors, and the fingerprint scan circuits are configured to sequentially scan and drive the fingerprint sensors of the display panel 10, so as to perform fingerprint signal monitoring. To perform drive control on a fingerprint scan circuit, the drive control system may further include the fingerprint driver 60. The fingerprint driver 60 may send fingerprint drive signals to the fingerprint scan circuit, so that the fingerprint scan circuit drives corresponding fingerprint sensors, so as to perform fingerprint signal monitoring. In the embodiments of this application, the fingerprint sensors may be distributed on the entire display panel 10, or may be distributed in some areas on the display panel 10. Therefore, the fingerprint sensors are applicable to an electronic device with a full-screen fingerprint recognition function, or are applicable to an electronic device with an area fingerprint recognition function.

Specifically, the fingerprint sensor is similar to the touch sensor, a function and a layout of the fingerprint scan circuit are also similar to those of the touch scan circuit, and a module function and a drive control manner of the fingerprint driver 60 are also similar to those of the touch driver 50. For details, refer to the foregoing descriptions of the touch driver 50 and the touch scan circuit. Details are not described herein again.

It may be understood that, in the embodiments of this application, the display panel 10 is divided into a plurality of display areas, and correspondingly, the fingerprint scan circuits and the fingerprint sensors that are disposed on the display panel 10 are also assigned to the plurality of areas. The fingerprint driver 60 may independently control fingerprint scan circuits corresponding to different display areas. For example, the fingerprint driver 60 may drive only fingerprint sensors of the first area 101, and then may sequentially send fingerprint drive signals only to fingerprint sensing drive lines corresponding to the first area 101 based on a scan control clock.

It can be learned from the foregoing descriptions that the fingerprint driver 60 may perform independent drive control on touch drive circuits corresponding to the different display areas. Therefore, in the embodiments of this application, a manner of time-divided driving may also be used for the touch drive circuits corresponding to the different display areas.

Specifically, based on division locations of the display areas, a corresponding time resource may be allocated in advance to a fingerprint scan circuit corresponding to each display area. For example, the first area 101 and the second area 102 are still used as an example. Time of one frame for scanning fingerprint sensors on an entire display panel may be divided into two periods: a fifth time period and a sixth time period. The fifth time period may be used by the fingerprint driver 60 to control a working state of the first fingerprint scan circuit, and the sixth time period may be used by the fingerprint driver 60 to control a working state of the second fingerprint scan circuit. The fifth time period and the sixth time period are cyclic in a cycle of each frame, so that in the cycle of each frame, the fingerprint driver 60 can sequentially and cyclically control, in the fifth time period, the first fingerprint scan circuit to perform scanning and driving, and in the sixth time period, control the second fingerprint scan circuit to perform scanning and driving, to implement area-divided and time-divided drive control.

In the embodiments of this application, when both the first area 101 and the second area 102 need to display an image, the fingerprint driver 60 may control, in the fifth time period, the fingerprint scan circuit corresponding to the first area 101 to perform scanning and driving (send a fingerprint drive signal), so that the fingerprint sensors 50 corresponding to the first area 101 perform fingerprint signal monitoring. After the fingerprint scan circuit corresponding to the first area 101 completes the scanning and driving, the sixth time period starts, and then the fingerprint driver 60 controls the fingerprint scan circuit corresponding to the second area 102 to perform scanning and driving (send a fingerprint drive signal), so that the fingerprint sensors 50 corresponding to the second area perform fingerprint signal monitoring. Correspondingly, when the first area 101 needs to display an image but the second area 102 does not need to display an image, the fingerprint driver 60 may control, in the fifth time period, the first fingerprint scan circuit corresponding to the first area 101 to perform scanning and driving (send a fingerprint drive signal), so that the fingerprint sensors corresponding to the first area 101 perform fingerprint signal monitoring. After the scanning and driving of the first area 101 are completed, the sixth time period starts, and the fingerprint driver 60 controls the second fingerprint scan circuit corresponding to the second area 102 not to perform scanning and driving (not to send a fingerprint drive signal), so that the fingerprint sensors corresponding to the second area 102 do not perform fingerprint signal monitoring. In this way, power consumption required when the second fingerprint scan circuit scans the fingerprint sensors of the second area 102 in the sixth time period is reduced. In another implementation, after the scanning and driving of the fingerprint sensors of the first area 101 is completed, the sixth time period starts, and the fingerprint driver 60 may alternatively control the first fingerprint scan circuit corresponding to the first area 101 to continue scanning and driving, so that the fingerprint signal monitoring of the first area 101 is started again. In this way, although power consumption is not reduced, a fingerprint monitoring frequency of the first area 101 is increased, so that fingerprint sensing sensitivity is better.

It should be noted that, in the embodiments of this application, settings of the fifth time period and the sixth time period may not overlap. Further, the fifth time period may be consistent with or inconsistent with the first time period, and the sixth time period may be consistent with or inconsistent with the second time period. Specifically, there may be no interval or a tiny interval between the fifth time period and the sixth time period. For example, the sixth time period may start immediately after the fifth time period ends, or the sixth time period may start after a period of time after the fifth time period ends. In other words, in the embodiments of this application, fingerprint scan circuits corresponding to the plurality of display areas of the display panel 10 may not be driven simultaneously, but fingerprint scan circuits corresponding to the different display areas are sequentially driven at specified time. The specified time herein may be a next clock start point after fingerprint sensor scanning in an adjacent display area is completed, or may be a clock start point at an interval of a specified quantity of clocks after fingerprint sensor scanning in an adjacent display area is completed. This is not specifically limited in this application. It should be noted that the processor 20, the display driver 30, the power supply module 40, the touch driver 50, and the fingerprint driver 60 in the drive control system are all controlled by the synchronization clock. Therefore, usually scanning start time of the fifth time period and scanning start time of the sixth time period are set based on the control rhythm of the synchronization clock, so that the plurality of drive modules, the processor 20, and the like can cooperate synchronously.

It can be learned that in the foregoing drive control system, the processor 20, the display driver 30, the power supply module 40, the touch driver 50, and the fingerprint driver 60 each have a capability of implementing time-divided and area-divided drive control on corresponding functions (display, power supplying, touch, and fingerprint recognition) of the first area 101 and the second area 102. Therefore, in the embodiments of this application, at least one of or a combination of the foregoing plurality of functional devices may implement time-divided and area-divided drive control. To be specific, it may be that only the display driver 30 implements time-divided and area-divided display drive control, or only the power supply module 40 implements time-divided and area-divided power supplying drive control, or only the touch driver 50 implements time-divided and area-divided touch drive control, or the fingerprint driver 60 implements time-divided and area-divided fingerprint recognition drive control, or the foregoing several types of drive control are combined, for example, a time-divided and area-divided control manner may be used for all of the display drive control, the power supplying drive control, the touch drive control, and the fingerprint recognition drive control.

With reference to the foregoing descriptions of the drive control system, the following further describes drive control methods in the embodiments of this application. The drive control methods may be applied to the electronic device shown in FIG. 1.

Figure 9:
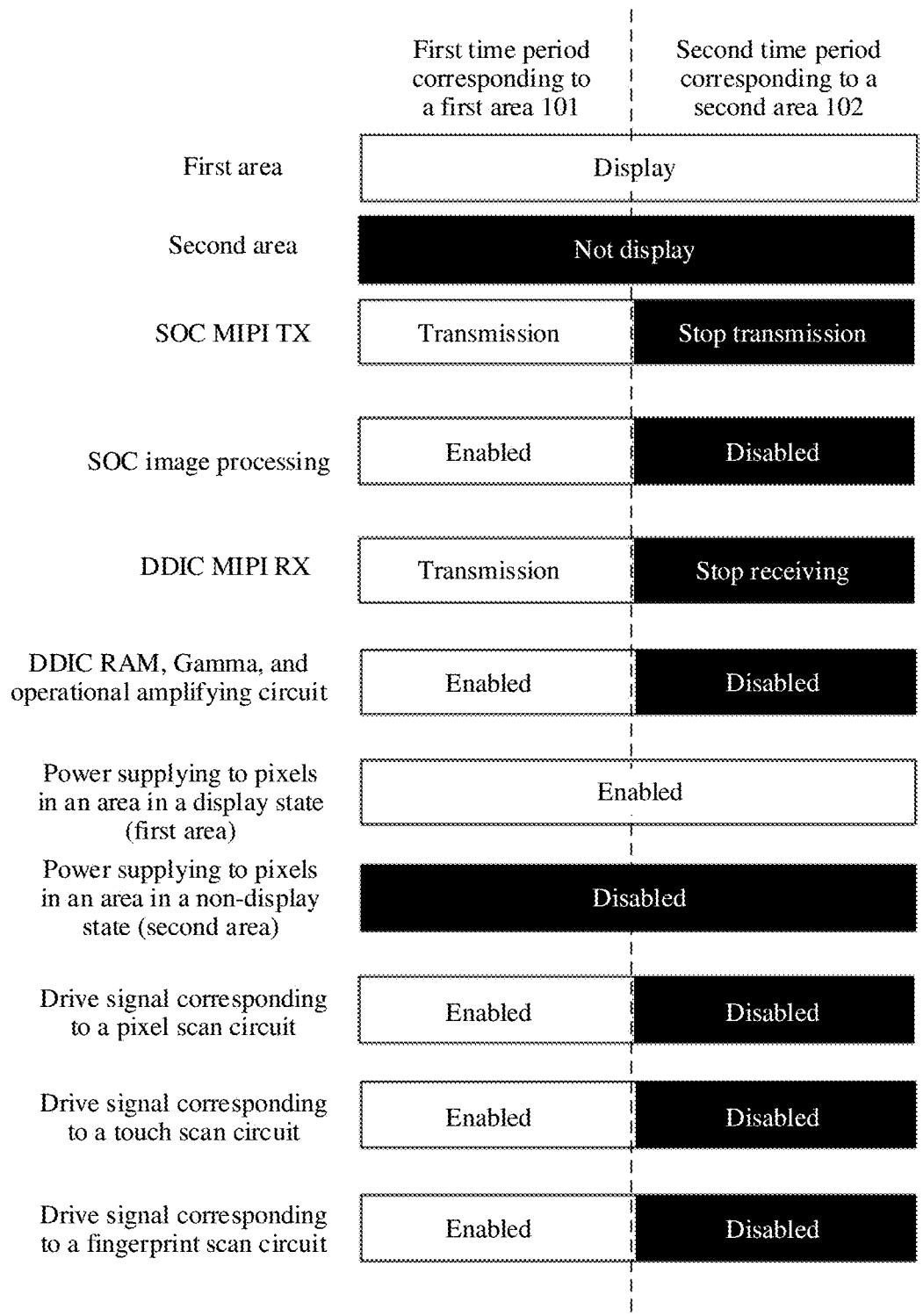
FIG. 9 is a schematic diagram of function control of a drive control method according to an embodiment of this application.
Figure 10:
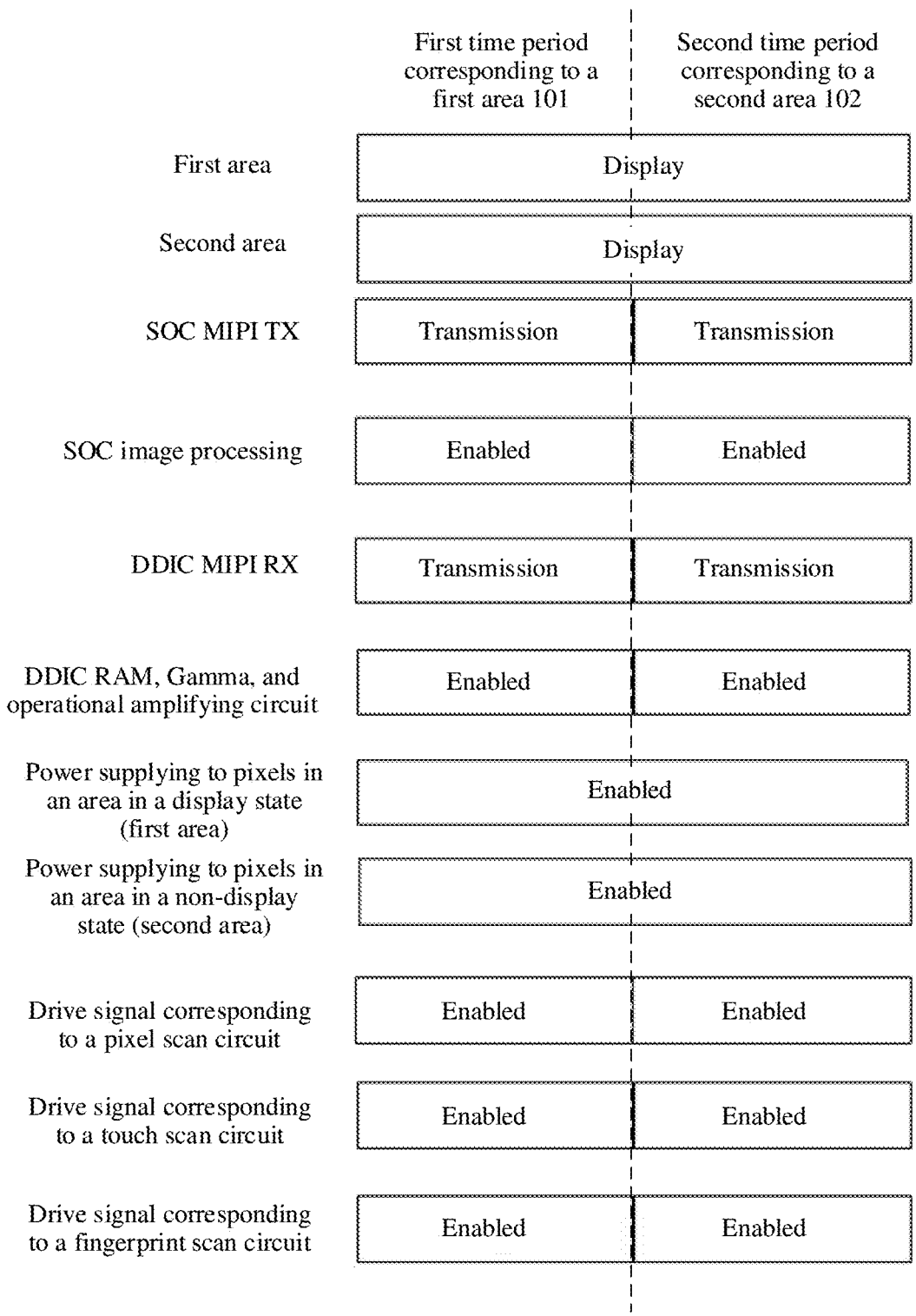
FIG. 10 is a schematic diagram of function control of another drive control method according to an embodiment of this application.

First, an overall idea of the drive control methods in the embodiments of this application is described. FIG. 9 and FIG. 10 each show a drive control method used when a display panel 10 has two display areas (a first area 101 and a second area 102). FIG. 9 shows the drive control method used when the first area 101 needs to display an image but the second area 102 does not need to display an image. FIG. 10 shows the drive control method used when both the first area 101 and the second area 102 are in a display state. It can be learned by comparing FIG. 9 with FIG. 10 that a core idea of the drive control methods in the embodiments of this application is as follows: On a time resource (In a first time period) of a display area that needs to display an image, submodules of the display driver 30, the power supply module 40, the touch driver 50, the fingerprint driver 60, and the processor 20 (SOC) are in a working state or an enabled state, so as to ensure processing and transmission of image data of the display area, and ensure power supplying and display of pixels, so that it is ensured that the pixels in the display area display an image; ensure driving of the touch sensors, so that touch signal monitoring is ensured; and ensure driving of the fingerprint sensors, so that fingerprint signal monitoring is ensured. On a time resource (In a second time period) of a display area that needs to display an image, some submodules of at least one of the display driver 30, the power supply module 40, the touch driver 50, the fingerprint driver 60, and/or the processor 20 (SOC) stop working or sleep, that is, stop processing and transmission of image data of the display area, stop driving and power supplying of pixels, stop driving of the touch sensors, and stop driving of the fingerprint sensors. In this way, a display area in a non-display state does not display an image, and some submodules of the display driver 30, the power supply module 40, the touch driver 50, the fingerprint driver 60, and/or the processor 20 (SOC), and a pixel scan circuit, a fingerprint scan circuit, and/or a touch scan circuit, and the pixels, the touch sensors, and/or the fingerprint sensors all stop working.

It should be noted that, in the examples in FIG. 9 and FIG. 10, time resources allocated to the display driver 30, the touch driver 50, and the fingerprint driver 60 are consistent. It should be understood that, as described above, in specific implementation, working time periods of the three may be different, but need to be synchronized.

It can be understood that, in an existing technology, a black image still needs to be input to a display area that does not need to display an image. Therefore, as in a case of needing to display an image, a large amount of power consumption needs to be generated for each drive module, scan circuit, and the like. The embodiments of this application are based on an improved drive control system, and use a manner of time-divided and area-divided drive control, so that a power loss of an electronic device in each aspect of a display area that does not need to display an image is greatly reduced.

The following uses three display areas (the first area 101, the second area 102, and the third area 103) as an example to further describe a drive control method of each module in the drive control system in the embodiments of this application. Actually, the three display areas may also be considered to include one first area and two second areas, or may be considered to include two first areas and one second area. Drive control is similar to drive control of two display areas.

Before the drive control method is described, a manner of determining a display requirement of a display area is first described.

In the embodiments of this application, a display requirement of each display area may be determined by the processor 20. For example, as a general controller, the processor 20 may receive, from a user, various operations and instructions for the electronic device. When some operations or instructions are triggered, the processor 20 may determine which display areas need to display an image and which display areas do not need to display an image. For example, when the processor 20 receives one-hand operation instructions triggered by the user, the processor 20 automatically corresponds to whether the display areas on the display panel 10 of the electronic device need to display an image or do not need to display an image in a one-hand operation state. For example, the first area 101 needs to display an image, and the second area 102 does not need to display an image. For another example, the processor 20 may alternatively receive parameter information transferred by various sensors, and some parameter information may indicate which display areas need to display an image and which display areas do not need to display an image. For example, an optical proximity sensor may monitor proximity of an object by monitoring reflected light. When detecting plenty of reflected light, the optical proximity sensor may send status information to the processor 20. After receiving the information, the processor 20 may determine that shells of the electronic device are very close to each other, that is, the electronic device is changing to a folded state or is already in the folded state. In this case, the processor 20 automatically corresponds to a case in which the first area 101 in the display areas of the display panel 10 of the electronic device in the folded state needs to display an image, and the second area 102 does not need to display an image.

Further, after determining a display requirement of each display area, the processor 20 may send first status indication information to a target drive module, where the first status indication information is used to indicate the display requirement of each display area, to be specific, which display area needs to display an image and which display area does not need to display an image. The target drive module may include at least one of the display driver 30, the power supply module 40, the touch driver 50, and the fingerprint driver 60. In this way, the foregoing module may use different drive control manners for different display areas. Certainly, the processor 20 specifically sends first status indication information to which module is related to which modules use drive control manner. If some modules do not use an area-divided and time-divided drive control manner, a display status of a display area does not affect drive control manners of the display areas, and then the processor 20 may not need to send first status indication information to these modules.

It should be noted that, in some implementation scenarios, indication information (for example, the status information sent by the optical proximity sensor) directly sent by a third-party entity may not be parsed by using instructions of the processor 20, and then the indication information may alternatively be directly sent by the third-party entity to the target drive module without being transferred again by the processor 20. For example, the optical proximity sensor may directly send status information to at least one of the display driver 30, the power supply module 40, the touch driver 50, and the fingerprint driver 60. After receiving the status information, the foregoing module may directly determine a drive control manner that needs to be currently used.

It may be understood that display requirements of the three display areas may have the following several cases:
1. The three display areas, namely, the first area 101, the second area 102, and the third area 103, all need to display an image.
2. None of the three display areas, namely, the first area 101, the second area 102, and the third area 103, needs to display an image.
3. In the first area 101, the second area 102, and the third area 103, at least one display area does not need to display an image, and the other display areas need to display an image, that is, some display areas need to display an image and some display areas do not need to display an image.

In the foregoing three cases, the third case actually includes a plurality of cases, but actual processing manners of the plurality of cases are the same. Therefore, in the following descriptions of the embodiments of this application, an example in which the first area 101 and the third area 103 do not need to display an image and the second area 102 needs to display an image is used for detailed description. For all the other cases, refer to this example.

Several concepts are first defined herein.

Pixel scan circuits corresponding to the first area 101, the second area 102, and the third area 103 are a first pixel scan circuit, a second pixel scan circuit, and a third pixel scan circuit respectively. Touch scan circuits corresponding to the first area 101, the second area 102, and the third area 103 are a first touch scan circuit, a second touch scan circuit, and a third touch scan circuit respectively. Fingerprint scan circuits corresponding to the first area 101, the second area 102, and the third area 103 are a first fingerprint scan circuit, a second fingerprint scan circuit, and a third fingerprint scan circuit respectively.

Preset time resources on which the pixel scan circuits need to scan pixels in the first area 101, the second area 102, and the third area 103 are a first time period, a second time period, and a third time period respectively. The three time resources do not overlap, and are constantly and periodically cyclic (where the scanning is usually from right to left, to be specific, the second time period follows the third time period, the first time period follows the second time period, the third time period follows the first time period, and so on). Preset time resources on which the touch scan circuits need to scan touch sensors of the first area 101, the second area 102, and the third area 103 are a fourth time period, a fifth time period, and a sixth time period respectively. The three time resources do not overlap, and are constantly and periodically cyclic (where the fifth time period follows the sixth time period, the fourth time period follows the fifth time period, the sixth time period follows the fourth time period, and so on). Preset time resources on which the fingerprint scan circuits need to scan fingerprint sensors of the first area 101, the second area 102, and the third area 103 are a seventh time period, an eighth time period, and a ninth time period respectively. The three time resources do not overlap, and are constantly and periodically cyclic (where the eighth time period follows the ninth time period, the seventh time period follows the eighth time period, the ninth time period follows the seventh time period, and so on).

First, a drive control method of each module in an implementation scenario that is in the third case and in which the first area 101 and the third area 103 do not need to display an image and the second area 102 needs to display an image is described.

1. Processor 20

When the first area 101, the second area 102, and the third area 103 all need to display an image, the processor 20 may process image data respectively corresponding to the first area 101, the second area 102, and the third area 103, which may be specifically a processing process of the image processor 201 and the image processing submodule 202 mentioned above. In addition, the processor 20 sends the image data corresponding to the display areas to the display driver 30 based on each preset time resource. For example, when the processor 20 is currently in the first time period, the processor 20 sends the image data of the first area 101 to the display driver 30.

After the processor 20 determines that the first area 101 and the third area 103 do not need to display an image and the second area 102 needs to display an image, the processor 20 stops generating and processing the image data of the first area 101 and the third area 103, and processes only the image data of the second area 102. When detecting that the processor 20 is in the third time period, the processor 20 stops work of the data transmission submodule 203, that is, stops sending the image data of the third area 103 to the display driver 30. When detecting that the processor 20 is in the second time period, the processor 20 starts work of the data transmission submodule, that is, starts to send the image data of the second area 102 to the display driver 30. When detecting that the processor 20 is in the first time period, the processor 20 stops work of the data transmission submodule 203, that is, stops sending the image data of the first area 101 to the display driver 30.

Figure 11:
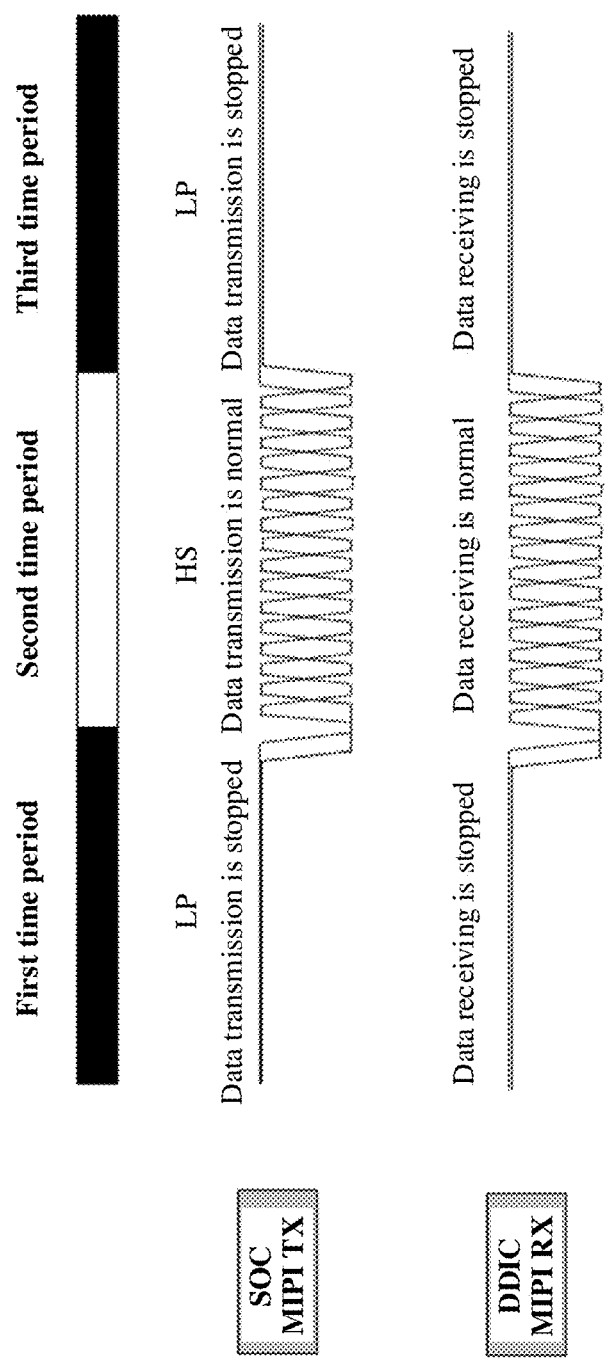
FIG. 11 is a diagram of signal control time sequences of a data transmission submodule of a processor and a data receiving submodule of a display driver in one frame according to an embodiment of this application.

FIG. 11 shows a diagram of signal control time sequences of the data transmission submodule 203 of the processor 20 and the data receiving submodule 301 of the display driver 30 in one frame. When the processor 20 is an SOC, and the data transmission submodule 203 is MIPI TX, in the first time period and the third time period, an LP (LowPower) working mode is separately used, to be specific, only an initialization signal is provided, but no data transmission is performed; and in the second time period, an HS (HighSpeed) working mode is used, to be specific, high-speed data transmission is performed.

It can be learned that, the processor 20 does not process image data of a display area that does not need to display an image and also does not perform data transmission on a time resource of the display area that does not need to display an image; and the processor 20 processes only image data of a display area that needs to display an image, and performs data transmission only on a time resource of the display area that needs to display an image. In this way, power consumption of the processor 20 for processing and transmission of the image data of the display area that does not need to display an image can be reduced.

2. Display Panel 10, Display Driver 30, and Power Supply Module 40

The display driver 30 mainly performs drive control on a pixel scan circuit, the pixel scan circuit performs drive control on pixels on the display panel 10, and the power supply module 40 supplies power to the pixels on the display panel 10. Therefore, the three modules are relatively closely associated with each other, are all related to drive control in respect of display, and therefore are described together.

In an implementation of the embodiments of this application, after the display driver 30 determines that the first area 101 and the third area 103 do not need to display an image and the second area 102 needs to display an image, when detecting that the display driver 30 is in the third time period, the display driver 30 stops work of at least one of the data receiving submodule 301, the data storage submodule 302, the data processing submodule 303, and the data switching control unit 3041, that is, disables the foregoing at least one submodule; when detecting that the display driver 30 is in the second time period, the display driver 30 starts work of the data receiving submodule 301, the data storage submodule 302, the data processing submodule 303, and the data switching control unit 3041, that is, enables the foregoing submodules; and when detecting that the display driver 30 is in the first time period, the display driver 30 stops the work of the at least one of the data receiving submodule 301, the data storage submodule 302, the data processing submodule 303, and the data switching control unit 3041, that is, disables the foregoing at least one submodule.

Figure 12:
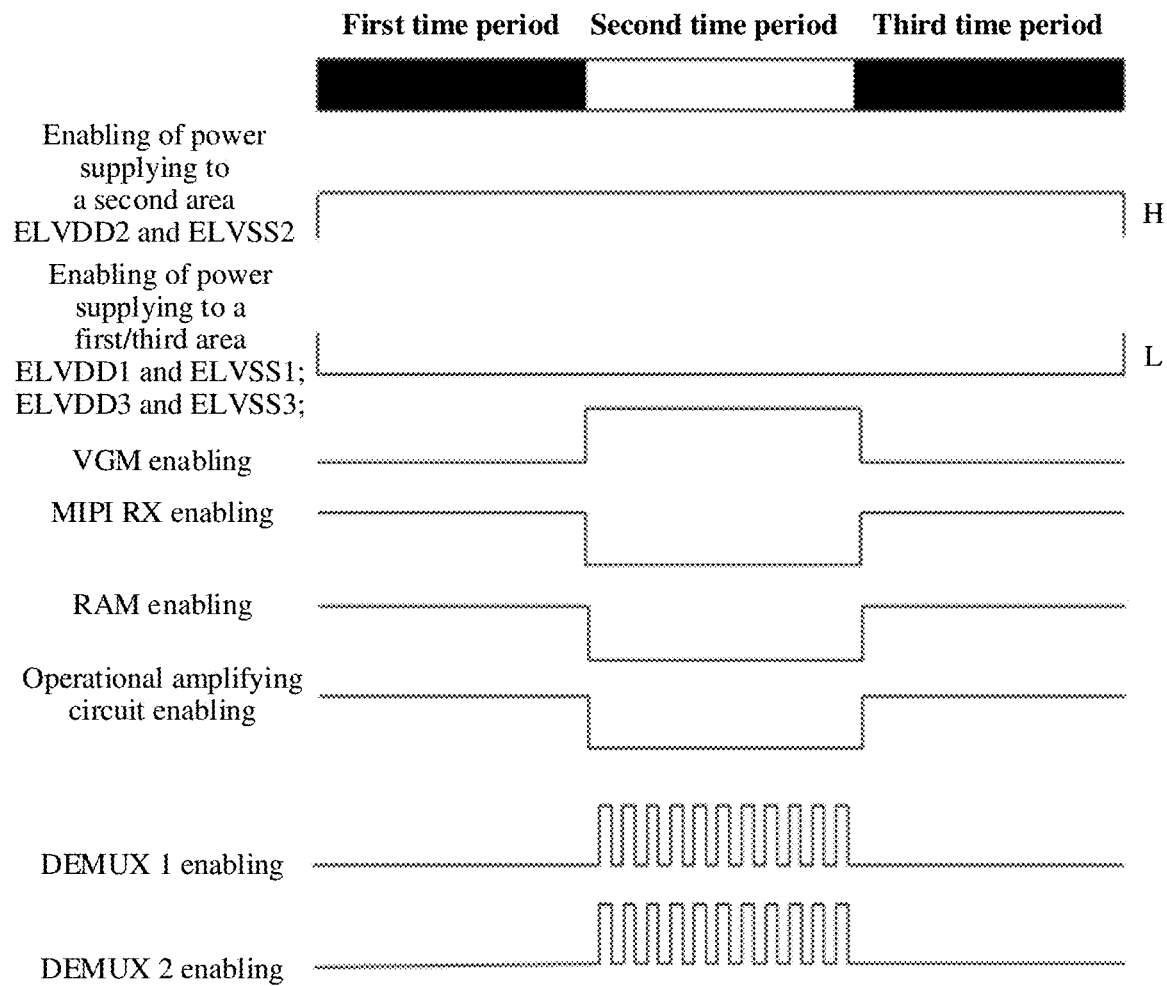
FIG. 12 is a diagram of enabling signal control time sequences of submodules or units in a display driver in one frame according to an embodiment of this application.

FIG. 12 is a diagram of enabling signal control time sequences of submodules or units in a display driver 30 in one frame. When the data processing submodule 303 is a Gamma circuit, enabling control may be implemented on the Gamma circuit by enabling a power supplying module VGM corresponding to the Gamma circuit. It can be learned that, the display driver 30 sends, only in the second time period, an enabling signal to an enabling port corresponding to the data receiving submodule 301 (MIPI RX), the data storage submodule 302 (RAM), the data processing submodule 303 (Gamma circuit), and the data switching control unit 3041 (DEMUX), and stops enabling in the first time period and the third time period. Further, still refer to FIG. 10. Because the MIPI RX in the display driver is enabled only when the second time period is close, similar to the MIPI TX of the SOC, the MIPI RX uses an LP (LowPower) working mode in the first time period and the third time period separately, to be specific, only an initialization signal is provided, but no data transmission is performed; and in the second time period, an HS (HighSpeed) working mode is used, to be specific, high-speed data transmission is performed.

It can be learned that, on the time resource corresponding to the display area that does not need to display an image, regardless of which of the foregoing submodules or units is disabled, power consumption of the submodule or unit in this period of time can be reduced. If all the submodules or units are disabled, more power consumption can be reduced in aspects such as data processing, data transmission, and circuit driving.

Further, it can be learned from the foregoing descriptions that, the scan control unit 3042 in the display driver 30 is configured to drive the pixel scan circuit to scan pixels. Because at least one of the submodules and units of the display driver 30 is disabled in the first time period and the third time period, correspondingly, in the first time period and the third time period, the scan control unit 3042 does not drive the first pixel scan circuit and the third pixel scan circuit. Therefore, the first pixel scan circuit and the third pixel scan circuit do not drive corresponding pixels, and the pixels in the first area 101 and the third area 103 do not display an image.

Figure 13A:
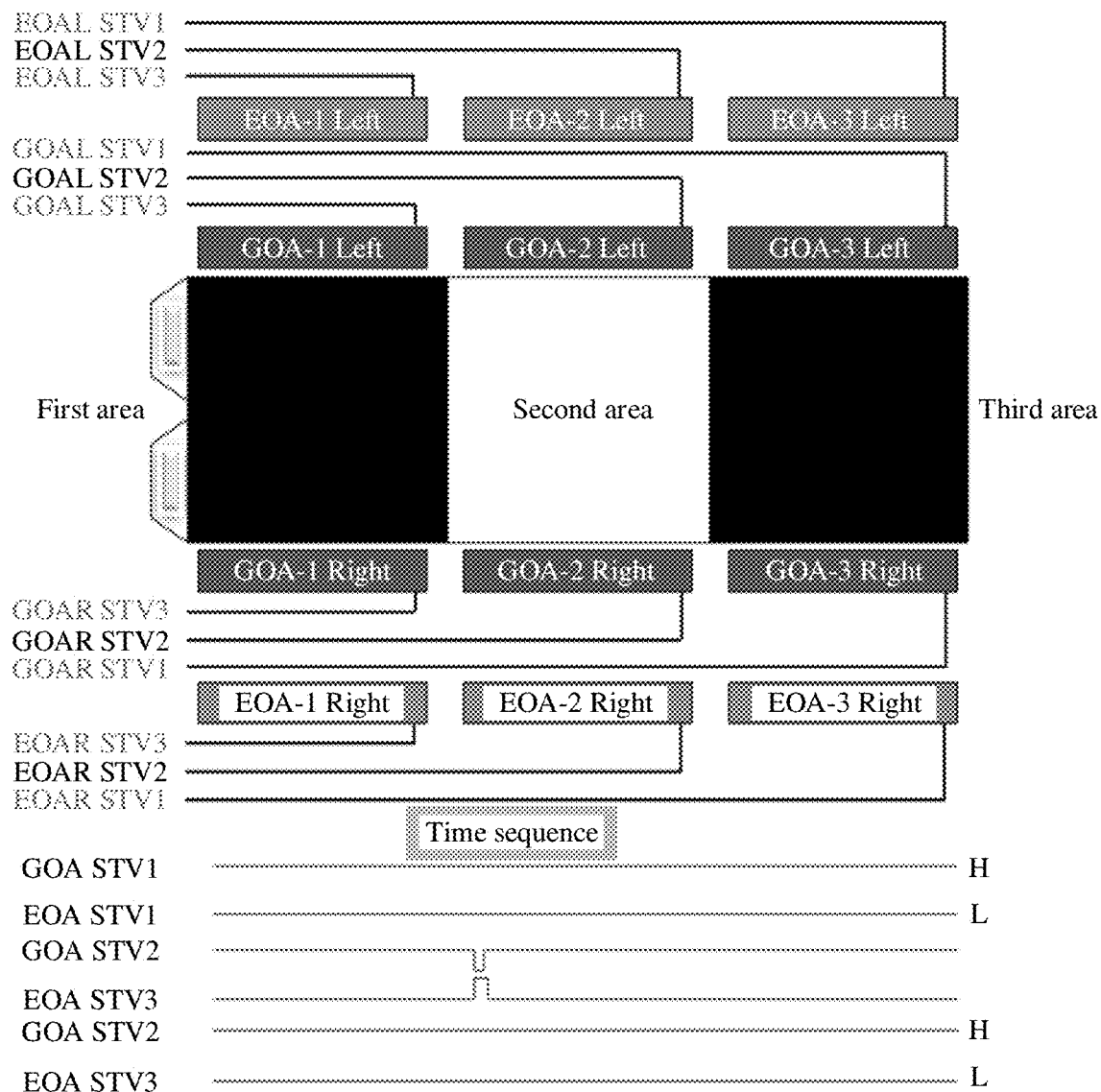
FIG. 13a is a diagram of drive time sequence signals of a pixel scan circuit in one frame according to an embodiment of this application.

FIG. 13a is a diagram of drive time sequence signals, in one frame, of a pixel scan circuit that is based on the drive control system in FIG. 6b. Specifically, after the display driver 30 determines that the first area 101 and the third area 103 do not need to display an image and the second area 102 needs to display an image, the scan control unit 3042 does not work in both the first time period and the third time period, to be specific, does not send, in the first time period, a display drive signal group (a start signal and a clock signal) to transmit lines (EOA-1 Right and EOA-1 Left) and row scan lines (GOA-1 Right and GOA-1 Left) of the two parts of the first pixel scan circuit corresponding to the first area 101: the left part and the right part; and also does not send, in the third time period, a display drive signal group (a start signal and a clock signal) to transmit lines (EOA-3 Right and EOA-3 Left) and row scan lines (GOA-3 Right and GOA-3 Left) of the third pixel scan circuit corresponding to the third area 103. Therefore, the first pixel scan circuit and the third pixel scan circuit do not drive corresponding pixels. In the second time period, the scan control unit 3042 sends the display drive signal group (the start signal and the clock signal) to the transmit lines (EOA-2 Right and EOA-2 Left) and the row scan lines (GOA-2 Right and GOA-2 Left) of the two parts of the second pixel scan circuit corresponding to the second area 102: the left part and the right part. FIG. 13a shows a diagram of time sequence signals (where signals of the left part and the right part are the same, and therefore are represented together) of three groups of transmit lines and row scan lines: (GOA STV1 and EOA STV1), (GOA STV2 and EOA STV2), and (GOA STV3 and EOA STV3). It can be learned that, in the second time period corresponding to the second area 102, start signals from the scan control unit 3042 appear in EOA STV2 and GOA STV2

(where levels of the start signals in EOA STV2 and GOA STV2 are opposite to each other), so that the second pixel scan circuit corresponding to the second area 102 starts to scan and drive pixels in the area row by row based on a clock signal.

It can be learned that, on the time resource corresponding to the display area that does not need to display an image, the scan control unit 3042 does not work, and a pixel scan circuit corresponding to the display area does not work either. Therefore, compared with an existing technology, in the embodiments of this application, power consumption required for the scan control unit 3042 and the pixel scan circuit to work in this period of time can be reduced.

Further, in the embodiments of this application, the power supply module 40 may independently supply power to pixels in different display areas. Therefore, after determining that the first area 101 and the third area 103 are in a state in which an image does not need to be displayed and the second area 102 is in the display state, the power supply module 40 may supply power only to the pixels in the second area 102, and does not need to supply power to the pixels in the first area 101 and the third area 103.

Still refer to FIG. 12. After the power supply module 40 determines that the first area 101 and the third area 103 do not need to display an image and the second area 102 needs to display an image, power supplying to the second area 102 may be enabled, and ELVDD2 and ELVSS2 in the power supply module 40 that are used to output voltages to the pixels in the second area 102 are enabled, so that a voltage between ELVDD2 and ELVSS2 enables a light emitting device to emit light normally, to enable the pixels in the second area 102 to display an image all along. Correspondingly, power voltage outputs ELVDD2 and ELVSS2 of the first area 101 and the third area 103 are disabled, so that a voltage between ELVDD2 and ELVSS2 cannot reach a voltage difference for the normal light emitting of the light emitting device; and in this way, power is not supplied to the pixels in the first area 101 and the third area 103, and the first area 101 and the third area 103 do not display an image.

It can be learned that the power supply module 40 independently supplies power to the pixels in the different display areas. Therefore, power supplying to the pixels in the display area that does not need to display an image may be stopped, and power is supplied only to a display area in a display state, so that power consumption required for supplying power to the pixels in the display area that does not need to display an image is reduced.

It can be learned that the foregoing implementation is to reduce power consumption. Another implementation to be described below is to increase a display scan frequency, namely, a frame frequency, of the second area 102 while keeping power consumption similar, so as to improve display picture quality of the second area 102 and provide better use experience for a scenario such as a game.

It is different from the foregoing implementation that, in another implementation of the embodiments of this application, after the display driver 30 determines that the first area 101 and the third area 103 do not need to display an image and the second area 102 needs to display an image, all the submodules or units of the display driver 30 may still be in an enabled state. However, in each of the first time period, the second time period, and the third time period, a display drive signal group is sent to the second pixel scan circuit corresponding to the second area 102, so as to drive the second pixel scan circuit to scan and drive the pixels in the second area 102 for three times on the three time resources in one frame.

Figure 13B:
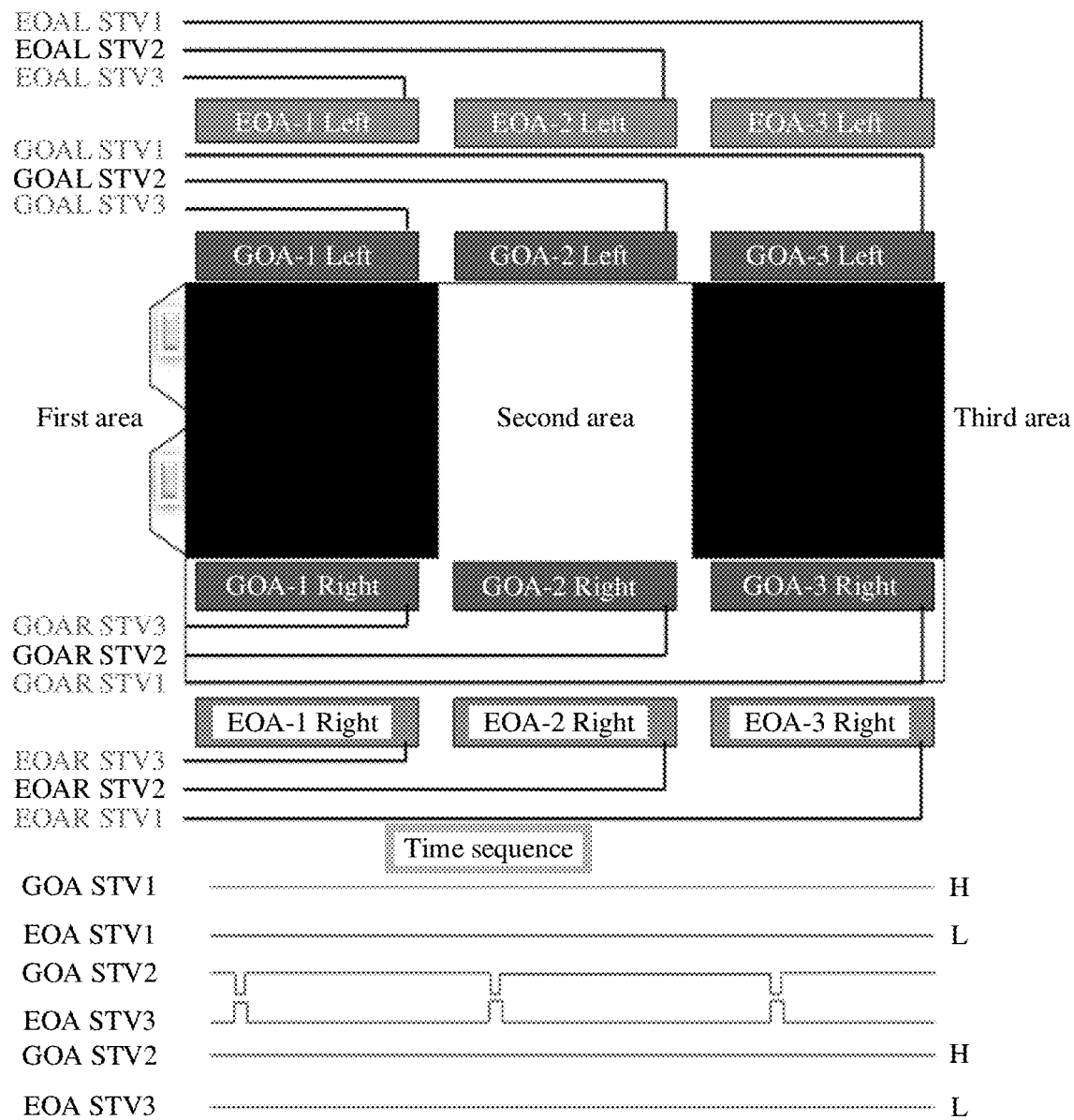
FIG. 13b is a diagram of drive time sequence signals of another pixel scan circuit in one frame according to an embodiment of this application.

FIG. 13b is a diagram of drive time sequence signals, in one frame, of another pixel scan circuit that is based on the drive control system in FIG. 6b. Specifically, after the display driver 30 determines that the first area 101 and the third area 103 do not need to display an image and the second area 102 needs to display an image, the scan control unit 3042 sends, in each of the first time period, the second time period, and the third time period, the display drive signal group (the start signal and the clock signal) to the transmit lines (EOA-2 Right and EOA-2 Left) and the row scan lines (GOA-2 Right and GOA-2 Left) of the two parts of the second pixel scan circuit corresponding to the second area 102: the left part and the right part. FIG. 13b shows a diagram of time sequence signals (where signals of the left part and the right part are the same, and therefore are represented together in the figure) of three groups of transmit lines and row scan lines: (GOA STV1 and EOA STV1), (GOA STV2 and EOA STV2), and (GOA STV3 and EOA STV3). It can be learned that, in each of the first time period, the second time period, and the third time period, start signals from the scan control unit 3042 appear in EOA STV2 and GOA STV2 (where levels of the start signals in EOA STV2 and GOA STV2 are opposite to each other), so that the second pixel scan circuit corresponding to the second area 102 starts, on each of the three time resources, to scan and drive pixels in the area row by row based on a clock signal.

It may be understood that, if a previous display scanning frame frequency is 60 Hz, in this implementation, a display scanning frame frequency reaches three times the previous one, that is, 180 Hz, and this greatly improves a refresh rate of a displayed image and a picture display effect.

In addition, in this implementation, the power supply module 40 may still perform area-divided power supplying, which is consistent with a power supplying manner in the foregoing implementation. Therefore, details are not described again.

3. Touch Driver 50

In an implementation of the embodiments of this application, after the touch driver 50 determines that the first area 101 and the third area 103 do not need to display an image and the second area 102 needs to display an image, in the fourth time period and the sixth time period, the touch driver 50 does not drive the first touch scan circuit and the third touch scan circuit. Therefore, the first touch scan circuit and the third touch scan circuit also do not drive the corresponding touch sensors, and the touch sensors of the first area 101 and the third area 103 also do not perform touch signal monitoring. In this case, when a user performs touch operations on the first area 101 and the third area 103, the touch operations are also not sensed, and the processor 20 also does not receive the touch signals. In the fifth time period, the touch driver 50 drives the second touch scan circuit. Therefore, the second touch scan circuit drives corresponding touch sensors, and the touch sensors of the second area 102 perform touch signal monitoring.

Figure 14A:
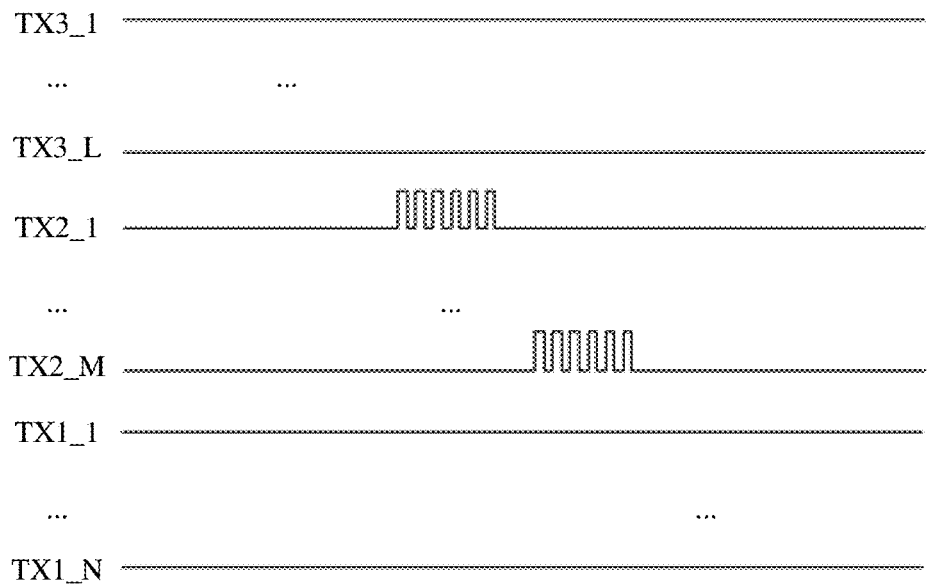
FIG. 14a is a diagram of drive time sequence signals of a mutual-capacitance touch scan circuit in one frame according to an embodiment of this application.

FIG. 14a is a diagram of drive time sequence signals of a mutual-capacitance touch scan circuit in one frame. Specifically, after the touch driver 50 determines that the first area 101 and the third area 103 do not need to display an image and the second area 102 needs to display an image, the touch driver 50 does not work in both the fourth time period and the sixth time period, to be specific, does not send, in the fourth time period, touch drive signals to touch scan lines (TX1_1 to TX1_N) of the first touch scan circuit corresponding to the first area 101, and also does not send, in the sixth time period, touch drive signals to touch scan lines (TX3_1 to TX1_L) of the third touch scan circuit corresponding to the third area 103. Therefore, the first touch scan circuit and the third touch scan circuit also do not drive the corresponding touch sensors. In the fifth time period, the touch driver 50 sends touch drive signals to touch scan lines (TX2_1 to TX2_M) of the second touch scan circuit corresponding to the second area 102. FIG. 14*a* shows a diagram of time sequence signals of TX1_1 to TX1_N, TX2_1 to TX2_M, and TX3_1 to TX1_L. It can be learned that, in the fifth time period corresponding to the second area 102, TX2_1 to TX2_M receive touch drive signals from the touch driver 50, so that the second touch scan circuit corresponding to the second area 102 starts to sequentially scan and drive the touch sensors of this area based on the drive signals.

Figure 15A:
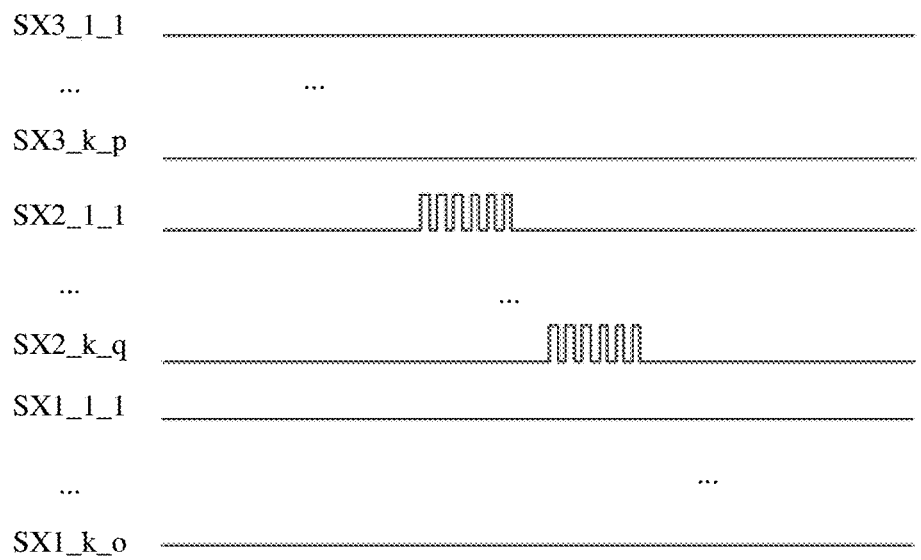
FIG. 15a is a diagram of drive time sequence signals of a self-capacitance touch scan circuit in one frame according to an embodiment of this application.

Similarly, FIG. 15*a* is a diagram of drive time sequence signals of a self-capacitance touch scan circuit in one frame. It is the same as the mutual-capacitance solution that, the touch driver 50 does not work in both the fourth time period and the sixth time period, and in the fifth time period, the touch driver 50 sends touch drive signals to the touch scan lines (SX2_1_1 to SX2_k_q) of the second touch scan circuit corresponding to the second area 102, so that the second touch scan circuit corresponding to the second area 102 starts to sequentially scan and drive the touch sensors of this area based on the drive signals. For a specific implementation, reference may be further made to the mutual-capacitance solution, and details are not described herein again.

It can be learned that, compared with an existing-technology solution in which touch driving is also performed on a display area that does not need to display an image but a processor does not process a received touch signal, in the embodiments of this application, on the time resource corresponding to the display area that does not need to display an image, the touch driver 50 does not work, and a touch scan circuit corresponding to the display area also does not work. Therefore, power consumption required for the touch driver 50 and the touch scan circuit to work in this period of time can be reduced.

It can be learned that the foregoing implementation is to reduce power consumption. Another implementation to be described below is to increase a touch scan frequency of the second area 102 and increase a touch report rate of the second area 102 while keeping power consumption similar, so as to improve touch sensing sensitivity of the second area 102 and provide better use experience for a scenario such as a game.

It is different from the foregoing implementation that, in another implementation of the embodiments of this application, after the touch driver 50 determines that the first area 101 and the third area 103 do not need to display an image and the second area 102 needs to display an image, the touch driver 50 sends touch drive signals to the second touch scan circuit corresponding to the second area 102 in each of the fourth time period, the fifth time period, and the sixth time period, to drive the second touch scan circuit to scan and drive the touch sensors of the second area 102 for three times on the three time resources in one frame.

Figure 14B:
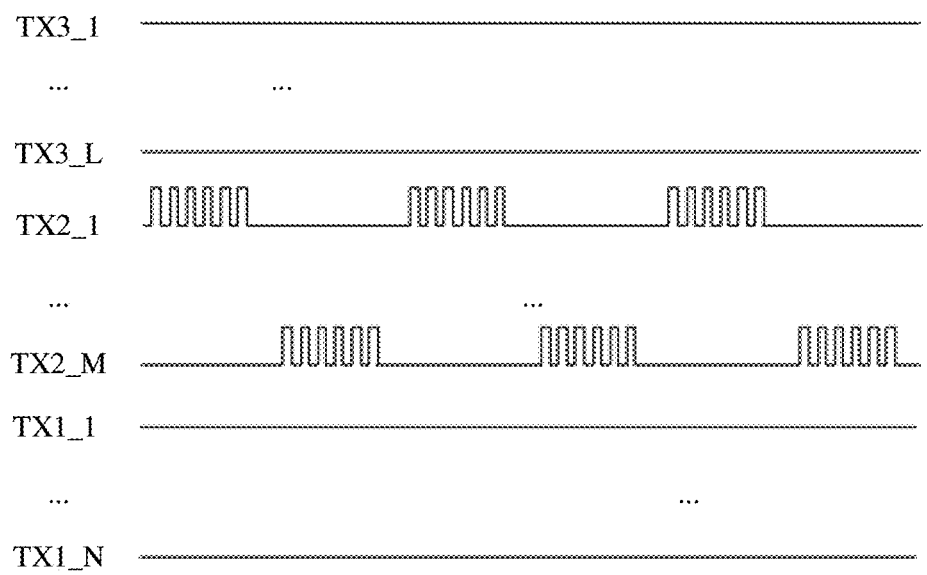
FIG. 14b is a diagram of drive time sequence signals of another mutual-capacitance touch scan circuit in one frame according to an embodiment of this application.

FIG. 14*b* is a diagram of drive time sequence signals of another mutual-capacitance touch scan circuit in one frame. Specifically, after the touch driver 50 determines that the first area 101 and the third area 103 do not need to display an image and the second area 102 needs to display an image, the touch driver 50 sends touch drive signals to the touch scan lines (TX2_1 to TX2_M) of the second touch scan circuit corresponding to the second area 102 in each of the fourth time period, the fifth time period, and the sixth time period. Refer to the diagram of time sequence signals of TX2_1 to TX2_M shown in FIG. 14*b*. It can be learned that, TX2_1 to TX2_M all receive touch drive signals from the touch driver 50 in each of the fourth time period, the fifth time period, and the sixth time period, so that the second touch scan circuit corresponding to the second area 102 starts, on each of the three time resources, to sequentially scan and drive the touch sensors of this area based on the drive signals.

Figure 15B:
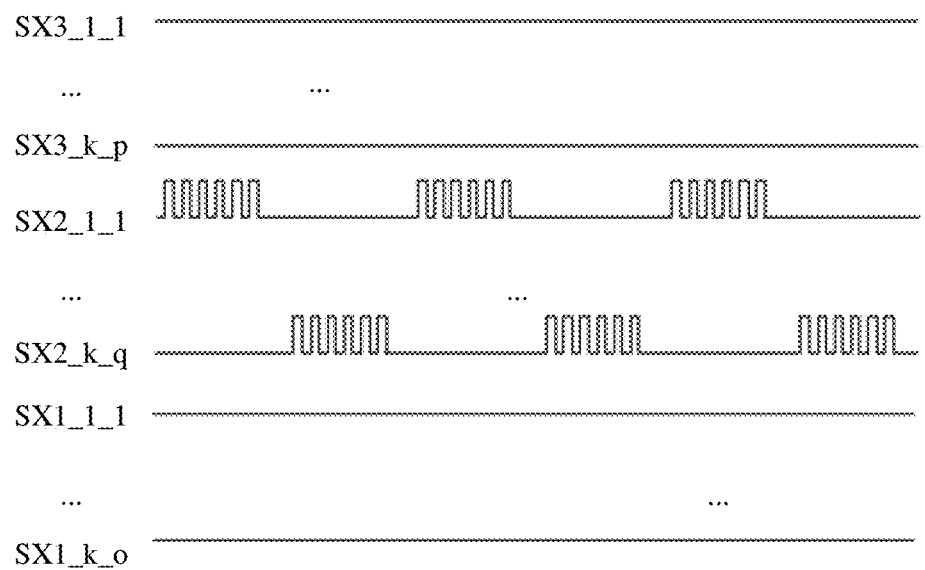
FIG. 15b is a diagram of drive time sequence signals of another self-capacitance touch scan circuit in one frame according to an embodiment of this application.

Similarly, FIG. 15*b* is a diagram of drive time sequence signals of another self-capacitance touch scan circuit in one frame. It is same as the mutual-capacitance solution that, the touch driver 50 sends, in each of the fourth time period, the fifth time period, and the sixth time period, touch drive signals to the touch scan lines (SX2_1_1 to SX2_k_q) of the second touch scan circuit corresponding to the second area 102. Refer to the diagram of time sequence signals of SX2_1_1 to SX2_k_q shown in FIG. 15*b*. It can be learned that, SX2_1_1 to SX2_k_q all receive touch drive signals from the touch driver 50 in each of the fourth time period, the fifth time period, and the sixth time period, so that the second touch scan circuit corresponding to the second area 102 starts, on each of the three time resources, to sequentially scan and drive the touch sensors of this area based on the drive signals.

It may be understood that, if a previous touch scanning frame frequency is 60 Hz, in this implementation, a touch scanning frame frequency reaches three times the previous one, that is, 180 Hz, and this greatly improves touch sensing sensitivity.

4. Fingerprint Driver 60

In an implementation of the embodiments of this application, after the fingerprint driver 60 determines that the first area 101 and the third area 103 do not need to display an image and the second area 102 needs to display an image, in the seventh time period and the ninth time period, the fingerprint driver 60 does not drive the first fingerprint scan circuit and the third fingerprint scan circuit. Therefore, the first fingerprint scan circuit and the third fingerprint scan circuit also do not drive the corresponding fingerprint sensors, and the fingerprint sensors of the first area 101 and the third area 103 also do not monitor fingerprint signals. In this case, when a user performs fingerprint recognition operations on the first area 101 and the third area 103, the fingerprint recognition operations are also not sensed, and the processor 20 also does not receive the fingerprint signals. In the eighth time period, the fingerprint driver 60 drives the second fingerprint scan circuit. Therefore, the second fingerprint scan circuit drives corresponding fingerprint sensors, and the fingerprint sensors of the second area 102 monitor fingerprint signals.

A drive control method of the fingerprint driver 60 is similar to that of the touch driver 50. A diagram of drive time sequence signals of a fingerprint scan circuit in one frame is also similar to a diagram of drive time sequence signals of a touch scan circuit in one frame. Therefore, reference may be made to the foregoing descriptions, and details are not described herein again.

It can be learned that, compared with an existing-technology solution in which fingerprint sensing driving is also performed on a display area that does not need to display an image but a processor does not process a received fingerprint signal, in the embodiments of this application, on the time resource of the display area that does not need to display an image, the fingerprint driver 60 does not work, and a fingerprint scan circuit corresponding to a display area that needs to display an image also does not work. Therefore, power consumption required for the fingerprint driver 60 and the fingerprint scan circuit to work in this period of time can be reduced.

It can be learned that the foregoing implementation is to reduce power consumption. Another implementation to be described below is to increase a fingerprint scan frequency of the second area 102 while keeping power consumption similar, so as to improve fingerprint sensing sensitivity of the second area 102.

It is different from the foregoing implementation that, in another implementation of the embodiments of this application, after the fingerprint driver 60 determines that the first area 101 and the third area 103 do not need to display an image and the second area 102 needs to display an image, the fingerprint driver 60 sends fingerprint drive signals to the second fingerprint scan circuit corresponding to the second area 102 in each of the seventh time period, the eighth time period, and the ninth time period, to drive the second fingerprint scan circuit to scan and drive the fingerprint sensors of the second area 102 for three times on the three time resources in one frame.

It may be understood that, if a previous fingerprint scanning frame frequency is 60 Hz, in this implementation, a fingerprint scanning frame frequency reaches three times the previous one, that is, 180 Hz, and this greatly improves fingerprint sensing sensitivity.

Further, in the foregoing embodiments, each module stops working on a time resource corresponding to the display area that does not need to display an image, and starts to work on a time resource corresponding to a display area that is in a display state. In another implementation, to ensure smoothness of system work, the modules in the drive control system in the foregoing embodiments may be enabled to start to work earlier, or the modules in the drive control system in the foregoing embodiments may be enabled to stop working later. Specifically, the modules may stop working when a period of time elapses after the modules enter the time resource corresponding to the display area that does not need to display an image, from the time resource corresponding to the display area that needs to display an image; or may resume working, a period of time before the modules enter the time resource corresponding to the display area that needs to display an image, from the time resource corresponding to the display area that does not need to display an image. However, it should be noted that, although suspension time of the modules is shortened, driving of various circuits still starts based on specified scanning time points.

It can be learned that the display panel 10, the processor 20, the display driver 30, the power supply module 40, the touch driver 50, and the fingerprint driver 60 separately reduce power consumption of one or more of display, touch, power supply, fingerprint recognition, and the like. It may be understood that, based on function designs and hardware structure designs of different electronic devices, in specific implementation, the foregoing drive control method may be used for some submodules or some time periods of a module, to reduce corresponding some power consumption; or the drive control method in the foregoing embodiments may be used for all the foregoing modules, to reduce power consumption to a greatest extent.

The following describes a drive control method of each module in the first case in which each of the first area 101, the second area 102, and the third area 103 needs to display an image.

Figure 16:
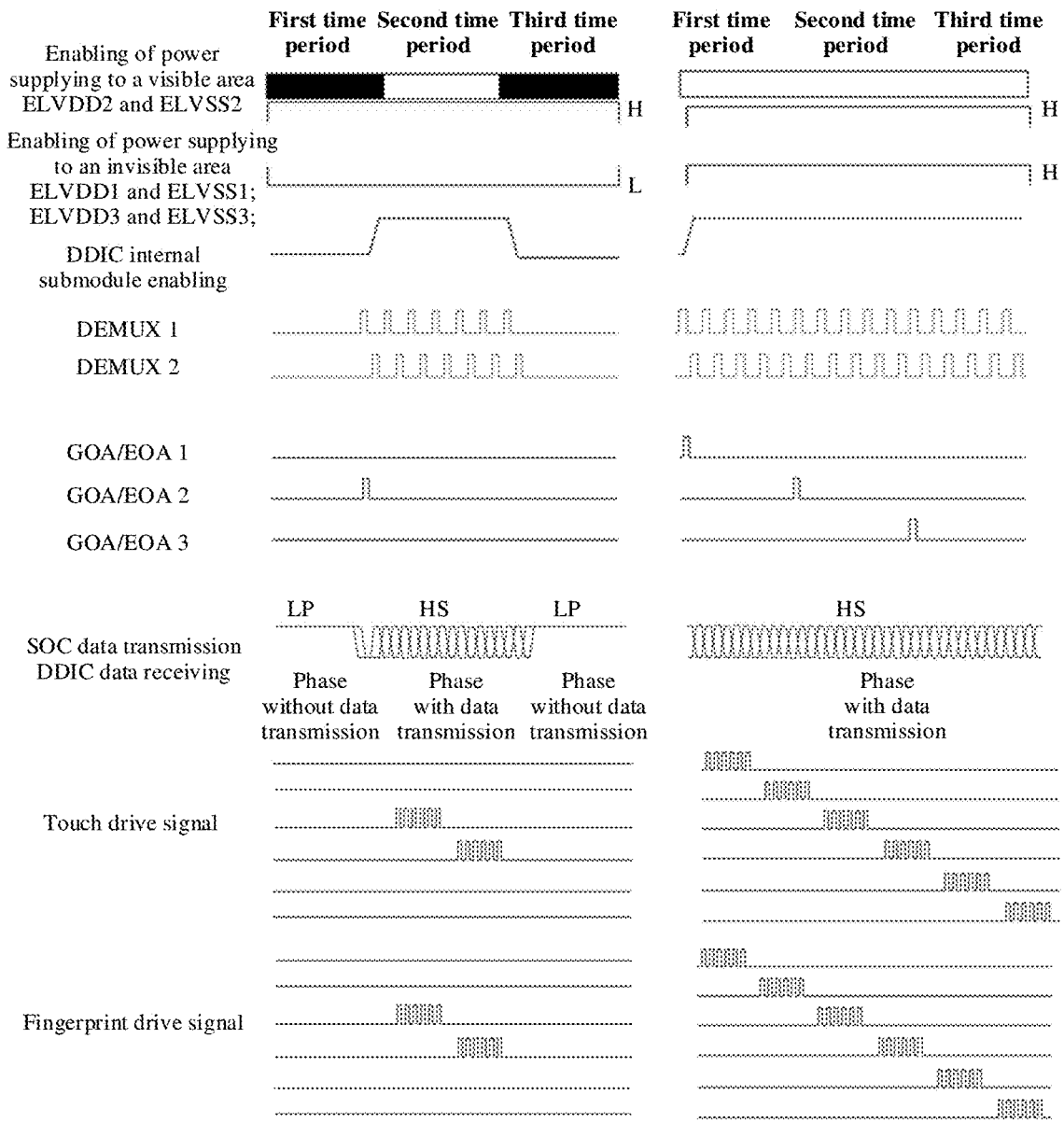
FIG. 16 is a diagram of drive time sequence signals of modules or units in two statuses in one frame according to an embodiment of this application.
Figure 17:
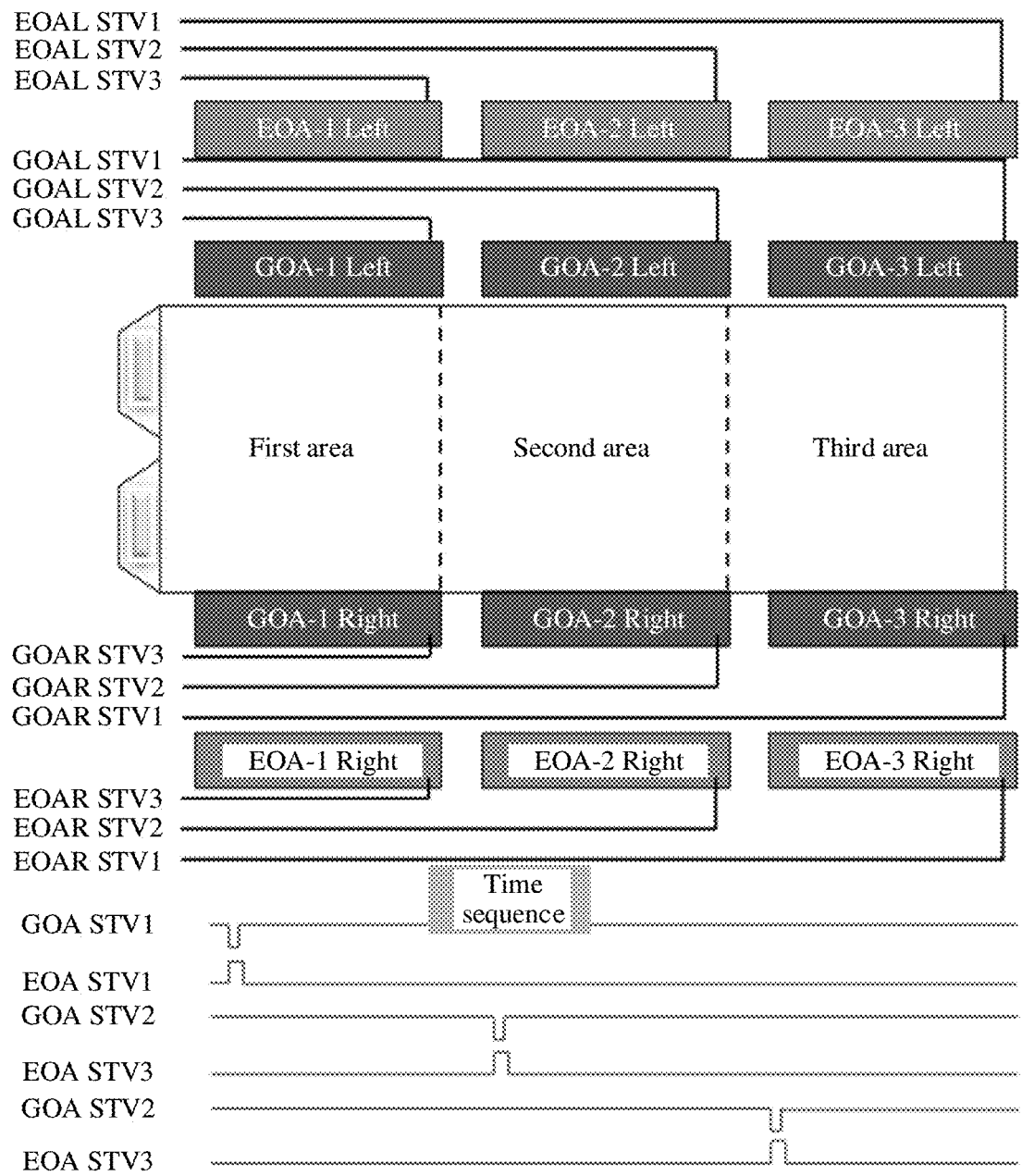
FIG. 17 is a diagram of drive time sequence signals of another pixel scan circuit in one frame according to an embodiment of this application.

Refer to FIG. 16. It can be learned from a diagram of overall comparison with the third case that, when each of the three areas needs to display an image, the display panel 10, the processor 20, the display driver 30, the power supply module 40, the touch driver 50, and the fingerprint driver 60 all work normally on time resources corresponding to the three areas, and circuits respectively controlled by the display panel 10, the processor 20, the display driver 30, the power supply module 40, the touch driver 50, and the fingerprint driver 60 also normally perform scanning and driving or power supplying. Specifically, the power supply module 40 always remains in an enabled state of supplying power to each of the first area 101, the second area 102, and the third area 103, that is, keeps supplying power to each area. Each of internal submodules of the touch driver 50 (DDIC): the data receiving submodule 301, the data storage submodule 302, the data processing submodule 303, and the scan control submodule 304 (DEMUX, scan control unit 3042) is always in an enabled state to process image data. Reference is further made to FIG. 17 and comparison is made between FIG. 17 and FIG. 13a. It can be learned that, in the first case, when a time resource corresponding to each area arrives, the scan control unit 3042 sends a start signal to a pixel scan circuit (EOA/GOA) corresponding to the area. The data transmission submodule 203 of the processor 20 (SOC) also continuously maintains image data transmission on all time resources. Control of the foregoing modules ensures that the first area 101, the second area 102, and the third area 103 all perform normal image display in a display state. Further, when the time resource corresponding to each area arrives, the touch driver 50 and the fingerprint driver 60 also respectively send drive signals to a touch scan circuit and a fingerprint scan circuit corresponding to the area, so as to start monitoring of a touch signal and a fingerprint signal of the corresponding area.

Specifically, for a drive control method of the time resource corresponding to each display area, refer to the drive control methods of the foregoing several modules in the case in which the second area 102 needs to display an image in the third case. Their principles are completely the same. Therefore, details are not described again.

The following describes a drive control method of each module in the second case in which none of the first area 101, the second area 102, and the third area 103 needs to display an image.

It may be understood that, when none of the three areas needs to display an image, the display panel 10, the processor 20, the display driver 30, the power supply module 40, the touch driver 50, and the fingerprint driver 60 may all stop working on the time resources corresponding to the three areas, and the circuits respectively controlled by the display panel 10, the processor 20, the display driver 30, the power supply module 40, the touch driver 50, and the fingerprint driver 60 may also stop scanning and driving or power supplying. Specifically, for a drive control method of the time resource corresponding to each display area, refer to the drive control methods of the foregoing several modules in the case in which the first area 101 and the third area 103 do not need to display an image in the third case. Their principles are completely the same. Therefore, details are not described again.

It should be understood that, the application scenarios described in the embodiments of this application are intended to describe the technical solutions in the embodiments of this application more clearly, but constitute no limitation on the technical solutions provided in the embodiments of this application. A person of ordinary skill in the art may learn that the technical solutions provided in the embodiments of this application are also applicable to a similar technical problem as a new application scenario emerges.

The implementations of this application may be randomly combined to achieve different technical effects.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk drive, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium may include a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A display module, comprising a display panel and a display driver, wherein
the display panel comprises a first pixel scan circuit and a second pixel scan circuit, wherein the first pixel scan circuit is configured to drive pixels in a first area on the display panel to convert electrical signals into optical signals, and the second pixel scan circuit is configured to drive pixels in a second area on the display panel to convert electrical signals into optical signals; and
the display driver is configured to generate different display drive signals to the display panel to respectively control working time periods of the first pixel scan circuit and the second pixel scan circuit,
wherein the different display drive signals comprise a first display drive signal and a second display drive signal, wherein the first display drive signal controls the first pixel scan circuit to be in a working state in a first time period to drive the pixels in the first area, the second display drive signal controls the second pixel scan circuit to be in a working state in a second time period to drive the pixels in the second area, and the first time period and the second time period are periodically cyclic.

2. The display module according to claim 1, wherein the display driver is further configured to: in a specific cycle, skip outputting the second display drive signal in the second time period, wherein the first time period and the second time period are periodically cyclic in the specific cycle.

3. The display module according to claim 1, wherein the display driver is further configured to: in a specific cycle, output the first display drive signal in both the first time period and the second time period, wherein the first time period and the second time period are periodically cyclic in the specific cycle.

4. The display module according to claim 1, wherein the display driver is further configured to: in a specific cycle, send pixel data signals to the display panel in the first time period, and skip sending pixel data signals in the second time period, wherein the pixel data signals indicate content displayed by pixels on the display panel, and the first time period and the second time period are periodically cyclic in the specific cycle.

5. The display module according to claim 1, wherein the display driver is configured to: in a specific cycle, receive, in the first time period, image data of the display panel that is sent by a processor, and skip receiving, in the second time period, image data of the display panel that is sent by the processor, wherein the first time period and the second time period are periodically cyclic in the specific cycle.

6. A processor, wherein the processor is configured to: obtain display requirements of different areas of a display, and determine, based on the display requirements, time resources for sending image data of the different areas to a display driver, wherein the time resources comprise a first time period and a second time period, and the first time period and the second time period are periodically cyclic.

7. The processor according to claim 6, wherein the different areas of the display comprises a first area and a second area, and the processor is further configured to: send image data of the first area to the display driver in the first time period, and send image data of the second area to the display driver in the second time period, wherein the first time period corresponds to time during which the display driver drives the first area, and the second time period corresponds to time during which the display driver drives the second area.

8. The processor according to claim 6, wherein the different areas of the display comprises a first area and a second area, and the processor is further configured to: send image data of the first area to the display driver in the first time period, and skip sending image data of the second area to the display driver in the second time period, wherein the first time period corresponds to time during which the display driver drives the first area, and the second time period corresponds to time during which the display driver drives the second area.

9. The processor according to claim 6, wherein the processor is further configured to send first indication information to at least one of the display driver, a power supply, a touch driver, or a fingerprint sensing driver, wherein the first indication information indicates the display requirements of the different areas of the display.

10. The processor according to claim 6, wherein the processor is further configured to: obtain a status of an electronic device, and determine the display requirements of the different areas of the display based on the status of the electronic device.

11. An electronic device, comprising a display, a memory and a processor, wherein
the display comprises a display panel and a display driver;
the display panel comprises a first pixel scan circuit and a second pixel scan circuit, wherein the first pixel scan circuit is configured to drive pixels in a first area on the display panel to convert electrical signals into optical signals, and the second pixel scan circuit is configured to drive pixels in a second area on the display panel to convert electrical signals into optical signals;
the display driver is configured to generate different display drive signals to the display panel to respectively control working time periods of the first pixel scan circuit and the second pixel scan circuit; and
the processor is configured to: obtain display requirements of the first area and the second area, and determine, based on the display requirements, time resources for sending image data of the first area and the second area to the display driver, wherein the time resources comprise a first time period and a second time period, and the first time period and the second time period are periodically cyclic.

12. The electronic device according to claim 11, wherein the display driver is configured to output a first display drive signal and a second display drive signal, wherein the first display drive signal controls the first pixel scan circuit to be in a working state in the first time period to drive the pixels in the first area, and the second display drive signal controls the second pixel scan circuit to be in a working state in the second time period to drive the pixels in the second area.

13. The electronic device according to claim 12, wherein the display driver is further configured to: in a specific cycle, skip outputting the second display drive signal in the second time period, wherein the first time period and the second time period are periodically cyclic in the specific cycle.

14. The electronic device according to claim 12, wherein the display driver is further configured to: in a specific cycle, output the first display drive signal in both the first time period and the second time period, wherein the first time period and the second time period are periodically cyclic in the specific cycle.

15. The electronic device according to claim 11, wherein the display driver is further configured to: in a specific cycle, send pixel data signals in the first time period, and skip sending pixel data signals in the second time period, wherein the first time period and the second time period are periodically cyclic in the specific cycle.

16. The electronic device according to claim 11, wherein the display driver is configured to: in a specific cycle, receive, in the first time period, image data of the display panel that is sent by the processor, and skip receiving, in the second time period, image data of the display panel that is sent by the processor, wherein the first time period and the second time period are periodically cyclic in the specific cycle.

17. The electronic device according to claim 11, wherein the processor is further configured to: send image data of the first area to the display driver in the first time period, and send image data of the second area to the display driver in the second time period, wherein the first time period corresponds to time during which the display driver drives the first area, and the second time period corresponds to time during which the display driver drives the second area.

18. The electronic device according to claim 11, wherein the processor is further configured to: send image data of the first area to the display driver in the first time period, and skip sending image data of the second area to the display driver in the second time period, wherein the first time period corresponds to time during which the display driver drives the first area, and the second time period corresponds to time during which the display driver drives the second area.

19. The electronic device according to claim 11, wherein the processor is further configured to send first indication information to at least one of the display driver, a power supply module, a touch driver, and a fingerprint sensing driver, wherein the first indication information indicates the display requirements of different areas of the display.

* * * * *